United States Patent
Wang et al.

(10) Patent No.: US 12,438,834 B2
(45) Date of Patent: Oct. 7, 2025

(54) SERVICE SHARING METHOD AND SYSTEM, AND ELECTRONIC DEVICE

(71) Applicant: Huawei Technologies Co., Ltd., Shenzhen (CN)

(72) Inventors: Yilun Wang, Nanjing (CN); Min Liu, Nanjing (CN); Li Zhang, Nanjing (CN); Ning Ding, Nanjing (CN); Sucheng Bian, Nanjing (CN); Zhong Du, Nanjing (CN); Li Li, Nanjing (CN); Lei Wang, Nanjing (CN); Long Wang, Shenzhen (CN); Weiqing Fang, Shenzhen (DE); Junfeng Yang, Xi'an (CN); Feng Ge, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/043,790

(22) PCT Filed: Aug. 9, 2021

(86) PCT No.: PCT/CN2021/111556
§ 371 (c)(1),
(2) Date: Mar. 2, 2023

(87) PCT Pub. No.: WO2022/052706
PCT Pub. Date: Mar. 17, 2022

(65) Prior Publication Data
US 2024/0244017 A1    Jul. 18, 2024

(30) Foreign Application Priority Data
Sep. 8, 2020 (CN) .......................... 202010936711.5

(51) Int. Cl.
H04L 51/046 (2022.01)
H04M 1/72469 (2021.01)

(52) U.S. Cl.
CPC ...... *H04L 51/046* (2013.01); *H04M 1/72469* (2021.01)

(58) Field of Classification Search
CPC ..... H04L 51/046; H04L 51/02; H04L 67/306; H04L 51/10; H04L 51/52; H04L 51/04;
(Continued)

(56) References Cited

U.S. PATENT DOCUMENTS 6,360,252 B1 *  3/2002  Rudy .................. G06Q 10/107
                                                    709/217
7,293,074 B1 * 11/2007  Jellinek .............. G06Q 10/10
                                                    709/227
(Continued)

FOREIGN PATENT DOCUMENTS

CN      104657151 A    5/2015
CN      105917626 A    8/2016
(Continued)

*Primary Examiner* — Ninos Donabed
(74) *Attorney, Agent, or Firm* — Slater Matsil, LLP

(57) ABSTRACT

This application provides a service sharing method and system, and an electronic device. The method includes: A first device may display a chat interface with a first contact, where the chat interface includes an input box for a chat message. If it is detected that a user inputs a preset symbol into the input box, the first device displays a first device list. If it is detected that the user selects a second device from the first device list, the first device displays a service list provided by the second device, where the service list includes one or more services provided by the second device. If it is detected that the user selects a first service from the service list, the first device sends a first chat message in the chat interface, where the first chat message includes first service content corresponding to the first service selected by the user.

20 Claims, 45 Drawing Sheets

(58) Field of Classification Search
CPC ............ H04M 1/72469; G06F 3/04817; G06F 3/04842; G06F 3/0482
See application file for complete search history.

(56) References Cited

U.S. PATENT DOCUMENTS

| | | | |
|---|---|---|---|
| 7,796,982 B2 | 9/2010 | Mohanty | |
| 9,178,773 B1* | 11/2015 | Tassone | H04L 65/1096 |
| 2001/0056488 A1* | 12/2001 | Maeda | G06Q 10/0875 |
| | | | 705/28 |
| 2006/0253547 A1* | 11/2006 | Wood | G06F 16/64 |
| | | | 709/217 |
| 2008/0154803 A1* | 6/2008 | Stein | H04N 19/42 |
| | | | 706/1 |
| 2009/0106385 A1* | 4/2009 | Sarikaya | H04L 63/0892 |
| | | | 726/4 |
| 2010/0287614 A1* | 11/2010 | Perez-Freire | H04L 9/32 |
| | | | 726/22 |
| 2011/0108622 A1* | 5/2011 | Das | G06Q 20/3276 |
| | | | 235/380 |
| 2012/0198350 A1* | 8/2012 | Nhiayi | G06F 3/0482 |
| | | | 715/740 |
| 2014/0019884 A1 | 1/2014 | Dinan et al. | |
| 2014/0317645 A1* | 10/2014 | Cheung | H04N 21/4788 |
| | | | 725/23 |
| 2014/0357370 A1* | 12/2014 | Soelberg, III | A63F 13/21 |
| | | | 463/37 |
| 2015/0074534 A1 | 3/2015 | Didomenico et al. | |
| 2015/0379752 A1* | 12/2015 | Li | G06T 13/80 |
| | | | 715/752 |
| 2018/0241705 A1* | 8/2018 | Sarafa | H04L 9/0827 |
| 2018/0367483 A1* | 12/2018 | Rodriguez | H04L 65/60 |

FOREIGN PATENT DOCUMENTS

| | | |
|---|---|---|
| CN | 106162236 A | 11/2016 |
| CN | 106171038 A | 11/2016 |
| CN | 106302303 A | 1/2017 |
| CN | 106789586 A | 5/2017 |
| CN | 107689911 A | 2/2018 |
| CN | 107959616 A | 4/2018 |
| CN | 110333814 A | 10/2019 |
| CN | 110493121 A | 11/2019 |
| CN | 110989950 A | 4/2020 |
| IN | 106502684 A | 3/2017 |

\* cited by examiner

SERVICE SHARING METHOD AND SYSTEM, AND ELECTRONIC DEVICE

CROSS-REFERENCE TO RELATED APPLICATIONS

This application is a national stage of International Application No. PCT/CN2021/111556, filed on Aug. 9, 2021, which claims priority to Chinese Patent Application No. 202010936711.5, filed on Sep. 8, 2020. Both of the aforementioned applications are hereby incorporated by reference in their entireties.

TECHNICAL FIELD

This application relates to the field of terminal technologies, and in particular, to a service sharing method and system, and an electronic device.

BACKGROUND

One or more applications are usually installed in an electronic device such as a mobile phone, and these applications may provide rich application services for a user. For example, a video APP, a music APP, a shopping APP, and the like may be installed in a mobile phone. The video APP is used as an example. The video APP may provide, for a user, application services such as playing, message leaving, and sharing of a video file. For another example, the video APP may further provide, for a user, application services such as latest popular recommendation, favorites, and historical play records.

In a chat scenario, a user may send an application service in an application to a contact in a form of a chat message. For example, when a user watches a TV series A by using a video APP in a mobile phone, as shown in FIG. 1(a), the mobile phone may display a play interface 101 of the TV series A in the video APP. If the user wants to share the TV series A with a contact Sam, the user may tap a share button 102 in the play interface 101. In this case, still as shown in FIG. 1(a), the mobile phone may display, in a dialog box 103, a sharing manner that can be selected by the user, for example, sharing to a WeChat APP, sharing to a microblog APP, or sharing to a mailbox APP. An example in which the user selects the sharing manner, namely, sharing to the WeChat APP is used. As shown in FIG. 1(b), the mobile phone may jump to a contact selection interface 104 of the WeChat APP. The user may search the contact selection interface 104 for the contact Sam 105, and share the TV series A in the video APP with the contact Sam 105. After sharing an application service, namely, the TV series A provided in the video APP with the contact Sam 105, the user may further select to stay in the WeChat APP. As shown in FIG. 1(c), the mobile phone may display a chat interface 106 that is in the WeChat APP and that is with the contact Sam 105. In the chat interface 106, the mobile phone may display, in a form of a chat message 107, the TV series A shared by the user in the video APP.

It is clearly that, in the foregoing process of sharing the application service, the user needs to perform continuous selection, and correspondingly, the mobile phone also needs to perform continuous application switching and page jumping, to share an application service in an application with a corresponding contact, so that a process of pushing the application service is complex.

SUMMARY

This application provides a service sharing method and system, and an electronic device. An electronic device may quickly share, with a contact, a service provided by another electronic device, so that a user can use, across devices, services provided by different electronic devices.

To achieve the foregoing objective, this application uses the following technical solutions.

According to a first aspect, this application provides a service sharing method. The method includes: When a user chats with a first contact by using a chat APP, a first device may display a chat interface with the first contact, where the chat interface may include an input box for a chat message. If it is detected that the user inputs a preset symbol, for example, a reminder symbol "@" into the input box, the first device may display a first device list, where the first device list includes one or more electronic devices associated with the first device, and the user may select, from the first device list, a specific device in which a service that needs to be shared is located. If it is detected that the user selects a second device from the first device list, the first device may display a service list provided by the second device, where the service list includes one or more services provided by the second device, and the user may select, from the service list, specific content of a service that is shared with the first contact, for example, My Favorites and Latest Popular. If it is detected that the user selects a first service from the service list, the first device may send a first chat message in the chat interface, where the first chat message includes first service content corresponding to the first service selected by the user.

The first contact may be a friend, a group, a stranger, an official account, an applet, a robot, a chat assistant, or the like in the chat APP. This is not limited in this application.

It may be learned that when chatting with a contact, the user can trigger, by inputting a preset symbol, an electronic device (for example, the first device) to display a related electronic device in the chat APP for the user to select. After the user selects an electronic device (for example, the second device), the first device may display, in the chat APP, the one or more services provided by the second device for the user to select. After the user selects a service, the first device may share specific service content of the service with the contact in a form of a chat message, so that the first device may share, with the contact, a service provided by another electronic device, to implement cross-device sharing of an application service. In addition, in an entire sharing process, the user does not need to jump from the chat APP to another application or another electronic device, so that operations in the entire sharing process are simple, to improve user experience.

In a possible implementation, before that the first device displays a first device list, the method further includes: The first device obtains one or more electronic devices that access a same local area network as the first device; or the first device obtains one or more electronic devices that are logged in to by using a same account as the first device. Further, the first device may present the obtained one or more electronic devices in the first device list for the user to select, so that the user can select, by inputting the preset symbol, a device in which a service that needs to be shared is located.

In a possible implementation, before that the first device displays a service list provided by the second device, the method further includes: The first device obtains a service list corresponding to the second device. For example, the first device may obtain, by interacting with the second device, the service list including the one or more services provided by the second device. For another example, the first device may obtain, by interacting with a first server, the service list including the one or more services provided by the second device. Certainly, the service list corresponding to the second device may be further pre-stored in the first device. This is not limited in embodiments of this application.

In a possible implementation, before that the first device sends a first chat message in the chat interface, the method further includes: The first device obtains first service content corresponding to the first service. For example, the first device may obtain, by interacting with the second device, the first service content corresponding to the first service. For another example, the first device may obtain, by interacting with a second server, the service list including the one or more services provided by the second device. The first server may be the same as or different from the second server.

In a possible implementation, that the first device displays a first device list includes: The first device may display the first device list in the chat interface, that is, after the user inputs the preset symbol into the input box in the chat interface, the first device may continue to display the first device list in the chat interface without performing page jumping; or the first device may jump from the chat interface to a reminder interface, and display the first device list in the reminder interface. Certainly, the reminder interface may further include another contact such as a friend of the user or an official account. This is not limited in embodiments of this application.

In a possible implementation, the reminder interface may be in a folded state or an expanded state. When the reminder interface is in the folded state, the reminder interface may block some content in the chat interface, so that the user can view the first device list in the folded reminder interface, and can also view content in the chat interface. When the reminder interface is in the folded state, the user can further display the reminder interface in the expanded state by tapping a preset expand button, so that the reminder interface fully blocks the chat interface.

In a possible implementation, that the first device displays a service list provided by the second device includes: The first device may display, in the reminder interface, the service list provided by the second device; or the first device may not only display, in the reminder interface, the service list provided by the second device, but also display, in the reminder interface, service content of each service in the service list. In this way, after selecting the second device, the user can preview, in the reminder interface, specific service content of each service provided by the second device, to selectively select a corresponding service and share the service with a contact in the chat interface. Certainly, the first device may alternatively display, in the chat interface, the service list provided by the second device. This is not limited in embodiments of this application.

In a possible implementation, in response to an operation of selecting a second device from the first device list by the user, the method further includes: The first device displays an application list provided by the second device, where the application list includes one or more applications. That the first device displays a service list provided by the second device includes: The first device displays, in response to an operation of selecting a first application from the application list by the user, a service list provided by the first application in the second device. In other words, after selecting the second device, the user can first select an application by which a service is provided and needs to be shared and that is in the second device, and then select a service that is in the application and that is to be shared, so that the user can share the service with the contact by using the application as a dimension.

In a possible implementation, the first service content corresponds to a first play link. After that the first device sends a first chat message in the chat interface, the method further includes: detecting, by the first device, a first enable operation of enabling the first service content by the user in the first chat message; and in response to the first enable operation, enabling the first service content through the first play link. In other words, after the user shares the first service content with the contact in a form of a chat message, the user can also enable the shared first service content.

In a possible implementation, the enabling the first service content through the first play link includes: If the first play link is a local link of the first service content in the first device, the first device enables the first service content in the first device based on the first play link; or if the first play link is an external link of the first service content in the second device, the first device indicates the second device to enable the first service content based on the first play link. In other words, the user can enable, in the first device this time, the first service content shared with the contact, or can enable, in the second device, the first service content shared with the contact.

In a possible implementation, the first chat message further includes a first play button and a second play button that correspond to the first service content, the first play button corresponds to the local link of the first service content in the first device, and the second play button corresponds to the external link of the first service content in the second device. Therefore, when the first enable operation is an operation of tapping the first play button by the user, the first device may enable the first service content in the first device based on the first play link. When the first enable operation is an operation of tapping the second play button by the user, the first device may indicate the second device to enable the first service content based on the first play link. In this way, the user can quickly enable the first service content in the chat interface, and does not need to perform page jumping and selection for a plurality of times.

In a possible implementation, the method further includes: The first device displays, in the chat interface, a second chat message sent by the first contact, where the second chat message includes second service content corresponding to a second service, and a device providing the second service is associated with a device sending the second chat message. In other words, the chat APP in the first device may also receive the second service content shared by the first contact in a form of a chat message, where the second service content may be a service provided by an electronic device of the first contact. The first contact may be a friend in the chat APP, or may be a member in a group.

Subsequently, if the first device detects a second enable operation of enabling the second service content by the user in the second chat message, the first device may play the second service content in a target device in response to the second enable operation. In this way, a receiver of the chat message may also enable the service content in the chat message, and the entire enabling process does not need to jump to another application or device, so that the user can use, across devices, services provided by applications in different electronic devices.

In a possible implementation, after that the first device detects a second open operation of enabling the second service content by the user in the second chat message, the method further includes: The first device displays a second device list, where the second device list includes one or more electronic devices associated with the first device, and the user may select, from the second device list, the target device to enable the second service content; and in response to an operation of selecting a third device from the second device list, the first device determines the third device as the target device.

In a possible implementation, that the first device displays, in the chat interface, a second chat message sent by the first contact includes: The first device determines whether the second service content corresponding to the second service includes video content. If the video content is included, when the first device displays the second chat message in the chat interface, the second chat message may include the second service content and a video identifier corresponding to the second service content. The user may learn, by using the video identifier, that the second service content is the video content, and the user may also enable the second service content by triggering the video identifier. If the video content is not included, when the first device displays the second chat message in the chat interface, a video identifier corresponding to the second service content may not be displayed in the second chat message.

In a possible implementation, that the first device displays, in the chat interface, a second chat message sent by the first contact includes: The first device determines that the second service content corresponding to the second service includes video content. Further, the first device may determine, from one or more electronic devices associated with the first device, one or more candidate devices having a video play function. Further, when displaying the second chat message in the chat interface, the first device may display the second service content and identifiers of the one or more candidate devices in the second chat message. In this way, the user can trigger, by selecting an identifier of a corresponding candidate device, the first device to determine the target device for enabling the second service content this time.

In a possible implementation, the target device may be the first device. In this case, that the first device plays the second service content in a target device includes: The first device may jump from the chat interface to a play interface of the second service content, and enable the second service content in the play interface. For example, the first device may jump from the chat interface to a related interface of an application that provides the second service content, and enable the second service content. Alternatively, the first device may enable the second service content in the chat interface in a form of a small window. In this way, when enabling, in the chat APP, a service shared by a contact, the user does not need to leave a chat interface in a current chat APP, and can further enjoy service content in the service, to improve user experience.

In a possible implementation, after that the first device plays the second service content in a target device, the method further includes: The first device may display, in the chat interface, a prompt message indicating that the second service content is successfully played in the target device. Certainly, if the first device does not successfully play the second service content in the target device, the first device also displays, in the chat interface, a prompt message indicating that the second service content is not successfully enabled.

In a possible implementation, that the first device sends a first chat message in the chat interface includes: The first device displays, in the chat interface, the first chat message and a first user avatar that sends the first chat message, where the first user avatar includes an identifier of the second device. After that the first device sends a first chat message in the chat interface, if the first device displays, in the chat interface, a third chat message and a second user avatar that sends the third chat message, and if the third chat message is unrelated to a service provided by the second device, the second user avatar may not include the identifier of the second device. In other words, when the chat message includes a service provided by a device, an identifier of the device may be added to a user avatar corresponding to the service, to notify the user that the service in the chat message is from a related device.

According to a second aspect, this application provides an electronic device, including a memory, a display, and one or more processors, where the memory, the display, and the processor are coupled. Certainly, the electronic device may further include an input device such as a touch sensor (the touch sensor and the display may be integrated into a touchscreen) or a mouse. The memory is configured to store computer program code, and the computer program code includes computer instructions. When the electronic device runs, the processor is configured to execute one or more computer instructions stored in the memory, so that the electronic device performs the service sharing method according to any one of the first aspect.

According to a third aspect, this application provides a service sharing system. The sharing system includes a first device and a second device. The first device displays a chat interface with a first contact, where the chat interface includes an input box for a chat message. The first device displays a first device list in response to an operation of inputting a preset symbol into the input box by a user, where the first device list includes one or more electronic devices associated with the first device. In response to an operation of selecting the second device from the first device list by the user, the first device displays a service list provided by the second device, where the service list includes one or more services provided by the second device. The first device sends a first chat message in the chat interface in response to an operation of selecting a first service from the service list by the user, where the first chat message includes first service content corresponding to the first service.

In a possible implementation, the sharing system may further include at least one of a first server, a second server, or a third server. When the sharing system includes the first server, the first device may be configured to obtain, from the first server, one or more electronic devices associated with the first device. When the sharing system includes the second server, the first device may be configured to obtain, from the second server, a service list corresponding to the second device. When the sharing system includes the third server, the first device may be configured to obtain, from the third server, the first service content corresponding to the first service.

In a possible implementation, the sharing system further includes a third device, and the third device may be configured to receive the first chat message sent by the first device.

According to a fourth aspect, this application provides a computer-readable storage medium, including computer instructions. When the computer instructions are run on the foregoing electronic device, the electronic device is enabled to perform the multi-screen collaboration method according to any one of the foregoing implementations.

According to a fifth aspect, this application provides a computer program product. When the computer program product runs on the foregoing electronic device, the electronic device is enabled to perform the multi-screen collaboration method according to any one of the foregoing implementations.

It may be understood that the electronic device, the sharing system, the computer-readable storage medium, and the computer program product provided in the foregoing aspects are all applied to the corresponding methods provided above. Therefore, for beneficial effects that can be achieved by the electronic device, the sharing system, the computer-readable storage medium, and the computer program product, refer to the beneficial effects in the corresponding systems or methods provided above. Details are not described herein again.

DETAILED DESCRIPTION OF ILLUSTRATIVE EMBODIMENTS

The following describes implementations of embodiments in detail with reference to accompanying drawings.

A service sharing method provided in embodiments of this application may be applied to a sharing system 200. The sharing system 200 may include one or more electronic devices and one or more servers. The electronic device may be specifically a mobile phone, a tablet computer, a television (which may also be referred to as a smart screen, a large-screen device, or the like), a notebook computer, an ultra-mobile personal computer (Ultra-mobile Personal Computer, UMPC), a handheld computer, a netbook, a personal digital assistant (Personal Digital Assistant, PDA), a wearable electronic device, a vehicle-mounted device (which may also be referred to as an automobile head unit), a virtual reality device, or the like. This is not limited in embodiments of this application.

Figure 1A:
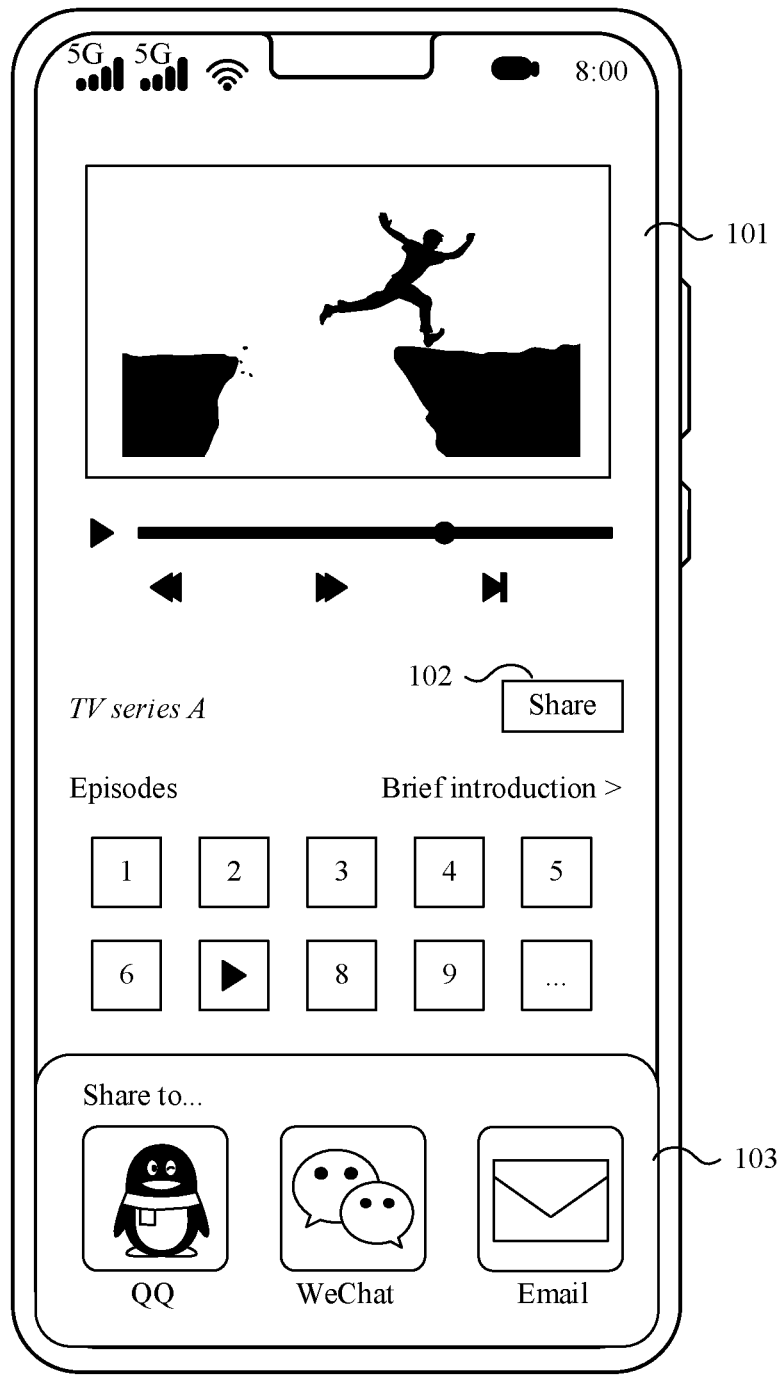
FIG. 1(a) to FIG. 1(c) are a schematic diagram of an application scenario for sending a chat message in the conventional technology.
Figure 1B:
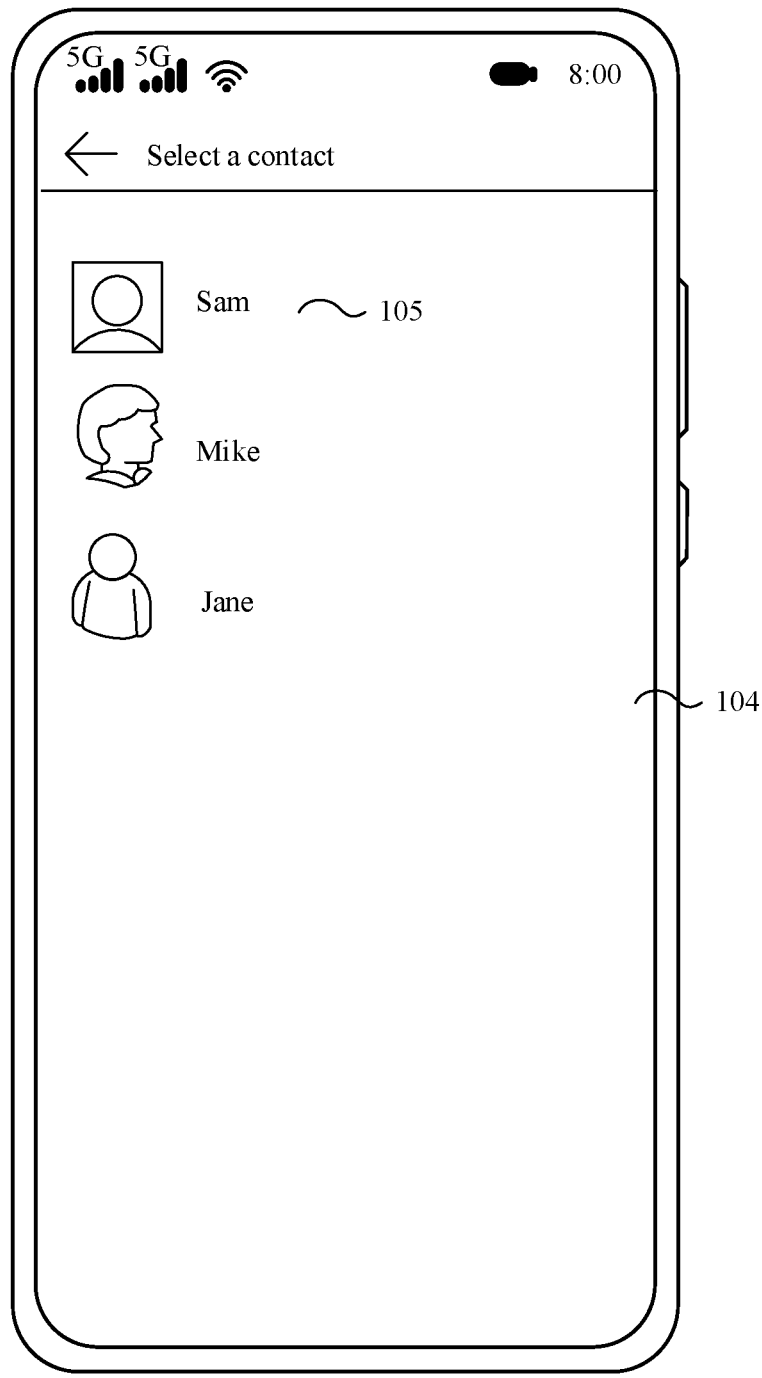
Figure 1C:
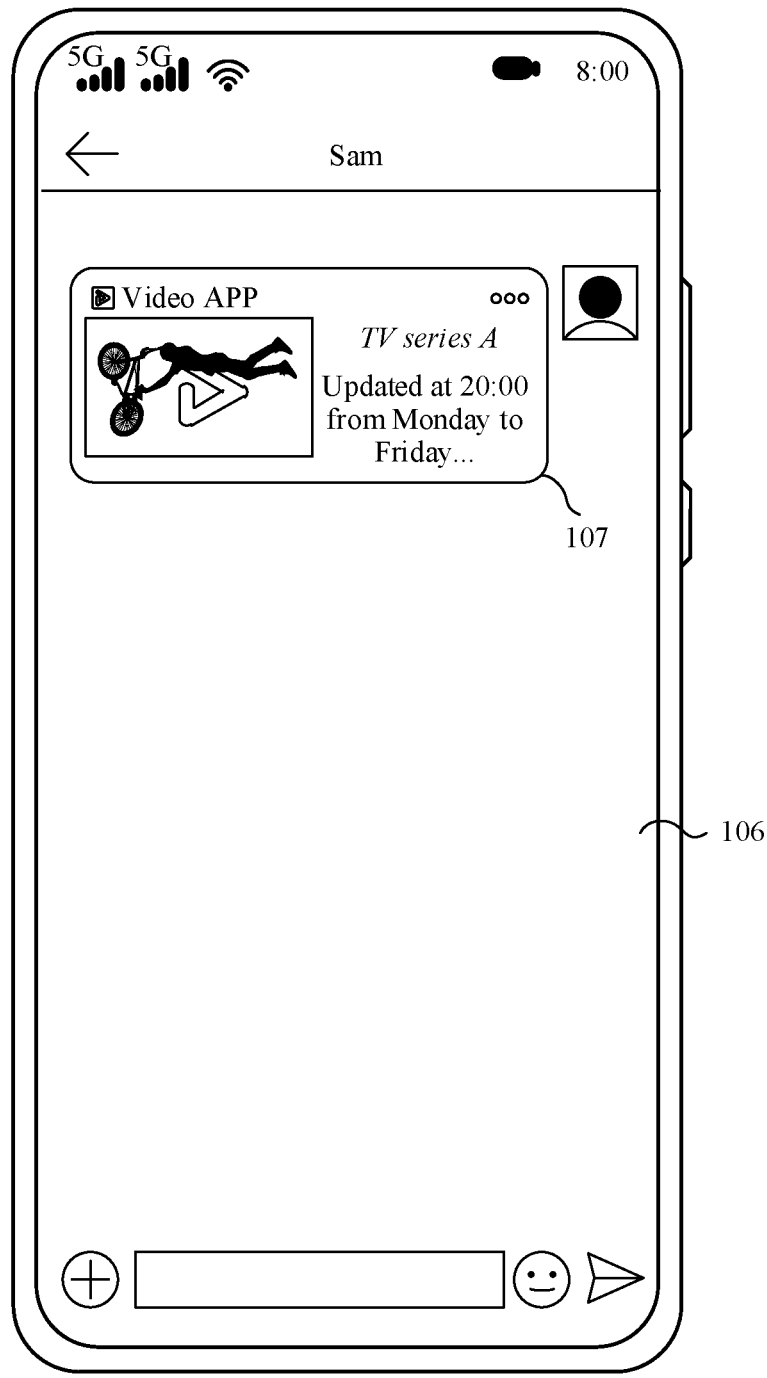
Figure 2:
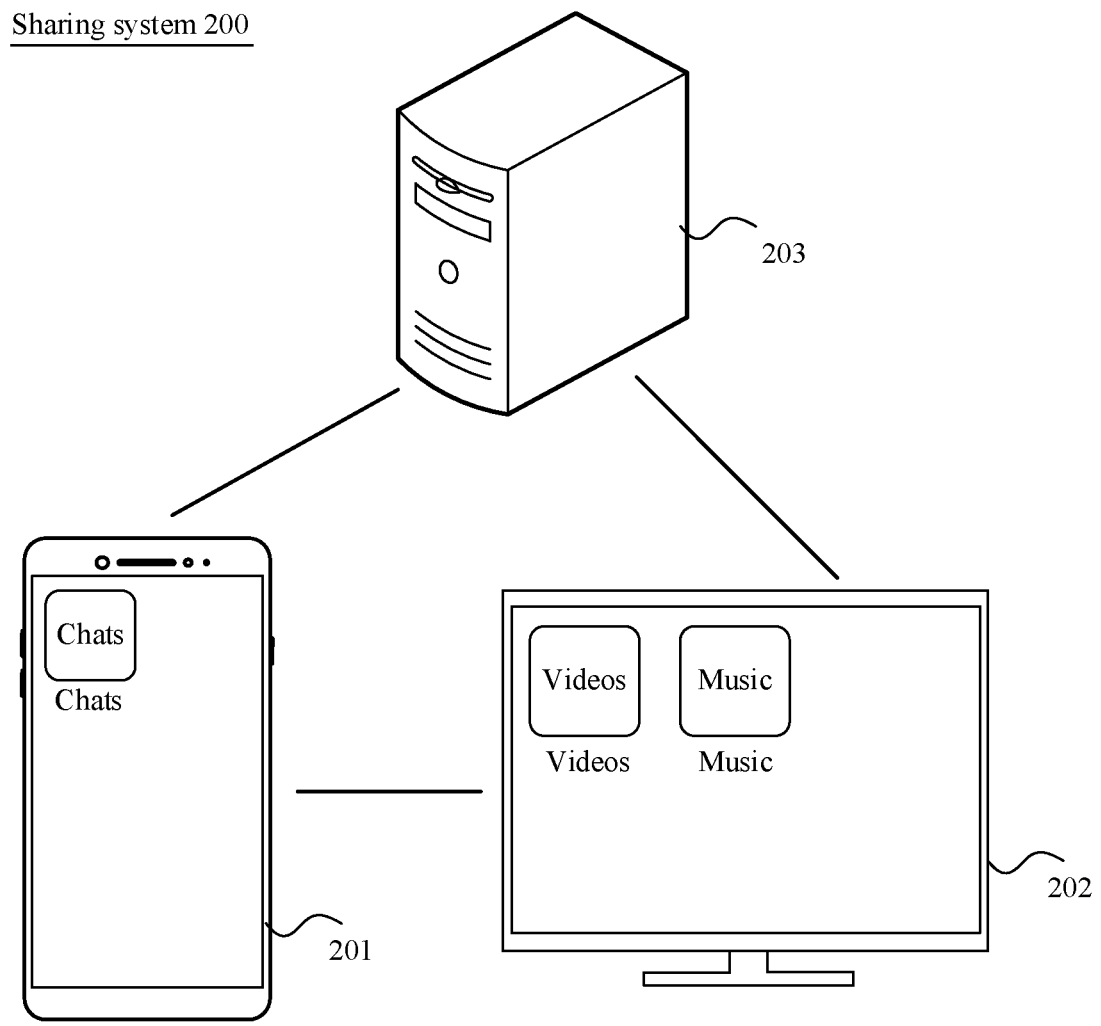
FIG. 2 is a schematic diagram of an architecture of a sharing system according to an embodiment of this application.

For example, as shown in FIG. 2, the sharing system 200 includes a mobile phone 201, a television 202, and a server 203. The mobile phone 201 and the television 202 may interact with each other by accessing a same communication network. For example, the mobile phone 201 and the television 202 may be located in a same Wi-Fi network, and interact with each other by using the Wi-Fi network. For another example, the mobile phone 201 and the television 202 may be logged in to by using a same account (for example, a Huawei account), and interact with each other by using a server corresponding to the account. The server may be the server 203 in the sharing system 200, or may be another server.

An application (referred to as a chat APP subsequently) having a chat function may be installed in the mobile phone 201. A user may use the chat APP to exchange a chat message with a chat object in the chat APP such as an added friend, a group, or an unadded stranger. Certainly, the user may also use the chat APP to exchange a chat message with a chat object such as an official account, a robot, or an applet provided by the chat APP. In subsequent embodiments, a chat object with which a user exchanges a chat message in a chat APP is uniformly referred to as a contact.

Applications such as a music APP and a video APP may be installed in the television 202. The video APP is used as an example. The video APP provides application services such as playing, sharing, message leaving, and adding-to-favorites of various video files. The user can enable the video APP in the television to use these application services provided by the video APP. To be specific, the application service is a service business provided by an application for the user to implement a specific function. When running an application service, the video APP in the television may upload service content in the application service to the server 203. For example, if the user adds a TV series A to favorites when the video APP in the television is running, the video APP may add the TV series A to favorites content of the user in response to an adding-to-favorites operation of the user, and notify the server 203 that the TV series A is added to the favorites content of the user, so that the server 203 updates the favorites content of the user in the video APP.

In some embodiments, in addition to providing an application service related to an application for the user, the television 202 may further provide one or more services related to the device, namely, the television 202 for the user. For example, the television 202 may further provide, for the user, a device service, namely, a function such as volume controlling, brightness controlling, channel switching, power-off, or power-on of the television 202, or the television 202 may further provide, for the user, a system service such as a voice assistant or taking a screenshot. This is not limited in embodiments of this application.

In embodiments of this application, when using the chat APP in the mobile phone 201 to chat with a contact, the user may share a service provided by the television 202 with the corresponding contact. The service may be the foregoing application service, system service, or device service. In subsequent embodiments, an example in which the application service in the television 202 is shared is used for description.

Figure 3:
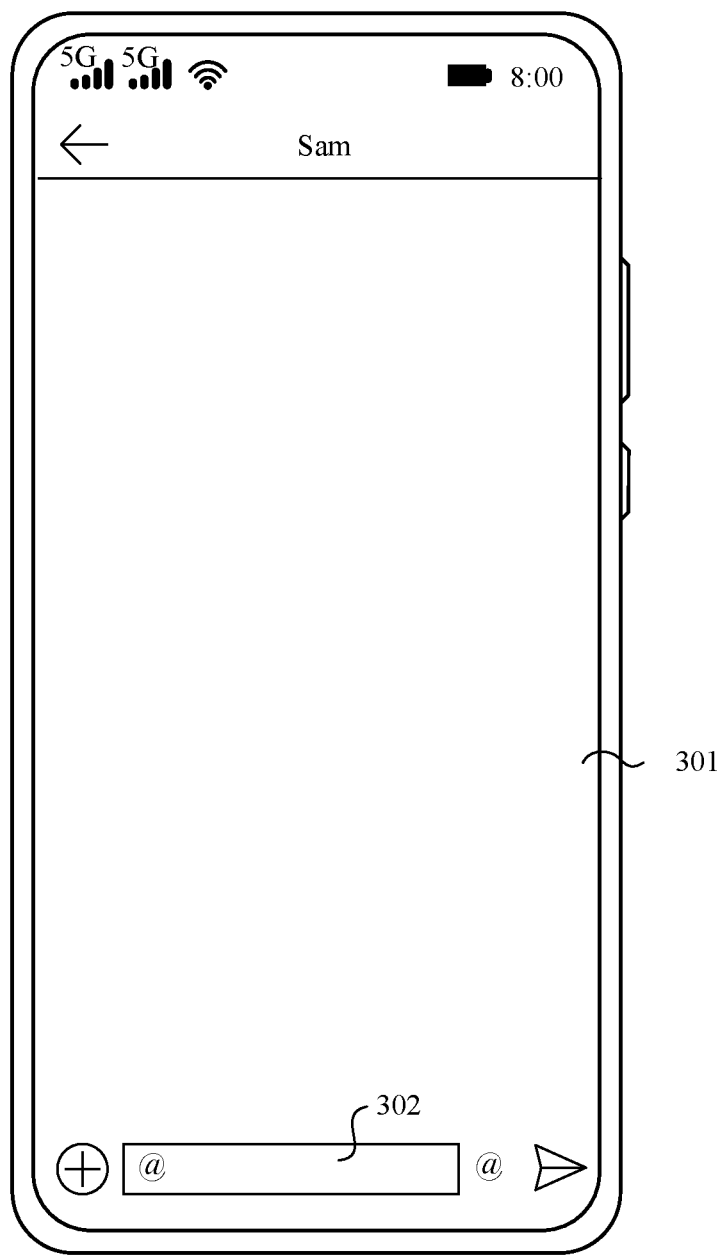
FIG. 3 is a schematic diagram 1 of an application scenario for a service sharing method according to an embodiment of this application.

For example, as shown in FIG. 3, the mobile phone 201 may display a chat interface 301 with a contact (for example, a contact Sam) in the chat APP, and the chat interface 301 includes an input box 302 for a chat message. If the user wants to share, with the contact Sam, a related application service provided by the video APP in the television 202, the user may output a preset symbol into the input box 302. For example, the preset symbol may be "@". The user may input the preset symbol into the input box 302 by using a keyboard, a button, a voice, or another manner. This is not limited in embodiments of this application. In some embodiments, the preset symbol may also be referred to as a reminder symbol. In subsequent embodiments, an example in which the reminder symbol is used as the preset symbol is used for description.

After detecting that the user inputs the reminder symbol "@" into the input box 302, the mobile phone 201 may obtain an electronic device currently associated with the mobile phone 201. The electronic device associated with the mobile phone 201 may be specifically one or more electronic devices that are logged in to by using a same account as the mobile phone 201, or one or more electronic devices that access a same communication network (for example, a Wi-Fi network or a Bluetooth network) as the mobile phone 201. Certainly, the electronic device associated with the mobile phone 201 may be another electronic device, for example, an electronic device bound to a familiarity number with the mobile phone 201, or an electronic device that handles a same service as the mobile phone 201. This is not limited in embodiments of this application.

Figure 4:
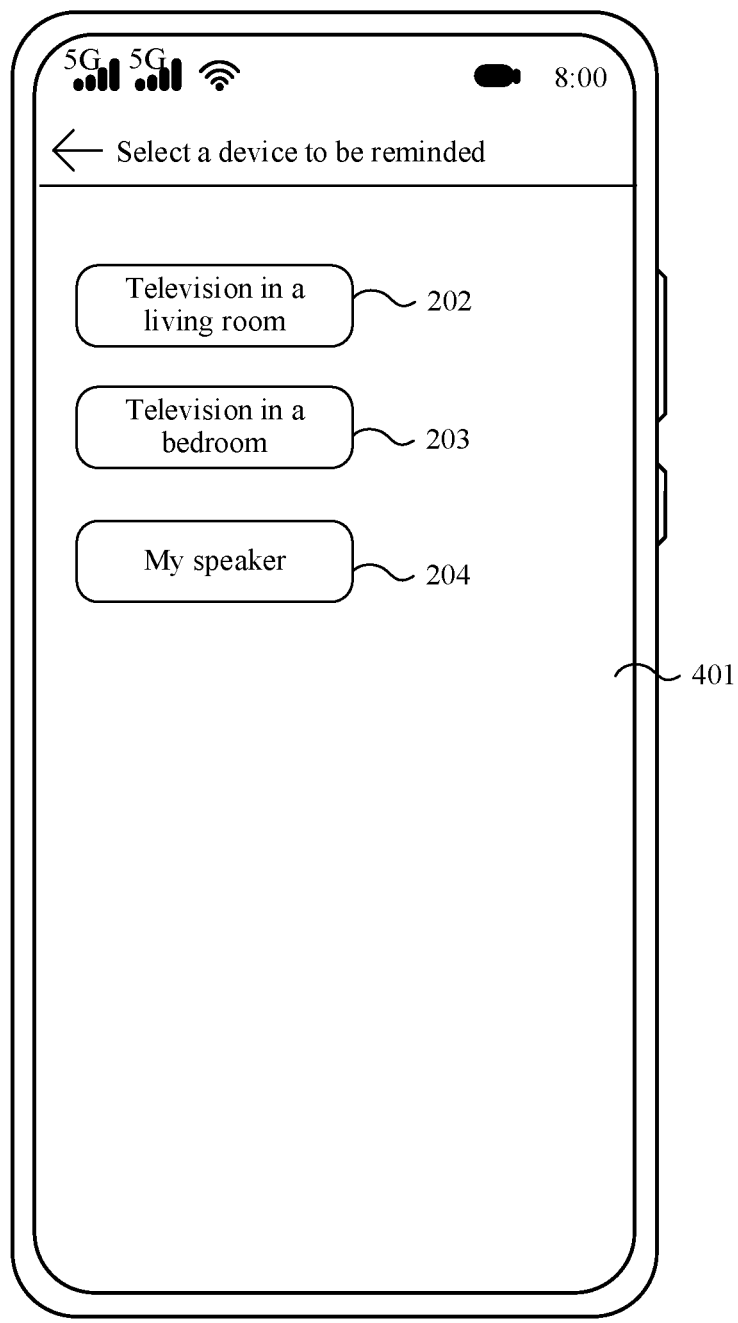
FIG. 4 is a schematic diagram 2 of an application scenario for a service sharing method according to an embodiment of this application.

For example, the mobile phone 201 may detect another electronic device located in a same Wi-Fi network as the mobile phone 201. For another example, the mobile phone 201 may obtain, from a server (for example, the server 203), another electronic device that is logged in to by using a same account as the mobile phone 201. Further, as shown in FIG. 4, the mobile phone 201 may display one or more detected electronic devices in a selection interface 401 (which may also be referred to as a reminder interface) in the chat APP. For example, the mobile phone 201 may display the detected television 202, television 203, and speaker 204 in the selection interface 401. In this way, the user can select, from the selection interface 401, an electronic device of which an application service is to be shared. Certainly, the selection interface 401 may further include a contact in the chat APP. This is not limited in embodiments of this application.

Figure 5:
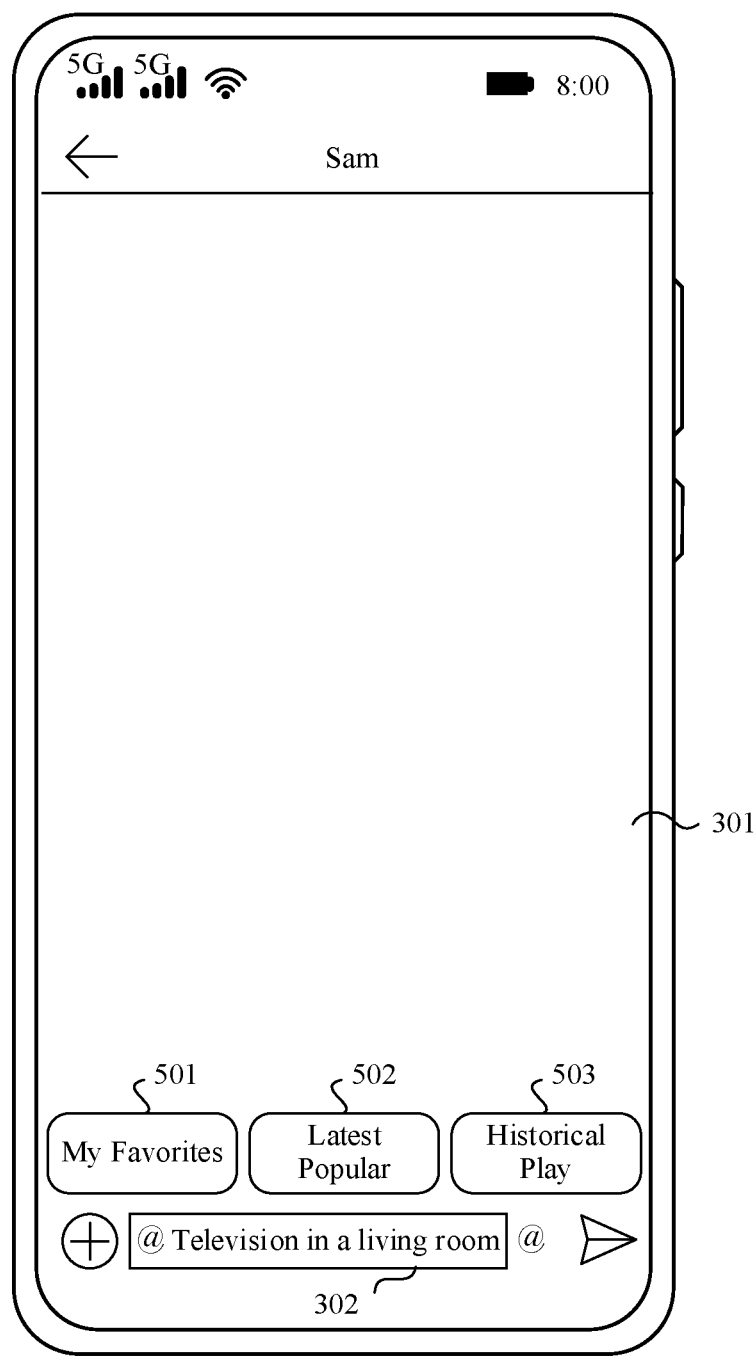
FIG. 5 is a schematic diagram 3 of an application scenario for a service sharing method according to an embodiment of this application.

For example, the user selects the television 202 from the selection interface 401. After the mobile phone 201 detects that the user taps the television 202 in the selection interface 401, it indicates that the user wants to share an application service provided by the television 202 with the contact Sam. As shown in FIG. 5, the mobile phone 201 may return to the chat interface 301, and input, into the input box 302 of the chat interface 301, "the television 202" selected by the user. In addition, the mobile phone 201 may display, in the chat interface 301, one or more application services provided by the television 202. For example, the mobile phone 201 may display, near the input box 302, three application services: "My Favorites" 501, "Latest Popular" 502, and "Historical Play" 503, provided by the video APP in the television 202 for the user to select.

For example, a developer may preset, in the server 203, application service lists corresponding to electronic devices of different types. For example, for a large-screen electronic device of a television type, it may be set that a corresponding application service list includes the three application services: "My Favorites" 501, "Latest Popular" 502, and "Historical Play" 503. The three application services may be from the video APP. For another example, for an audio output device of a speaker type, it may be set that a corresponding application service list includes two application services: "Frequently Listen" and "Best Album". The two application services may be from the music APP. After the mobile phone 201 detects that the user selects the television 202 from the selection interface 401, the mobile phone 201 may send a request to the server 203 to request to obtain an application service list corresponding to the television 202. Further, in response to the request, the server 203 may obtain a corresponding application service list based on a device type of the television 202, and send the obtained application service list to the mobile phone 201. In this way, the mobile phone 201 may display an application service in the application service list in the chat interface 301 shown in FIG. 5.

Figure 6:
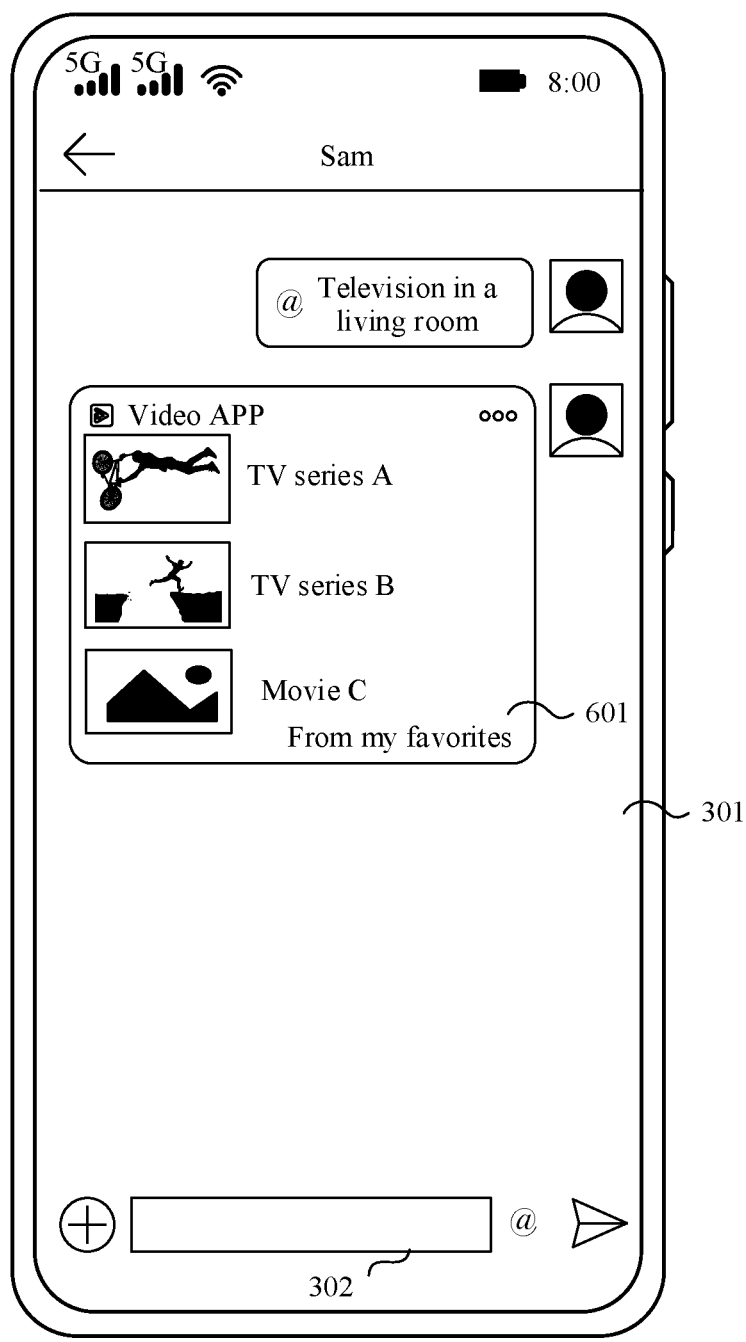
FIG. 6 is a schematic diagram 4 of an application scenario for a service sharing method according to an embodiment of this application.

Still as shown in FIG. 5, the user may select, from the three application services: "My Favorites" 501, "Latest Popular" 502, and "Historical Play" 503, a specific application service that needs to be shared with the contact Sam. For example, if it is detected that the user selects the application service "My Favorites" 501, the mobile phone 201 may send a query instruction corresponding to "My Favorites" 501 to the server 203, so that the server 203 may query, based on the query instruction, specific favorites content that is added to favorites by the user by using the video APP in the television 202. For example, the user adds a TV series A, a TV series B, and a movie C to favorites. Further, the server 203 may send the queried specific favorites content to the mobile phone 201. After the mobile phone 201 receives the specific favorites content that is sent by the server 203 and that corresponds to "My Favorites" 501, as shown in FIG. 6, the chat APP in the mobile phone 201 may send the favorites content to the contact Sam in a form of a chat message 601. In this case, the mobile phone 201 may display, in the chat interface 301, the chat message 601 including the foregoing favorites content.

It may be learned that, when the user chats with a contact, by entering the reminder symbol "@", the user can trigger the mobile phone 201 to quickly display a related electronic device in the chat APP for the user to select. After the user selects an electronic device, the mobile phone 201 may continue to display, in the chat APP, an application service provided by the electronic device for the user to select. After the user selects an application service, the chat APP may share specific service content of the application service with the contact in a form of a chat message, so that the mobile phone 201 may share an application service in another electronic device with the contact, to implement cross-device sharing of the application service. In addition, in an entire sharing process, the user does not need to jump from the chat APP to another application or another electronic device, so that operations in the entire sharing process are simple, to improve user experience.

It should be noted that, in addition to sharing the application service provided by the video APP in the television 202 with the contact, an application service provided by another application in the television 202 may also be shared with the contact. For example, it may be preset in the server 203 that an application service list corresponding to an electronic device of a television type further includes a latest game provided in a game APP. In this way, after obtaining the application service list, the mobile phone 201 may further display an option "Latest Game" in the chat interface. If the user selects the option "Latest Game", the mobile phone 201 may interact with the server 203 to obtain a latest game provided by the game APP in the television 202, and send a link of the game to the mobile phone 201, so that the mobile phone 201 may share the latest game provided by the game APP in the television 202 with the contact in a form of a chat message.

In addition, in addition to setting the reminder symbol to "@", a person skilled in the art may set one or more other characters as the reminder symbol based on actual experience or an actual application scenario. For example, the reminder symbol may be "#", "+", or "+device". This is not limited in embodiments of this application.

A specific method for sharing an application service with a contact is described in subsequent embodiments with reference to specific examples, and therefore details are not described herein again.

Figure 7:
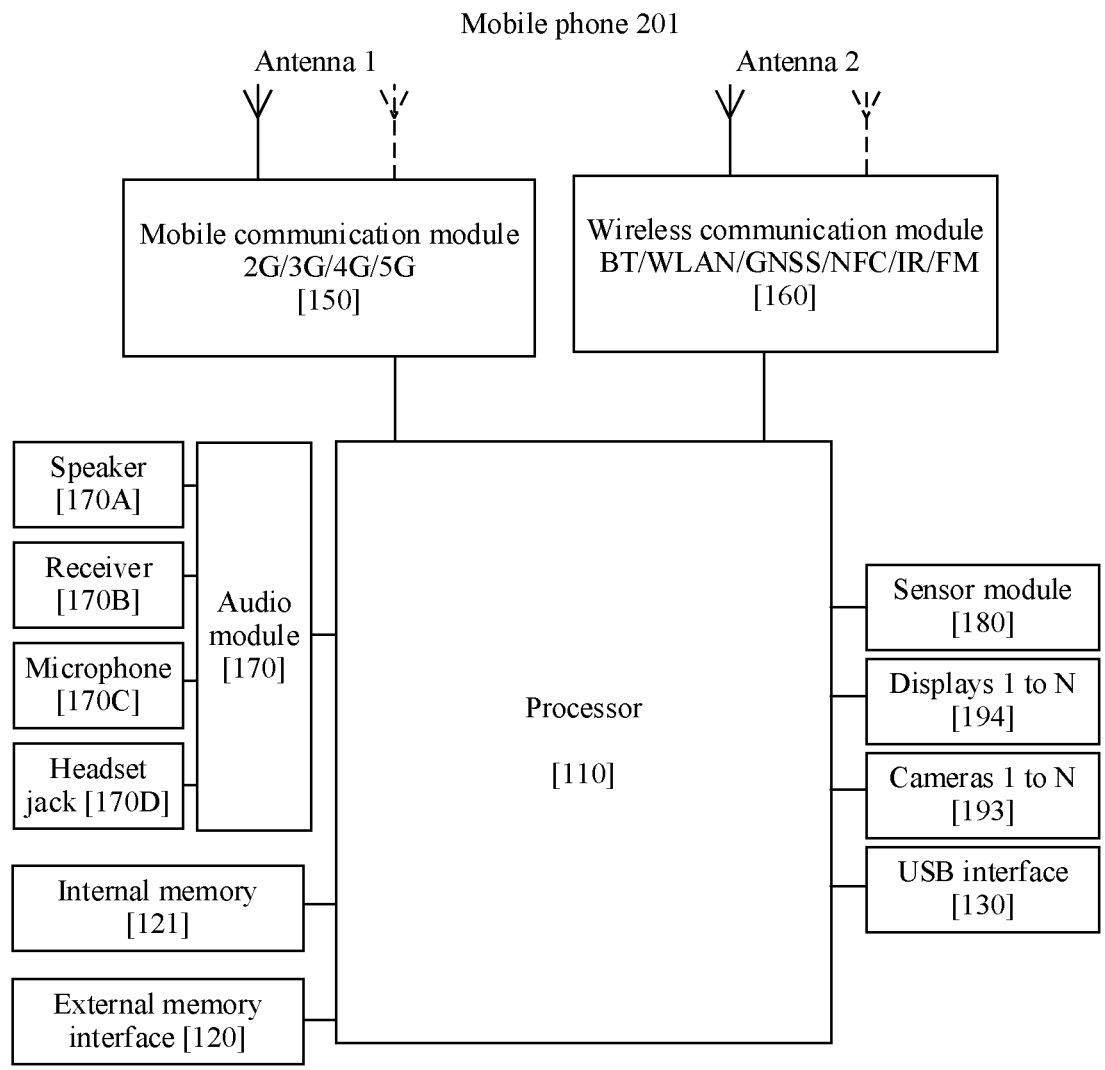
FIG. 7 is a schematic diagram 1 of a structure of an electronic device according to an embodiment of this application.

An example in which the mobile phone 201 is used as an electronic device in the sharing system 200 is still used. FIG. 7 is a schematic diagram of a structure of the mobile phone 201.

The mobile phone 201 may include a processor 110, an external memory interface 120, an internal memory 121, a universal serial bus (universal serial bus, USB) interface 130, an antenna 1, an antenna 2, a mobile communication module 150, a wireless communication module 160, an audio module 170, a speaker 170A, a receiver 170B, a microphone 170C, a headset jack 170D, a sensor module 180, and the like.

It can be understood that the structure shown in this embodiment of the present invention does not constitute a specific limitation on the mobile phone 201. In some other embodiments of this application, the mobile phone 201 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access and reduces waiting time of the processor 110, thereby improving system efficiency.

A wireless communication function of the mobile phone 201 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 201 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the mobile phone 201 and that includes wireless communications such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The wireless communication module 160 may provide a solution that is applied to the mobile phone 201 and that includes wireless communications such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the mobile phone 201, the antenna 1 and the mobile communication module 150 are coupled, and the antenna 2 and the wireless communication module 160 are coupled, so that the mobile phone 201 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The mobile phone 201 implements a display function by using the GPU, a display 194, the application processor, and the like. The GPU is a microprocessor for image processing, and is connected to the display 194 and the application processor. The GPU is configured to perform mathematical and geometrical calculation, and is configured to render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the mobile phone 201 may include one or N displays 194, where N is a positive integer greater than 1.

The mobile phone 201 may implement a photographing function by using the ISP, a camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 201 may include one or N cameras 193, where N is a positive integer greater than 1.

The digital signal processor is configured to process a digital signal, and may process another digital signal in addition to a digital image signal. For example, when the mobile phone 201 selects a frequency, the digital signal processor is configured to perform Fourier transform on frequency energy, and the like.

The video codec is configured to compress or decompress a digital video. The mobile phone 201 may support one or more video codecs. In this way, the mobile phone 201 can play or record videos in a plurality of coding formats, for example, moving picture experts group (moving picture experts group, MPEG)-1, MPEG-2, MPEG-3, and MPEG-4.

The external memory interface 120 may be configured to connect to an external storage card, for example, a micro SD card, to extend a storage capability of the mobile phone 201. The external storage card communicates with the processor 110 through the external memory interface 120, to implement a data storage function. For example, files such as music and videos are stored in the external storage The internal memory 121 may be configured to store computer-executable program code. The executable program code includes instructions. The processor 110 runs the instructions stored in the internal memory 121, to perform various function applications of the mobile phone 201 and data processing. The internal memory 121 may include a program storage area and a data storage area. The program storage area may store an operating system, an application required by at least one function (for example, a voice playing function or an image playing function), and the like. The data storage area may store data (such as audio data and an address book) and the like created during use of the mobile phone 201. In addition, the internal memory 121 may include a high-speed random access memory, or may include a non-volatile memory, for example, at least one magnetic disk storage device, a flash memory, or a universal flash storage (universal flash storage, UFS).

The mobile phone 201 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The mobile phone 201 may be used to listen to music or answer a call in a hands-free mode over the speaker 170A.

The receiver 170B, also referred to as an "earpiece", is configured to convert an audio electrical signal into a sound signal. When the mobile phone 201 answers a call or receives voice information, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the mobile phone 201. In some other embodiments, two microphones 170C may be disposed in the mobile phone 201, to collect a sound signal and further implement a noise reduction function. In some other embodiments, three, four, or more microphones 170C may alternatively be disposed in the mobile phone 201, to collect a sound signal, implement noise reduction, identify a sound source, implement a directional recording function, and the like.

The headset jack 170D is configured to connect to a wired headset. The headset jack 170D may be the USB interface 130 or may be a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the mobile phone 201 may further include a charging management module, a power management module, a battery, a button, an indicator, one or more SIM card interfaces, and the like. This is not limited in this embodiment of this application.

A software system of the mobile phone 201 may use a layered architecture, an event-driven architecture, a microkernel architecture, a microservice architecture, or a cloud architecture. In this embodiment of this application, an Android system of a layered architecture is used as an example to describe a software structure of the mobile phone 201.

Figure 8:
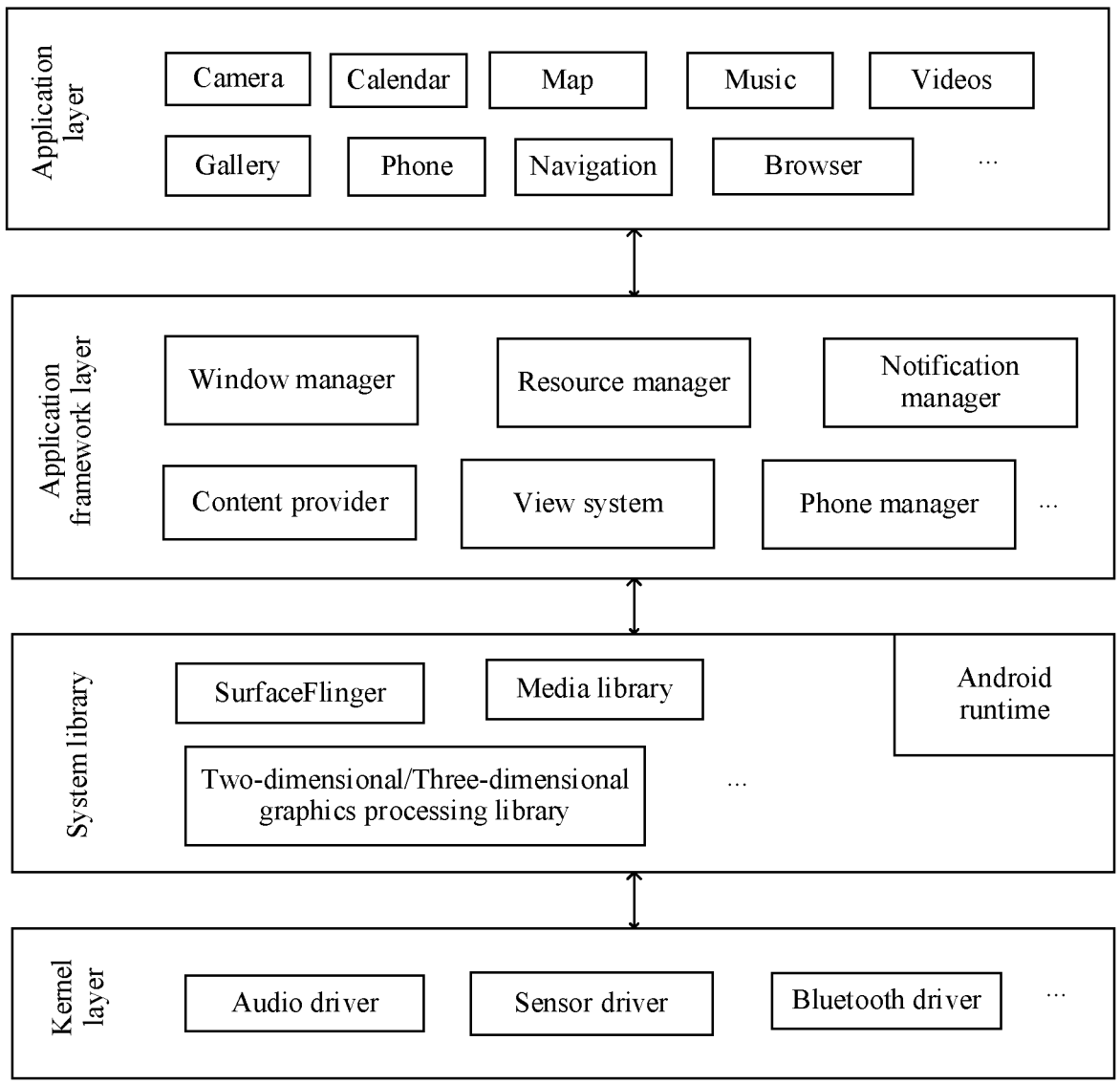
FIG. 8 is a schematic diagram of an architecture of an operating system in an electronic device according to an embodiment of this application.

FIG. 8 is a block diagram of the software structure of the mobile phone 201 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 8, applications (applications, APPs) such as Phone, Memo, Browser, Contacts, Camera, Gallery, Calendar, Map, Bluetooth, Music, Videos, and Messages may be installed at the application layer.

The application framework layer provides an application programming interface (application programming interface, API) and a programming framework for an application at the application layer. The application framework layer includes some predefined functions.

As shown in FIG. 8, the application framework layer may include a window manager, a content provider, a view system, a phone manager, a resource manager, a notification manager, and the like.

The window manager is used to manage a window program. The window manager may obtain a size of a display, determine whether there is a status bar, perform screen locking, take a screenshot, and the like.

The content provider is used to store and obtain data, and enable the data to be accessed by an application. The data may include a video, an image, an audio, calls that are made and answered, a browsing history and bookmarks, an address book, and the like.

The view system may be used to construct a display interface of an application. Each display interface may include one or more controls. Generally, the controls may include interface elements such as an icon, a button, a menu, a tab, a text box, a dialog box, a status bar, a navigation bar, and a widget (Widget).

The phone manager is used to provide a communication function of the mobile phone 201, for example, management of a call status (including answering, declining, or the like).

The resource manager provides various resources for an application, such as a localized character string, an icon, a picture, a layout file, and a video file.

The notification manager enables an application to display notification information in a status bar, and may be used to convey a notification message. The notification manager may automatically disappear after a short pause without requiring user interaction. For example, the notification manager is used to notify download completion, give a message notification, and the like. The notification manager may alternatively be a notification that appears in a top status bar of the system in a form of a graph or a scroll bar text, for example, a notification of an application that is run in a background, or may be a notification that appears on a screen in a form of a dialog window. For example, text information is displayed in the status bar, an alert sound is played, vibration is generated, or an indicator light blinks.

As shown in FIG. 8, the system library may include a plurality of function modules, for example, SurfaceFlinger (SurfaceFlinger), a media library (Media Library), a three-dimensional graphics processing library (for example, OpenGL ES), and a 2D graphics engine (for example, SGL). The SurfaceFlinger is used to manage a display subsystem and provide integration of 2D and 3D layers for a plurality of applications. The media library supports playback and recording in a plurality of commonly used audio and video formats, static image files, and the like. The media library may support a plurality of audio and video encoding formats, for example, MPEG-4, H.264, MP3, AAC, AMR, JPG, and PNG. The three-dimensional graphics processing library is used to implement three-dimensional graphics drawing, image rendering, composition, layer processing, and the like. The 2D graphics engine is a drawing engine for 2D drawing.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The kernel layer is a layer between hardware and software. The kernel layer includes at least a camera driver, an audio driver, a sensor driver, and the like. This is not limited in this embodiment of this application.

Figure 9:
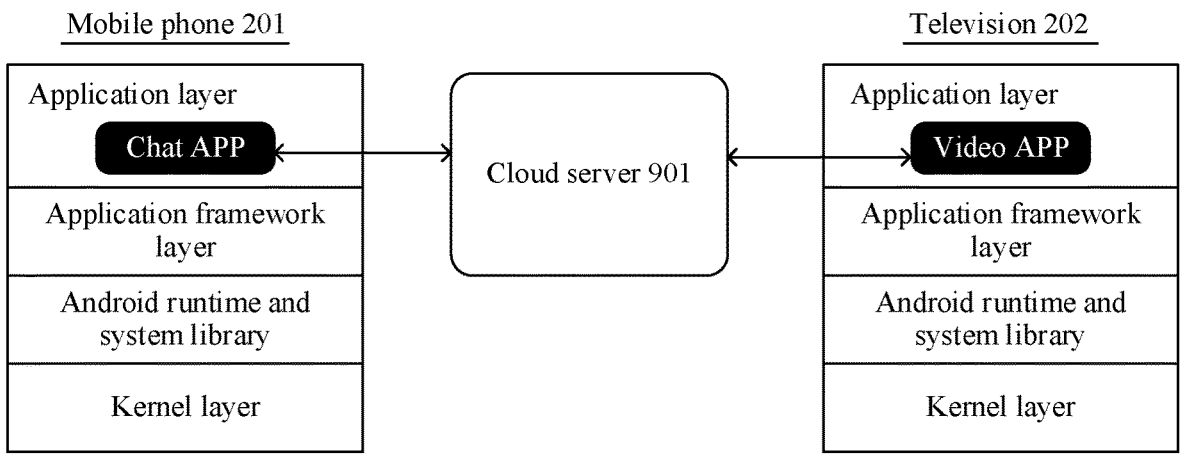
FIG. 9 is a schematic diagram 1 of interaction between an electronic device and a server according to an embodiment of this application.

In an embodiment of this application, as shown in FIG. 9, a chat APP having a chat function is installed at an application layer of the mobile phone 201. For example, the chat APP may be a system-level application built in the mobile phone 201, or may be a third-party application such as a WeChat APP or a microblog APP. The chat APP in the mobile phone 201 interacts with a server (for example, a cloud server 901 shown in FIG. 9), and may share an application service provided by an application in another electronic device (for example, the television 202) with a contact in the chat APP.

The cloud server 901 may store application service lists corresponding to different electronic devices. For example, an application service list corresponding to an electronic device of a television type includes three application services: "My Favorites", "Latest Popular", and "Historical Play". The three application services may be from a video APP in a television. For example, the three application services: "My Favorites", "Latest Popular", and "Historical Play" all are from a video APP 1 in the television. Alternatively, the two application services: "My Favorites" and "Latest Popular" are from the video APP 1 in the television, and the application service "Historical Play" is from a video APP 2 in the television.

In addition, the video APP in the television 202 may dynamically update specific service content of the three latest application services: "My Favorites", "Latest Popular", and "Historical Play" to the cloud server 901. For example, when a user adds a new TV series to favorites in the video APP in the television 202, the television 202 may indicate the cloud server 901 to add the TV series to favorites content corresponding to "My Favorites".

In this case, when the chat APP detects that the user uses a preset reminder symbol "@" in a chat interface with a contact to remind an electronic device, for example, the user inputs "@television 202", the chat APP may send a query request 1 to the cloud server 901, to request the cloud server 901 to query an application service corresponding to the television 202. Further, the cloud server 901 may query, in response to the query request 1, the application service corresponding to the television 202, including the three application services: "My Favorites", "Latest Popular", and "Historical Play". In addition, the cloud server 901 may send the queried application service to the chat APP, and the chat APP presents the three application services: "My Favorites", "Latest Popular", and "Historical Play" to the user, so that the user may further select and share a specific application service in the television 202 with the contact.

For example, if the user selects the application service "My Favorites" in the chat APP, the chat APP may send a query request 2 to the cloud server 901, to request the cloud server 901 to query specific favorites content of the application service "My Favorites" in the television 202. The cloud server 901 may send, in response to the query request 2, favorites content corresponding to "My Favorites" in the television 202 to the chat APP, and the chat APP sends the favorites content to the contact in a form of a chat message, to share the favorites content of the video APP in the television 202 to the contact in the chat APP in the mobile phone 201, so as to implement a cross-device application service sharing function.

After the chat APP in the mobile phone displays the favorites content of the video APP in the chat message, a sender of the chat message may open the corresponding favorites content by operating the chat message. In addition, a receiver of the chat message may also open the corresponding favorites content by operating the chat message. This is described in detail in subsequent embodiments, and therefore details are not described herein again.

Figure 10:
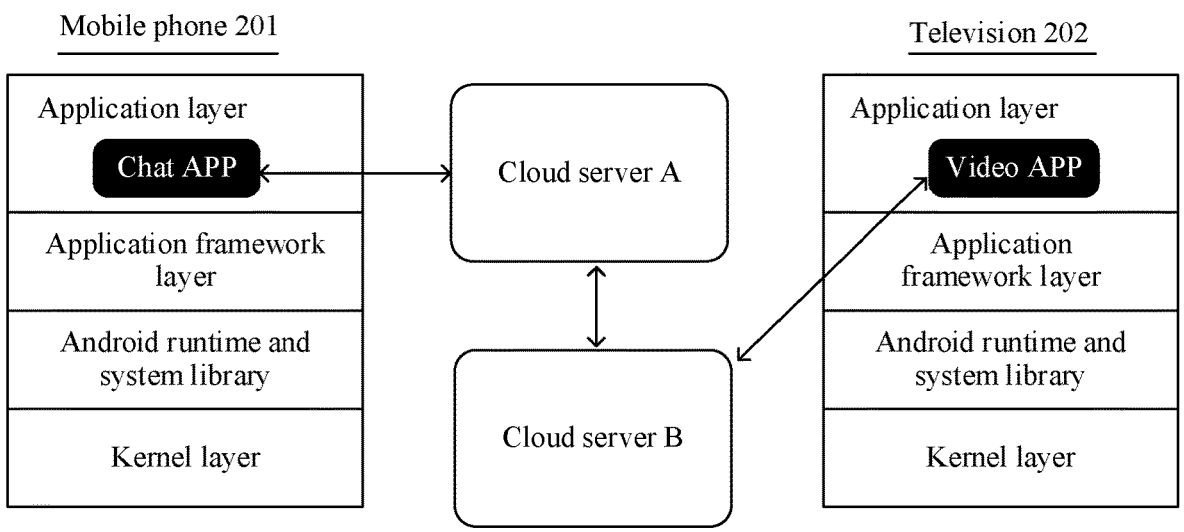
FIG. 10 is a schematic diagram 2 of interaction between an electronic device and a server according to an embodiment of this application.

It should be noted that the cloud server 901 may include one or more servers. For example, as shown in FIG. 10, the cloud server 901 may include a cloud server A corresponding to the chat APP, and the cloud server A stores correspondences between different electronic devices and different application service lists. The chat APP may send the query request 1 to the cloud server A, to request the cloud server A to query an application service corresponding to an electronic device (for example, the television 202) selected by the user. In addition, still as shown in FIG. 10, the cloud server 901 may further include a cloud server B corresponding to the video APP. The cloud server B may provide various video data for the video APP, and record specific service content of an application service such as playing and adding to favorites executed by the user when the user uses the video APP in the television 202. When the chat APP may send the query request 2 to the cloud server A to request to query specific favorites content of the application service "My Favorites" in the television 202, the cloud server A may obtain the specific favorites content from the cloud server B and send the specific favorites content to the chat APP. Certainly, the cloud server 901 may further include another server. For example, the cloud server 901 may further include a cloud server C, and the cloud server C may be configured to maintain account information registered and logged in by the user on each electronic device. This is not limited in this embodiment of this application.

A chat APP in a mobile phone is still used as an example. The following describes in detail the service sharing method provided in embodiments of this application with reference to the accompanying drawings.

Figure 11:
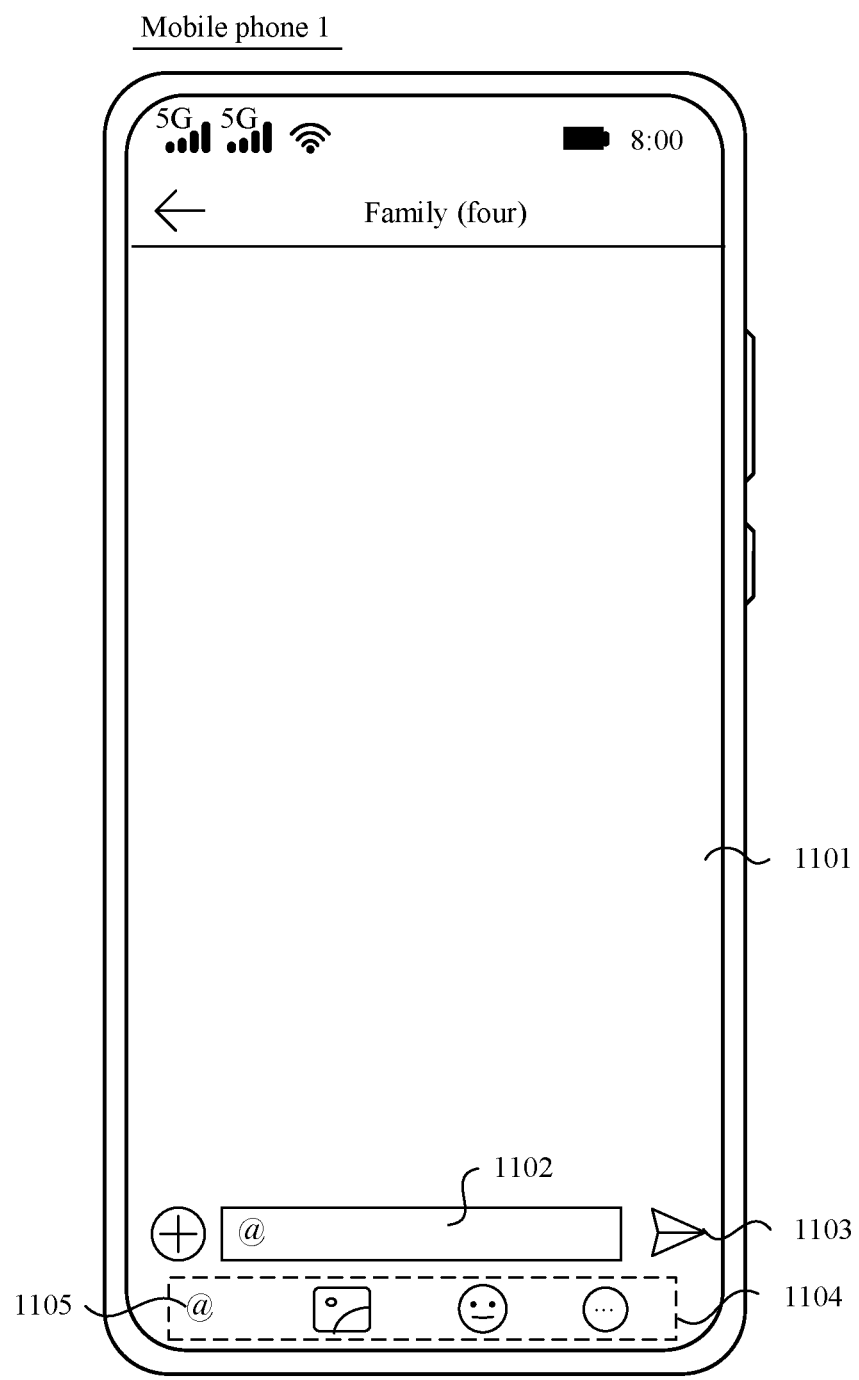
FIG. 11 is a schematic diagram 5 of an application scenario for a service sharing method according to an embodiment of this application.

For example, a user may use the chat APP to chat with a contact in the chat APP. For example, a user Amy may open a group named "Family" in the chat APP. In response to the operation, as shown in FIG. 11, a mobile phone 1 (namely, a mobile phone of the user Amy) may display a chat interface 1101 that is in the chat APP and that is with the "Family" group, and the chat interface 1101 includes an input box 1102 for a chat message and a send button 1103. In some embodiments, the mobile phone 1 may further display, in the chat interface 1101, a shortcut menu 1104 used to input a chat message. For example, the shortcut menu 1104 may include a preset reminder symbol "@" 1105, and the reminder symbol "@" 1105 may be used to establish an association with a contact or an electronic device in the chat message. The preset reminder symbol may alternatively be another character. This is not limited in embodiments of this application. In addition, the shortcut menu 1104 may further include one or more of a picture adding button, an emoticon adding button, or a positioning button.

In embodiments of this application, when the user wants to share an application service in the mobile phone 1 or another electronic device with the "Family" group, the user may associate the corresponding electronic device by using the reminder symbol "@" 1105. For example, after the chat APP detects that the user taps the reminder symbol "@" 1105 in the shortcut menu 1104, the chat APP may trigger the mobile phone 1 to detect an electronic device that currently accesses a same communication network as the mobile phone 1. For example, the mobile phone 1 may send a query request 1 to a first server, so that the first server may query, in response to the query request 1, an electronic device that is logged in to by using a same account as the mobile phone 1. For example, if the mobile phone 1, a television 1, a television 2, and a speaker 3 all are logged in to by an account whose account name is "123", the first server may send device identifiers of the television 1, the television 2, and the speaker 3 to the mobile phone 1. Certainly, the first server may also send a device identifier of the mobile phone 1 to the mobile phone 1. The first server may be one or more servers that are operated by a mobile phone manufacturer and that are configured to maintain user account information. For example, the first server may be the cloud server C.

Figure 12A:
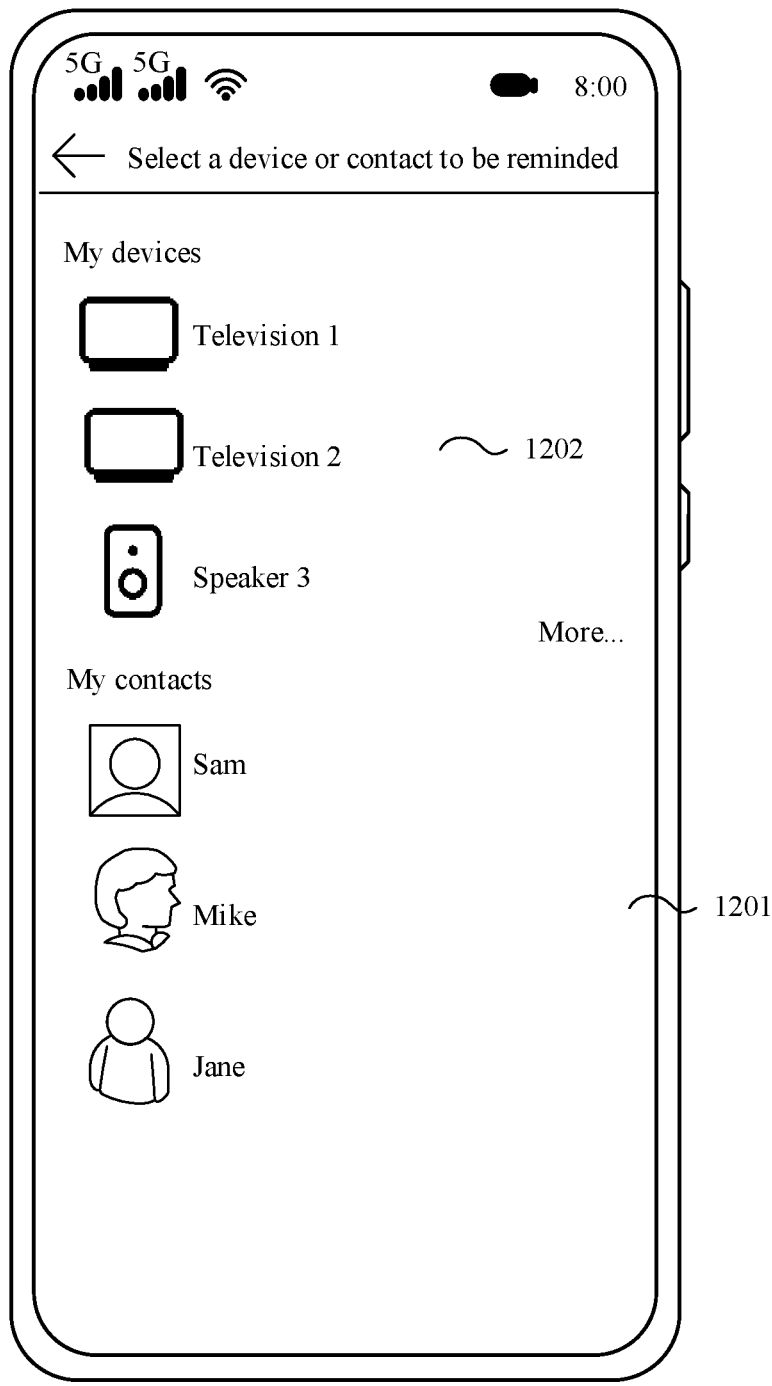
FIG. 12(a) and FIG. 12(b) are a schematic diagram 6 of an application scenario for a service sharing method according to an embodiment of this application.

Further, the mobile phone 1 may transfer the received one or more device identifiers to the chat APP, and the chat APP displays a corresponding device list based on the received device identifier. For example, as shown in FIG. 12(a), the chat APP may jump from the chat interface 1101 to a reminder interface 1201, and display, in the reminder interface 1201, a device list 1202 of electronic devices that access a same communication network as the mobile phone 1. For example, the device list 1202 may include three electronic devices: a television 1, a television 2, and a speaker 3. Alternatively, the device list 1202 may include the mobile phone 1 (namely, local device). The user may select, from the device list 1202, an electronic device of which an application service is to be shared. In some embodiments, the chat APP may also display another contact in the chat APP in the reminder interface 1201, for example, a recently contacted friend, group, or applet. Similarly, the user may select, from the reminder interface 1201, a contact that needs to be reminded in a chat message.

Figure 12B:
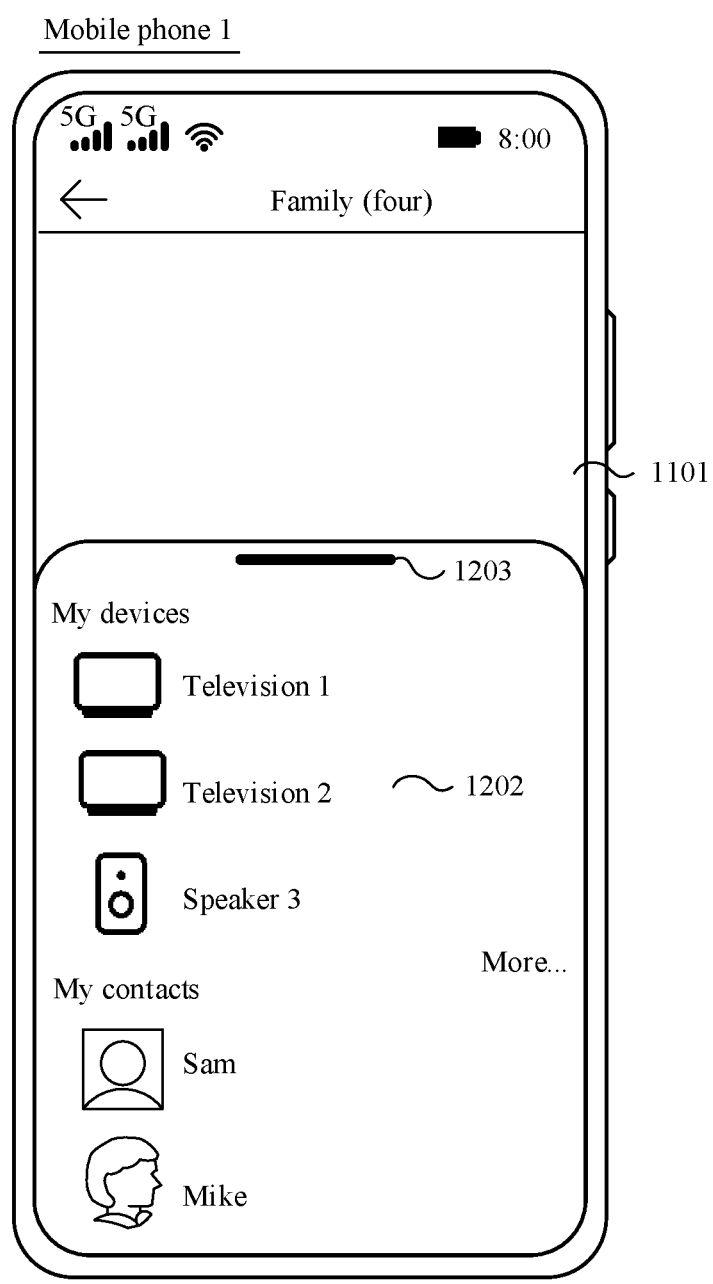

In some embodiments, as shown in FIG. 12(b), when displaying the device list 1202, the chat APP may further display, in a folded state, the reminder interface 1201 in which the device list 1202 is located. In other words, a part of the reminder interface 1201 is displayed at an upper layer of the chat interface 1101, and the other part of the reminder interface 1201 is not displayed. When the reminder interface 1201 is in the folded state, an expand button 1203 is further set in the reminder interface 1201. If it is detected that the user taps the expand button 1203, the chat APP may expand the reminder interface 1201, to present the full reminder interface 1201 shown in FIG. 12(a).

When there are a plurality of electronic devices in the device list 1202, the plurality of electronic devices may be ranked based on a use frequency or a latest use order by the user. In some embodiments, it may be set that a maximum of a specific quantity (for example, three) of electronic devices are displayed in the device list 1202. When it is found through query that a quantity of the electronic devices is greater than three, the user may trigger, by using an expand button (for example, a "More . . . " button) in the device list 1202, the chat APP to display more electronic devices.

It can be learned that, after the user inputs the reminder symbol "@" in the chat interface that is in the chat APP and that is with the contact, the chat APP may be triggered to present, in the interface, one or more electronic devices available to the user for selection by the user, to implement a function of directly @ a related device during chatting with the contact. In other words, during chatting, the user may quickly initiate a process of sharing an application service in a related device by using a method for @ the related device.

In addition, after the user inputs the reminder symbol "@", if the user continues to input another character into the input box 1102, the chat APP may hide the device list 1202. Alternatively, if the user continues to input another character into the input box 1102, the chat APP may retrieve the electronic device from the device list 1202 based on a character input by the user after "@". For example, the chat APP may display, in the device list 1202, a retrieved electronic device that includes the character input by the user. This is not limited in embodiments of this application.

An example in which the device list 1202 includes the television 1, the television 2, and the speaker 3 is still used, if it is detected that the user taps the television 1 in the device list 1202, it indicates that the user wants to share an application service in the television 1 with the "Family" group. Further, the chat APP may send a query request 2 to a second server, so that the second server may query, in response to the query request 2, an application service corresponding to the television 1.

The second server may be one or more servers configured to operate the chat APP. For example, the second server may be the cloud server A shown in FIG. 10. If the chat APP is a built-in system-level application of the mobile phone 1, the second server may be the same as the first server. The second server stores correspondences between electronic devices of different types, different application service lists, and corresponding operation instructions. For example, as shown in Table 1, an application service list corresponding to an electronic device of a television type includes three application services: "Latest Popular", "My Favorites", and "Historical Play"; and an application service list corresponding to an electronic device of a speaker type includes two application services: "New Song Express" and "Historical Play". Each application service corresponds to an operation instruction, and the operation instruction is used to obtain specific service content of a corresponding application service.

TABLE 1

| Electronic device | Application service list | Operation instruction |
| --- | --- | --- |
| Television | Latest popular | Query a list of latest popular videos in a video APP |

TABLE 1-continued

| Electronic device | Application service list | Operation instruction |
|---|---|---|
| | My favorites | Query favorites content in the video APP |
| | Historical play | Query the latest five play records in the video APP |
| Speaker | New song express | Query a list of latest popular music in a music APP |
| | Historical play | Query the latest 10 play records in the music APP |
| ... | ... | ... |

In this case, after the user taps the television 1 in the device list 1202, the chat APP may add an identifier of the television 1 to the query request 2, and send the query request 2 to the second server. After receiving the query request 2, the second server may determine, based on the identifier of the television 1 in the query request 2, that the television 1 is an electronic device of a television type. In this way, the second server may find, in the correspondence shown in Table 1, an application service list and an operation instruction that correspond to the television. Alternatively, the chat APP may identify, based on the identifier of the television 1, that the television 1 is an electronic device of a television type. In this way, the chat APP may request, in the query request 2, the second server to query an application service list and an operation instruction that correspond to the electronic device of the television type. Subsequently, the second server may send the application service list and the operation instruction that correspond to the television to the chat APP in the mobile phone 1.

In some other embodiments, when the chat APP is started in the mobile phone 1, the correspondence shown in Table 1 may be obtained from the second server. In this case, after the user taps the television 1 in the device list 1202, the chat APP may query, based on the correspondence obtained by the mobile phone 1, the application service list and the operation instruction that correspond to the electronic device of the television type. This is not limited in embodiments of this application.

Alternatively, the correspondences between different electronic devices and different application service lists shown in Table 1 may be stored in the mobile phone 1 in advance. Subsequently, after the user inputs the reminder symbol "@" in the chat interface 1101 in the chat APP, and taps the television 1 in the device list 1202, the chat APP may query, in a correspondence locally stored in the mobile phone 1, an application service list and an operation instruction that correspond to the electronic device of the television type. In this case, the mobile phone 1 does not need to interact with the server to obtain a specific application service supported by the television 1.

Alternatively, after the mobile phone 1 detects that the user taps the television 1 in the device list 1202, the mobile phone 1 may also send a query request to the television 1 based on the identifier of the television 1. The television 1 may query, in response to the query request sent by the mobile phone 1, an application service supported by the television 1. For example, the television 1 may determine that the television 1 supports the three application services: "Latest Popular", "My Favorites", and "Historical Play", so that the television 1 may send the queried application service to the chat APP in the mobile phone 1.

Figure 13A:
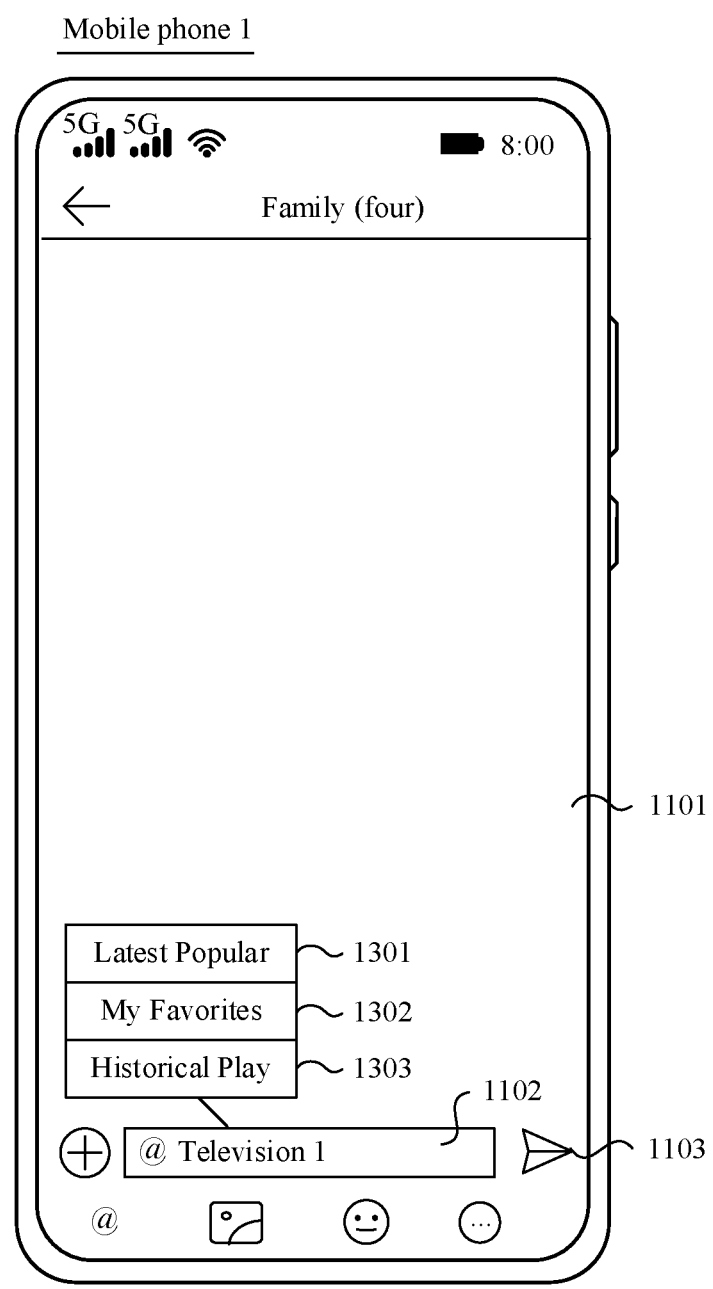
FIG. 13(a) and FIG. 13(b) are a schematic diagram 7 of an application scenario for a service sharing method according to an embodiment of this application.
Figure 13B:
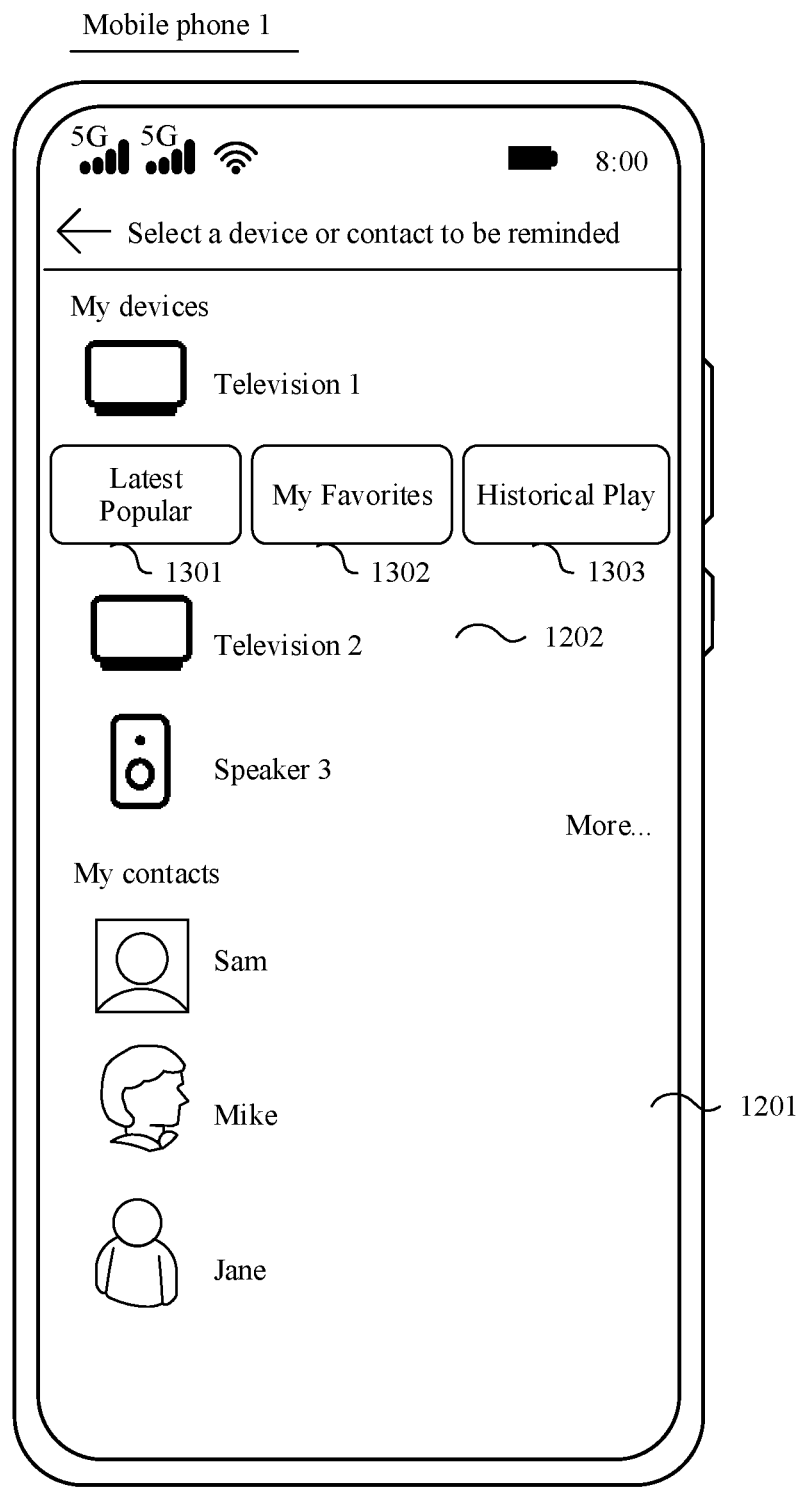

As shown in FIG. 13(*a*), when obtaining that the application services supported by the television 1 include "Latest Popular", "My Favorites", and "Historical Play", the chat APP may jump back to the chat interface 1101 with the "Family" group, and display "Latest Popular" 1301, "My Favorites" 1302, and "Historical Play" 1303 in the chat interface 1101. In this way, the user may select, from the chat interface 1101, to specifically share an application service in the television 1 with a contact in the "Family" group. For example, the chat APP may display the three application services: "Latest Popular" 1301, "My Favorites" 1302, and "Historical Play" 1303 near the input box 1102 in the chat interface 1101, so that the user can conveniently tap these application services.

Alternatively, as shown in FIG. 13(*b*), when obtaining that the application services supported by the television 1 include "Latest Popular", "My Favorites", and "Historical Play", the chat APP may continue to stay in the reminder interface 1201, and display "Latest Popular" 1301, "My Favorites" 1302, and "Historical Play" 1303 in the reminder interface 1201. For example, the chat APP may display a second-level menu near an option of the television 1 in the reminder interface 1201, and the second-level menu includes the three application services: "Latest Popular" 1301, "My Favorites" 1302, and "Historical Play" 1303.

An example in which the user selects the application service "My Favorites" 1302 is used. After detecting that the user selects "My Favorites" 1302, the chat APP may send, to a third server corresponding to the video APP, a first operation instruction corresponding to "My Favorites" 1302, that is, an operation instruction of "querying favorites content in the video APP". The third server may be configured to provide, for a user who logs in to the video APP, an application service used when the video APP is used in each electronic device. For example, the third server may be the cloud server B shown in FIG. 10.

For example, the chat APP may send the first operation instruction to the first server or the second server, and the first server or the second server identifies that the first operation instruction is a request for requesting to query the video APP in the television 1. Further, the first server or the second server may further send a query request to the third server corresponding to the video APP, to request the third server to query favorites content that is added to favorites when the user uses the video APP in the television 1. For example, the third server may query that when a user whose account name is "123" logs in to the video APP in the television 1, favorites content in the video APP includes a TV series A, a TV series B, and a movie C. Further, the third server may send play links of the TV series A, the TV series B, and the movie C to the chat APP in the mobile phone by using the first server or the second server. The play links may include play links of the TV series A, the TV series B, and the movie C in the television 1, or may include play links of the TV series A, the TV series B, and the movie C in the mobile phone. Certainly, the third server may further send video information such as video names, thumbnails, and play duration of the TV series A, the TV series B, and the movie C to the chat APP in the mobile phone 1.

Figure 14A:
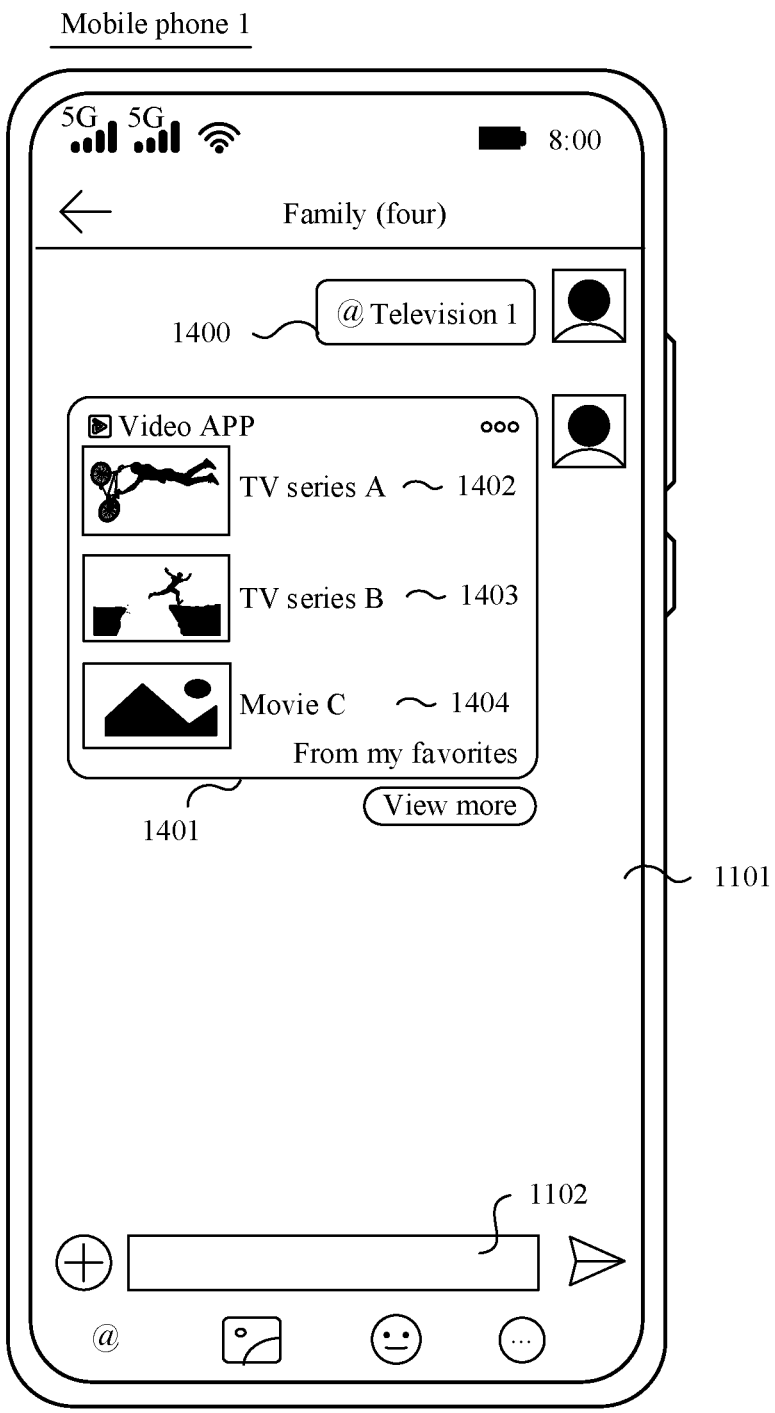
FIG. 14(a) and FIG. 14(b) are a schematic diagram 8 of an application scenario for a service sharing method according to an embodiment of this application.

Further, as shown in FIG. 14(*a*), after obtaining the favorites content, the chat APP in the mobile phone 1 may automatically send a chat message 1401 in the chat interface 1101, where the chat message 1401 may display specific favorites content in a manner of a menu. For example, the menu in the chat message 1401 includes an option 1402 of the TV series A, an option 1403 of the TV series B, and an option 1404 of the movie C. The option 1402 corresponds to a play link 1 of the TV series A, the option 1403 corresponds to a play link 2 of the TV series B, and the option 1404 corresponds to a play link 3 of the movie C.

In addition, when sending the chat message 1401, the chat APP may further send, to the "Family" group, chat content "@television 1" that has been input by the user into the input box 1102, that is, display a chat message 1400 in the chat interface 1101. In this way, a contact receiving the chat message 1401 may learn, based on the chat message 1400, that an application service recommended in the chat message 1401 is an application service used by the user in the television 1.

Similarly, it may be set that a maximum of a specific quantity (for example, three) of service content of application services may be displayed in the chat message 1401. When a quantity of favorites content in the application service "My Favorites" obtained by the chat APP is greater than three options, the user may trigger, by using an expand button in the chat message 1401, the chat APP to display more favorites content.

Figure 14B:
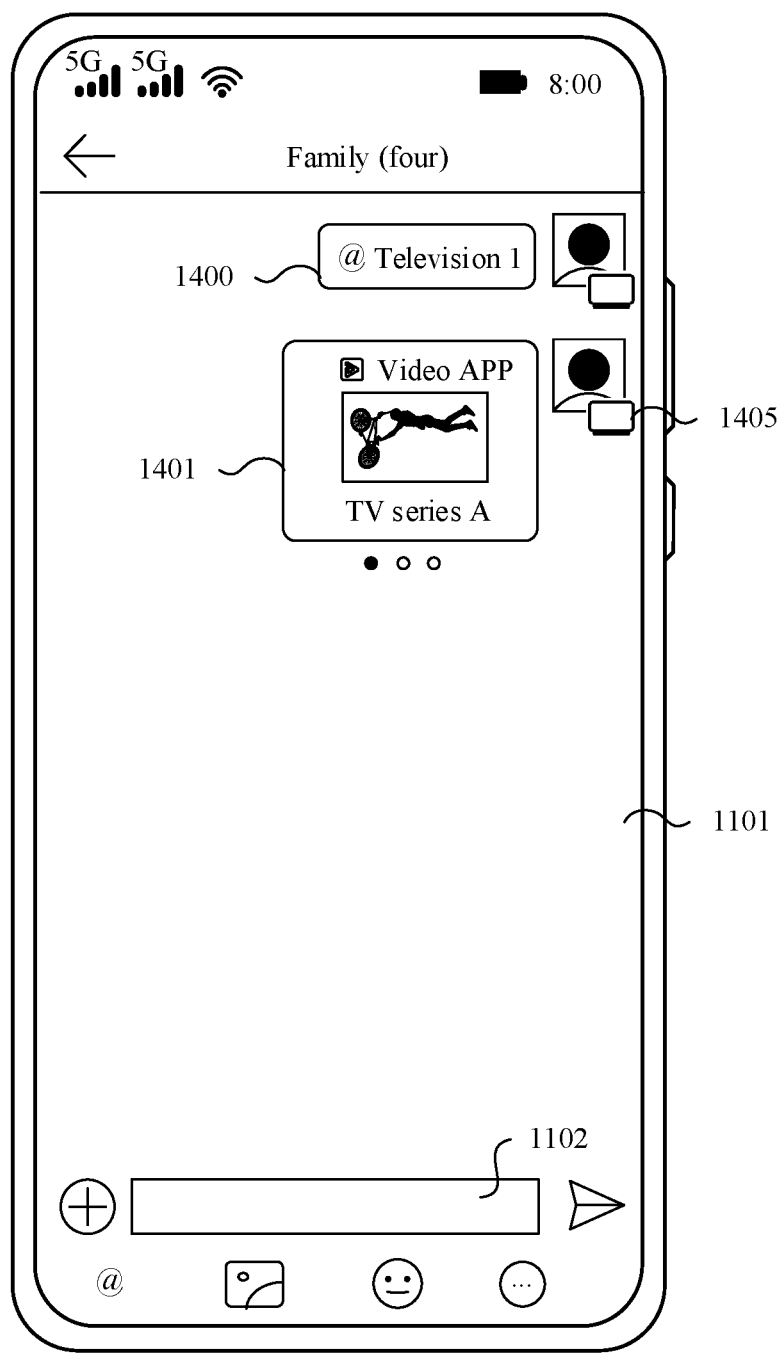

Alternatively, as shown in FIG. 14(b), after obtaining the favorites content, the chat APP in the mobile phone 1 may send the chat message 1401 in the chat interface 1101, where the chat message 1401 may display specific favorites content in a manner of a card (or card group). For example, the chat message 1401 includes a card group including a card of the TV series A, a card of the TV series B, and a card of the movie C. When performing a slide operation on the chat message 1401, the user may trigger the chat APP to sequentially display different cards in the card group. Similarly, the card of the TV series A corresponds to the play link 1 of the TV series A, the card of the TV series B corresponds to the play link 2 of the TV series B, and the card of the movie C corresponds to the play link 3 of the movie C.

In addition, still as shown in FIG. 14(b), when sending the chat message 1401, the chat APP may further add an identifier 1405 of the television 1 to an avatar of a sender of the chat message 1401. In this way, a contact receiving the chat message 1401 may learn, based on the identifier 1405, that an application service recommended in the chat message 1401 is an application service used by the user in the television 1. In embodiments of this application, a specific form and a display effect of the identifier 1405 are not limited.

It can be learned that, in the foregoing process of sharing the application service, the user may select, by inputting the reminder symbol @ in the chat APP, a specific electronic device and a related application service provided by the electronic device, to send, in a manner of a chat message, the application service selected by the user to the contact. In this process, the user does not need to leave the chat APP or switch an electronic device that is being operated, and can quickly share an application service in another electronic device with the contact. In other words, the user can implement cross-device application service sharing without switching an application and an electronic device, so that the process of sharing the application service is faster.

Figure 15A:
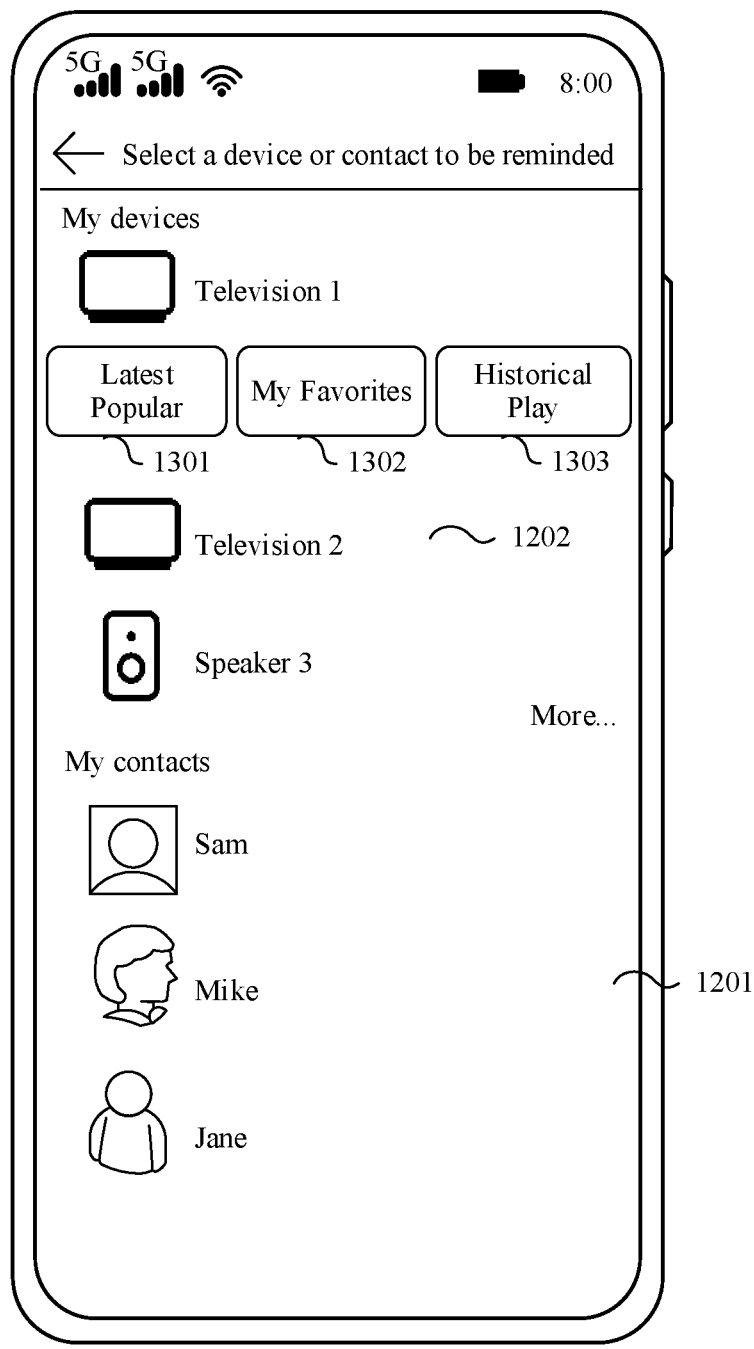
FIG. 15(a) and FIG. 15(b) are a schematic diagram 9 of an application scenario for a service sharing method according to an embodiment of this application.

In some other embodiments, as shown in FIG. 15(a), after the chat APP displays the device list 1202 in the reminder interface 1201, if it is detected that the user selects the television 1 from the device list 1202, the chat APP may obtain three application services corresponding to the television 1, namely, "Latest Popular" 1301, "My Favorites" 1302, and "Historical Play" 1303, and the chat APP may further obtain specific service content of each of the three application services, for example, a list of latest popular videos in the video APP in "Latest Popular" 1301, favorites content in the video APP in "My Favorites" 1302, and latest five play records in the video APP in "Historical Play" 1303. For a method for obtaining the application service and the specific service content in the application service by the chat APP, refer to the related descriptions in the foregoing embodiments. Details are not described herein again.

Figure 15B:
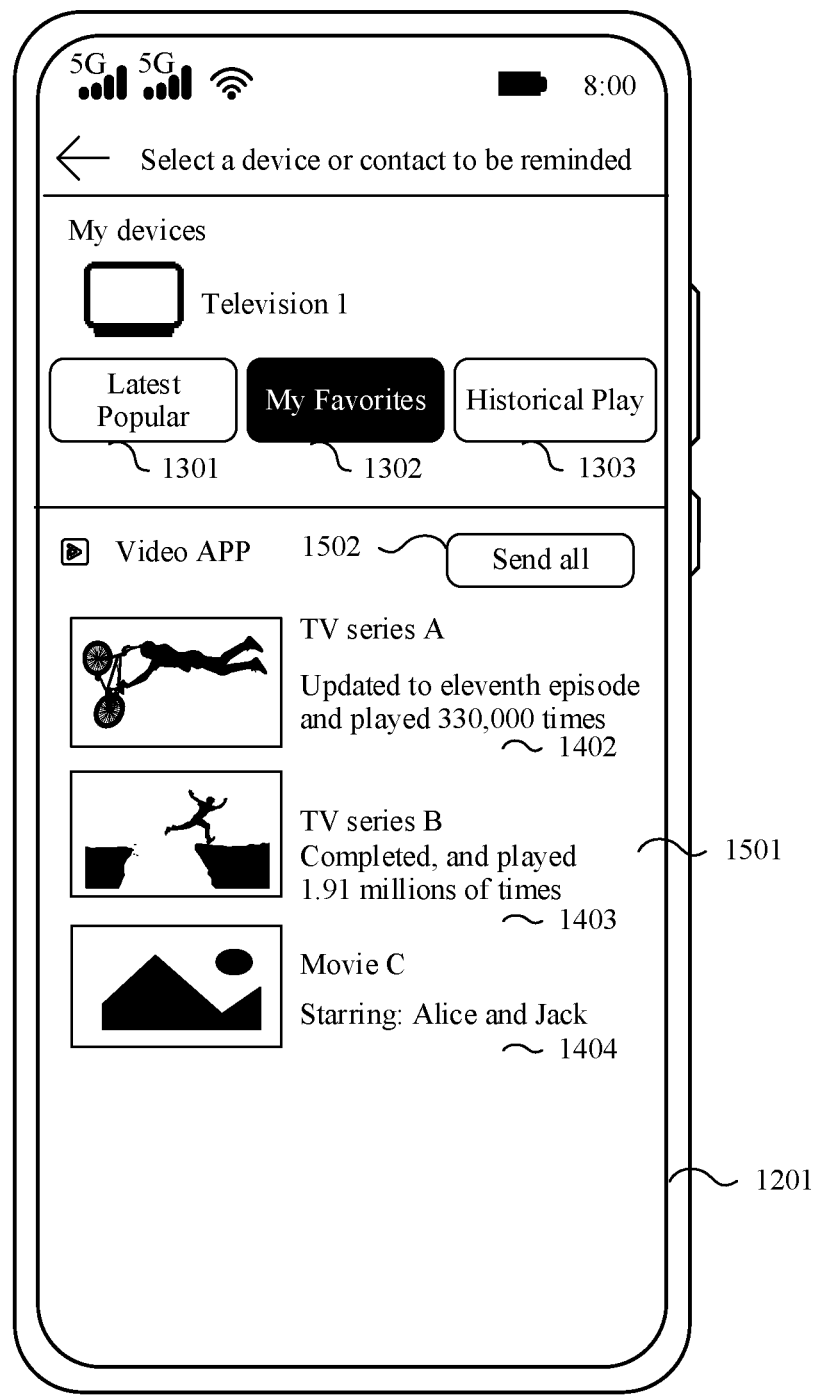

Further, as shown in FIG. 15(b), the chat APP may display, in the reminder interface 1201, various application services provided by the television 1 and the specific service content of the application services. For example, if the user taps "My Favorites" 1302, the chat APP may display, in the reminder interface 1201, service content 1501 of the application service "My Favorites" 1302. For example, the service content 1501 includes the option 1402 of the TV series A, the option 1403 of the TV series B, and the option 1404 of the movie C. In this way, when selecting the electronic device, the user may preview specific service content of each application service in the electronic device, and the user may select and share an application service with a contact in a targeted manner.

For example, a button 1502 for sending all is set in the service content 1501. The user previews the service content 1501, and if the user wants to send all the service content 1501 to the contact, the user may tap the button 1502. If it is detected that the user taps the button 1502, the chat APP may send all favorites content to the contact in a form of a chat message in the form of FIG. 14(a) or FIG. 14(b). For another example, the user may alternatively select an option from the service content 1501, for example, the option 1402 of the TV series A, the option 1403 of the TV series B, or the option 1404 of the movie C. Further, the chat APP may send the option selected by the user to the contact in a form of a chat message.

Figure 16A:
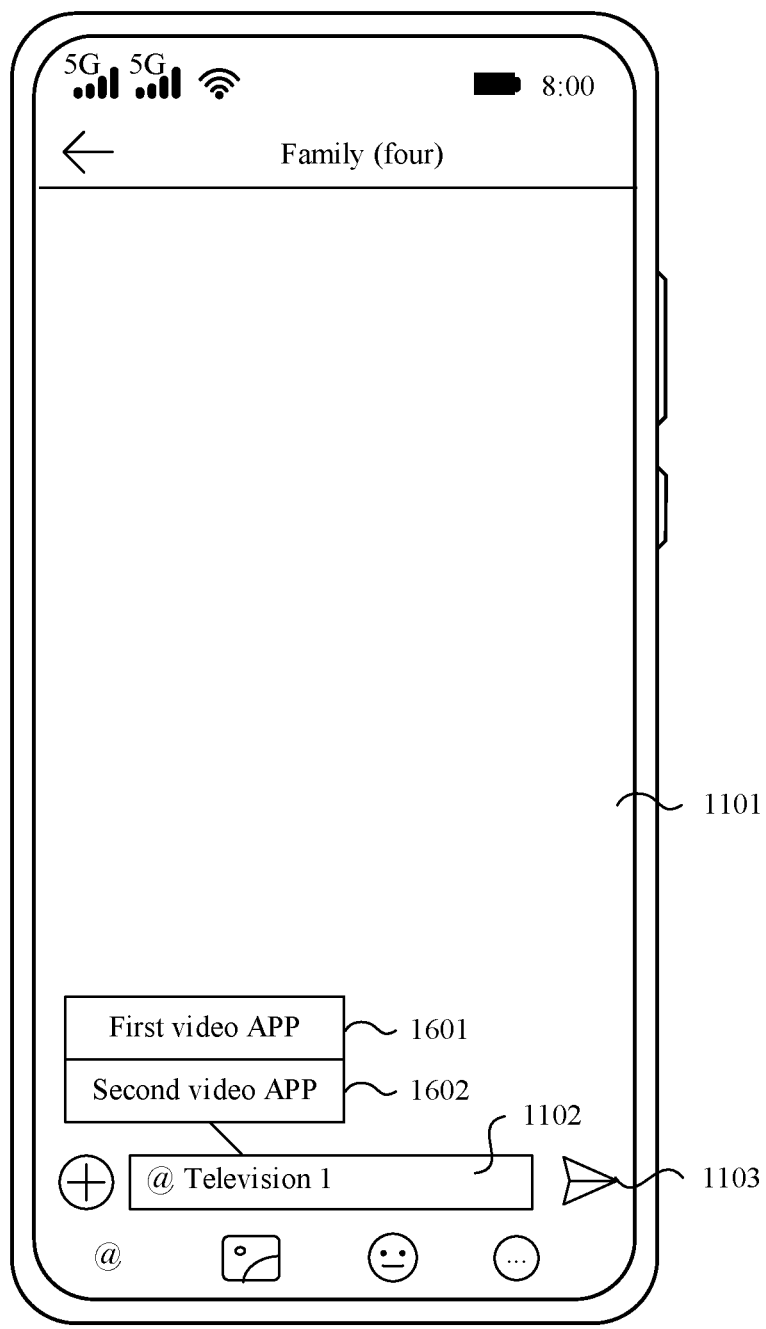
FIG. 16(a) and FIG. 16(b) are a schematic diagram 10 of an application scenario for a service sharing method according to an embodiment of this application.

In some other embodiments, in addition to selecting the electronic device and the application service in the electronic device, the user may further select a specific application from which the application service comes by inputting the reminder symbol "@" in the chat APP. For example, after the chat APP displays the device list 1202 in the reminder interface 1201 or the chat interface 1101, if it is detected that the user selects the television 1 from the device list 1202, as shown in FIG. 16(a), the chat APP may further obtain one or more applications from which the application service provided by the television 1 comes, and display the obtained application (for example, a first video APP 1601 and a second video APP 1602) in the reminder interface 1201 or the chat interface 1101.

For example, the second server may store correspondences among electronic devices of different types, different applications, different application service lists, and corresponding operation instructions. For example, as shown in Table 2, an electronic device of a television type provides a first video APP and a second video APP. The first video APP supports two application services: "Latest Popular" and "My Favorites", and the second video APP supports an application service "Historical Play". An operation instruction associated with a corresponding application is set for each application service, and the operation instruction may be used to obtain service content of the application service from a server of the corresponding application. In this case, the chat APP may obtain, from the correspondences stored in the second server, applications corresponding to the television 1, including the first video APP and the second video APP.

TABLE 2

| Electronic device | Application | Application service list | Operation instruction |
|---|---|---|---|
| Television | First video APP | Latest popular | Query a list of latest popular videos |
| | | My favorites | Query favorites content |
| | Second video APP | Historical play | Query the latest five play records |
| Speaker | Music APP | New song express | Query a list of latest popular music |
| | | Historical play | Query the latest 10 play records |
| ... | ... | ... | ... |

Figure 16B:
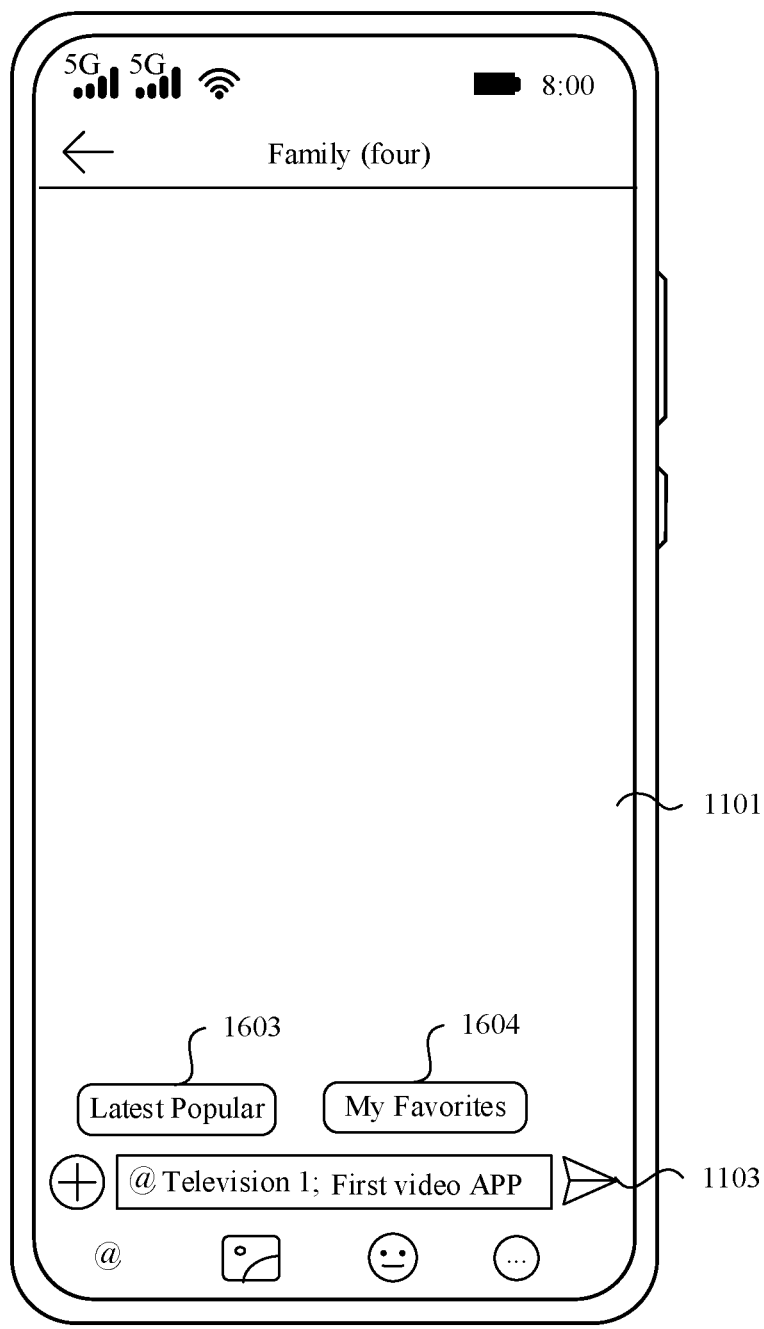

In this way, the user may select, from the chat interface 1101 shown in FIG. 16(*a*), and share an application service in the first video APP 1601, or select and share an application service in the second video APP 1602. For example, the user selects the first video APP 1601. As shown in FIG. 16(*b*), the chat APP may further display, in the chat interface 1101, application services supported by the first video APP 1601, namely, two application services: "Latest Popular" 1603 and "My Favorites" 1604. Subsequently, the user may continue to select, according to the method in the foregoing embodiments, an application service that needs to be shared, so that the chat APP may obtain, from a corresponding application, service content of the application service selected by the user, and share the service content with the contact in a form of a chat message.

The foregoing embodiments are described by using an example in which the user shares, in the chat APP, an application service in another electronic device with a contact. It may be understood that the user may also share, in the chat APP, an application service in the mobile phone 1 (that is, local device) with the contact.

Figure 17A:
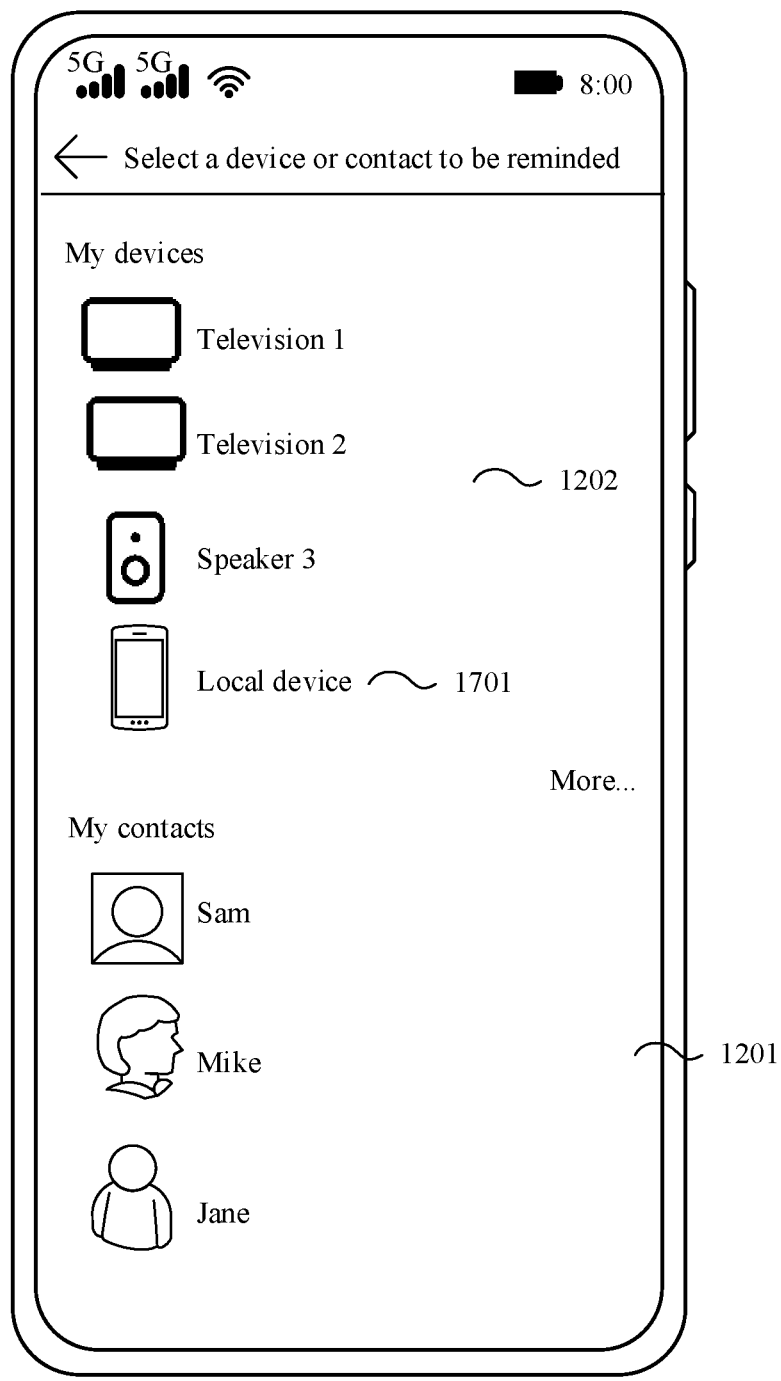
FIG. 17(a) to FIG. 17(c) are a schematic diagram 11 of an application scenario for a service sharing method according to an embodiment of this application.
Figure 17B:
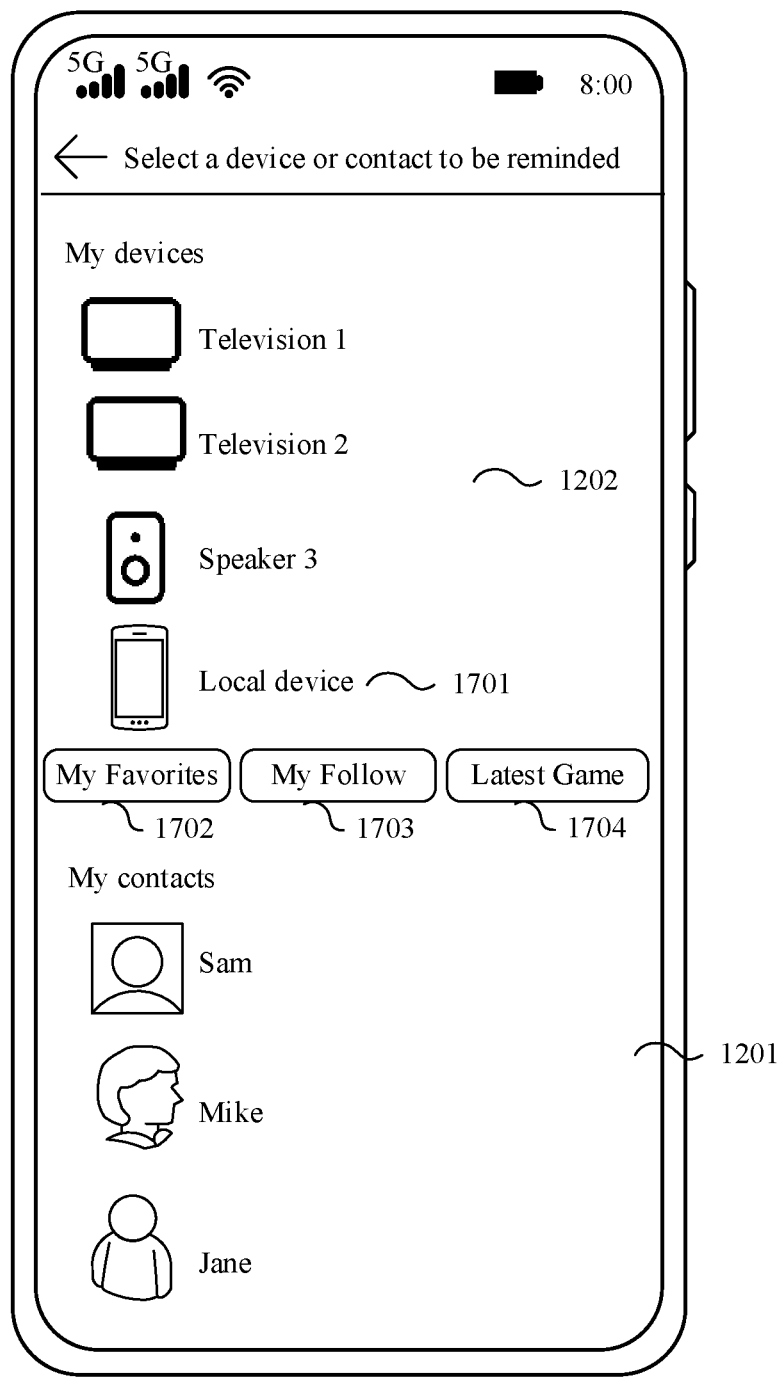
Figure 17C:
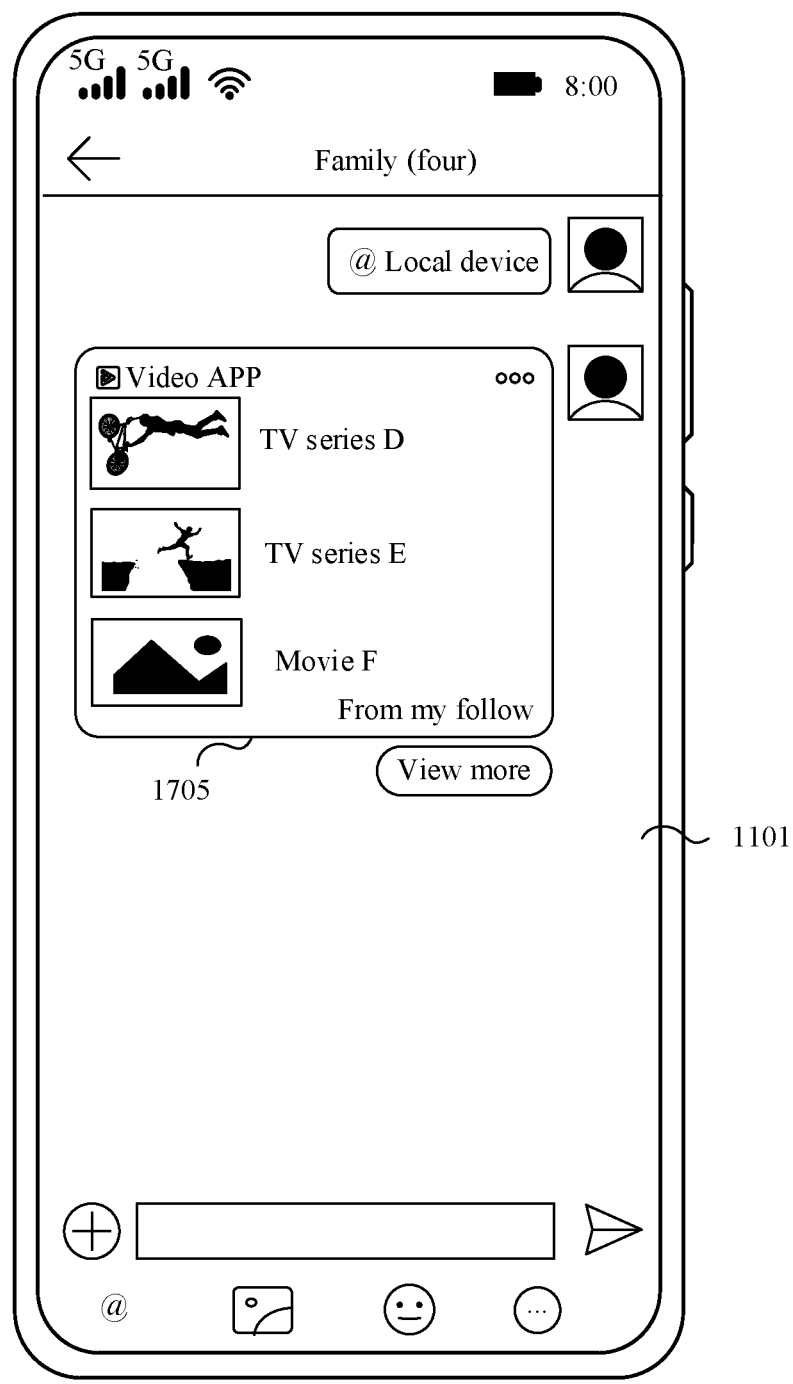

For example, after the user inputs the reminder symbol "@" into the input box 1102 in the chat interface 1101, in addition to displaying another electronic device that is found through querying and that accesses the same communication network as the mobile phone 1, as shown in FIG. 17(*a*), the chat APP may further display an option of the mobile phone 1 in the device list 1202 in the reminder interface 1201, that is, a local device 1701. In other words, the user may select, by inputting the reminder symbol "@", the application service provided on the local device, and share the application service provided on the local device with the contact.

If it is detected that the user taps the local device 1701, as shown in FIG. 17(*b*), the chat APP may display, in the reminder interface 1201, one or more application services provided by the mobile phone 1. Certainly, the chat APP may alternatively display, in the chat interface 1101, one or more application services provided by the mobile phone 1. This is not limited in embodiments of this application.

For example, one or more application services that can be shared with a contact may be preset in the mobile phone 1. For example, it may be set that two application services "My Favorites" 1702 and "My Follow" 1703 that are from the video APP and that are in the mobile phone 1 may be used to be shared with a contact in the chat APP, and it may be set that an application service "Latest Game" 1704 that is from the game APP and that is in the mobile phone 1 may be used to be shared with a contact in the chat APP. In this case, when the chat APP detects that the user taps the local device 1701 in the device list 1202, the chat APP may display, based on the application service preset in the mobile phone 1, the three application services: "My Favorites" 1702, "My Follow" 1703, and "Latest Game" 1704 in the reminder interface 1201 shown in FIG. 17(*b*).

For another example, an application service list and an operation instruction that correspond to an electronic device of a mobile phone type may also be stored in the second server. In this case, when the chat APP detects that the user taps the local device 1701 in the device list 1202, the chat APP may interact with the second server according to the method in the foregoing embodiments, to obtain one or more application services supported by the mobile phone 1, and display the one or more application services in the reminder interface 1201 shown in FIG. 17(*b*).

Subsequently, the user may select, from the application services displayed in the chat interface 1101, an application service that needs to be shared with a contact. For example, if the user selects the application service "My Follow" 1703, as shown in FIG. 17(*c*), the chat APP may obtain specific follow content that is in the video APP in the mobile phone 1 and that corresponds to "My Follow" 1703. In this way, the chat APP may send the obtained follow content to the "Family" group in a form of a chat message 1705, to share the application service in the mobile phone 1 with a contact in the "Family" group. In this sharing process, the user does not need to jump from the chat APP to an interface of another APP to perform an operation, so that the process of sharing the application service is faster and more convenient, and user experience is improved.

In some embodiments, still as shown in FIG. 14(*a*) or FIG. 14(*b*), after the user (for example, the user Amy) sends the chat message 1401 to the "Family" group in the chat interface 1101 by using the chat APP in the mobile phone 1, both a sender (namely, the user Amy) of the chat message 1401 and a receiver (namely, the contact in the "Family" group) of the chat message 1401 may select favorites content in the chat message 1401, and open the favorites content. In other words, after the user shares the application service with the contact in the chat APP in a form of a chat message, both the user and the contact may trigger the chat message to enable a corresponding application service.

Figure 18A:
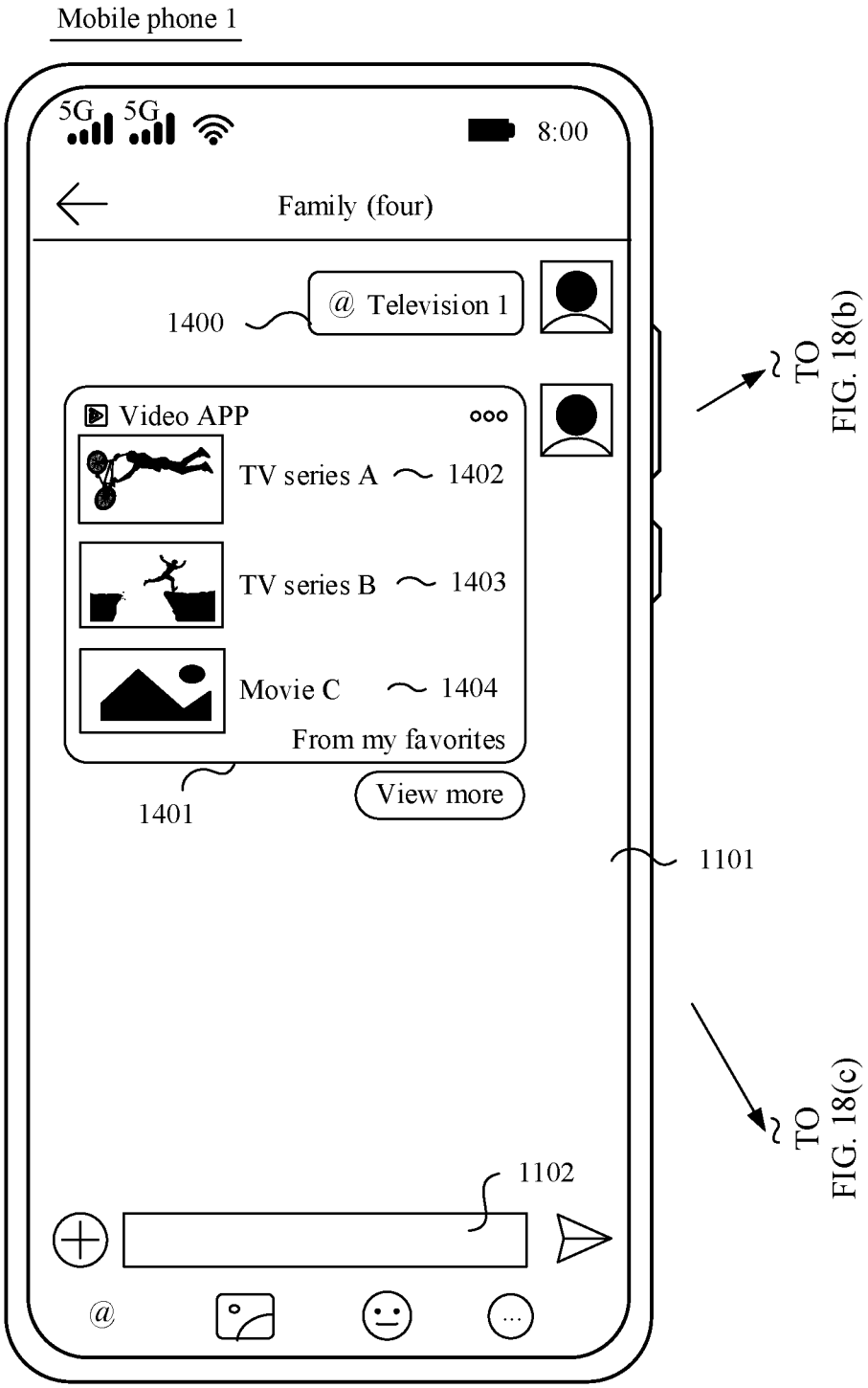
FIG. 18(a) to FIG. 18(c) are a schematic diagram 12 of an application scenario for a service sharing method according to an embodiment of this application.

For example, as shown in FIG. 18(*a*), the chat message 1401 displayed by the chat APP in the mobile phone 1 in the chat interface 1101 includes service content corresponding to the application service "My Favorites", namely, specific favorites content. For example, the chat message 1401 includes the option 1402 of the TV series A, the option 1403 of the TV series B, and the option 1404 of the movie C that are added to favorites by the user in the video APP in the television 1. The option 1402 corresponds to the play link 1 of the TV series A, the option 1403 corresponds to the play link 2 of the TV series B, and the option 1404 corresponds to the play link 3 of the movie C.

The play link 1 of the TV series A is used as an example. The play link 1 of the TV series A may be a play link (namely, a local link) of the TV series A in a video APP in a mobile phone, or may be a play link (namely, an external link) of the TV series A in a video APP in a television. Regardless of whether the play link 1 is the local link or the external link, the play link 1 may carry a package name (package name) of the video APP and a video link of the TV series A in the video APP. For example, the play link 1 may be a deep link (deep link).

Figure 18B:
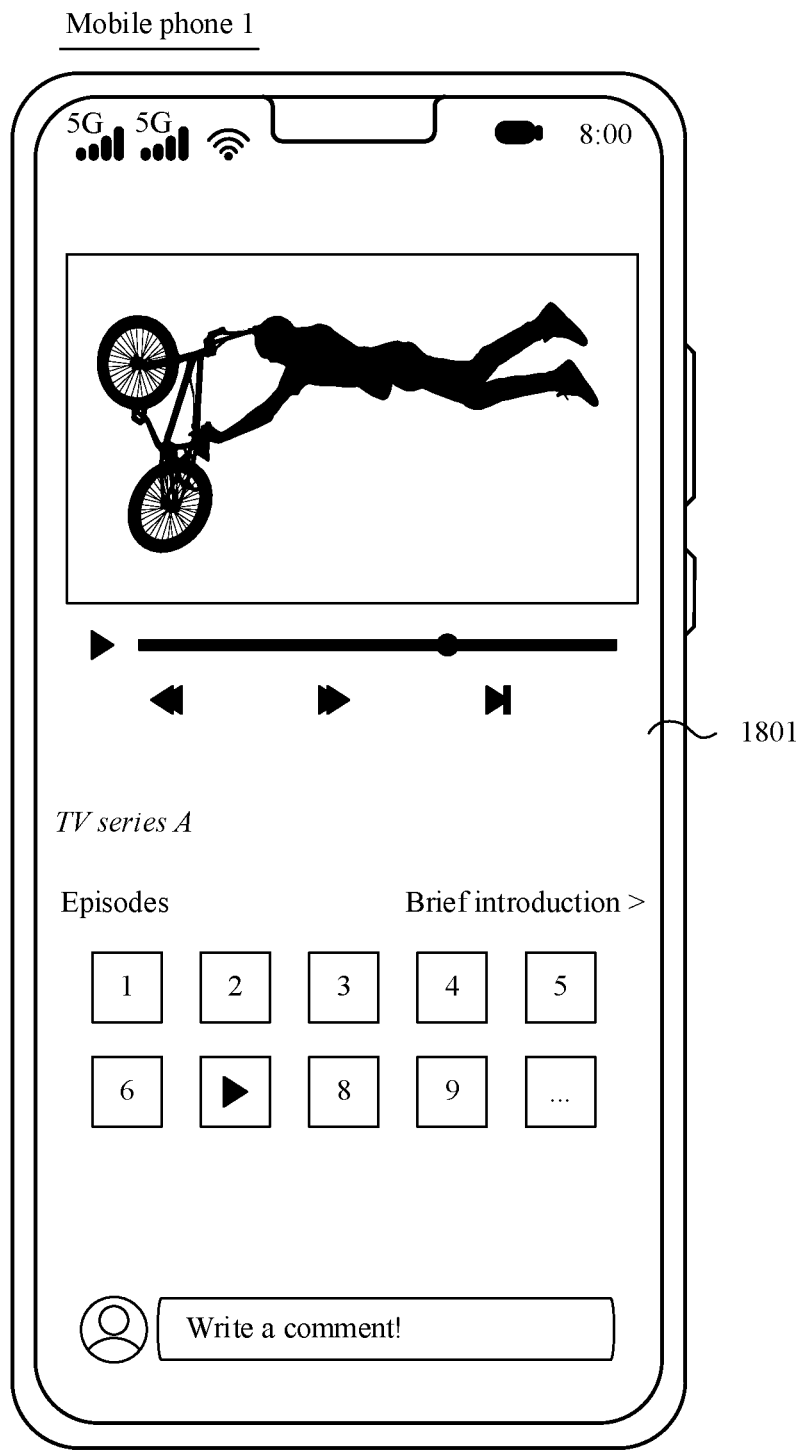

When the play link 1 is the local link, if it is detected that the user (that is, the sender of the chat message 1401) taps the option 1402, the mobile phone 1 may run a corresponding video APP based on the package name of the video APP in the play link 1, and open the TV series A in the video APP based on the video link of the TV series A in the play link 1. For example, the chat APP in the mobile phone 1 may invoke a startActivity interface, and transfer the play link 1 as an input parameter to the startActivity interface, so that the startActivity interface may run a corresponding video APP and open a corresponding TV series A based on the play link 1. In this case, as shown in FIG. 18(b), the mobile phone 1 may display a play interface 1801 of the TV series A in the video APP, so that the sender of the chat message 1401 may enable a corresponding application service in the mobile phone 1 by using the sent chat message 1401.

Figure 18C:
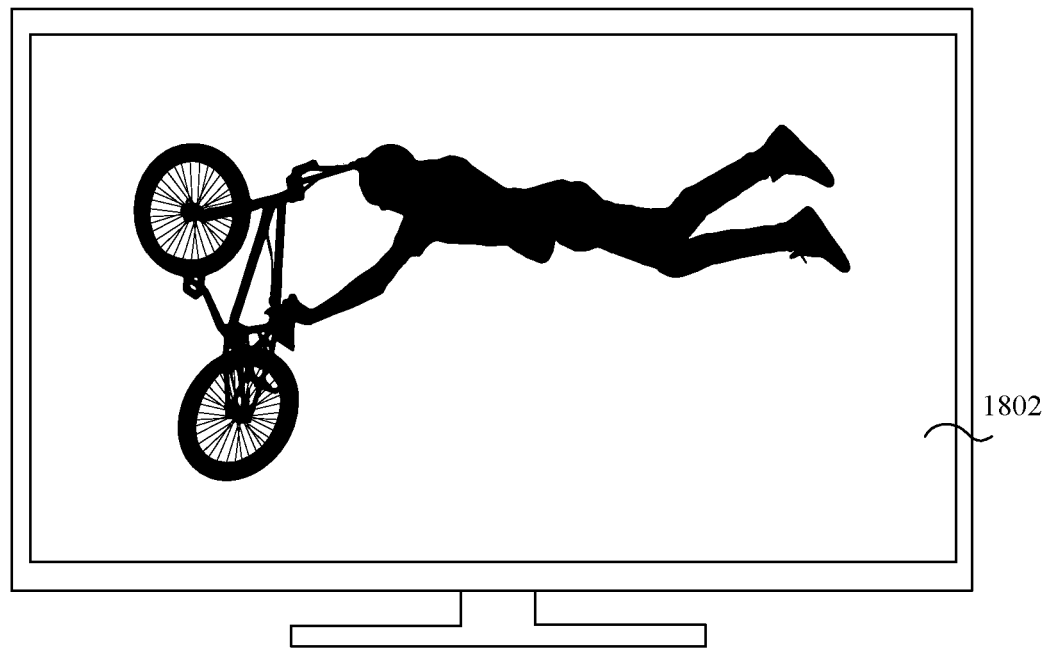

When the play link 1 is the external link, if it is detected that the user (namely, the sender of the chat message 1401) taps the option 1402, the mobile phone 1 may send a service request to the first server, where the service request carries the identifier of the television 1 and the play link 1. After receiving the service request, the first server may send a play instruction to the television 1 based on the identifier of the television 1, where the play instruction carries the play link 1. As shown in FIG. 18(c), after the television 1 receives the play instruction, the television 1 may run the video APP based on the play link 1 in the play instruction, and open a play interface 1802 of the TV series A in the video APP. Similarly, the television 1 may also invoke a startActivity interface, and transfer the play link 1 as an input parameter to the startActivity interface, so that the startActivity interface may run a corresponding video APP and open a corresponding TV series A based on the play link 1.

In this way, in the chat APP, the user may not only share an application service in another electronic device across devices, but also directly trigger, in the chat APP, the electronic device that provides the application service to enable the application service. The user may enable, in a corresponding electronic device, an application service selected by the user without jumping to a plurality of pages in the mobile phone or switching between a plurality of devices.

Alternatively, when the play link 1 is the external link, after the mobile phone 1 detects that the user taps the option 1402, if the mobile phone 1 and the television 1 are located in a same local area network, the mobile phone 1 may directly send a play instruction to the television 1, where the play instruction carries the play link 1. Similarly, after the television 1 receives the play instruction, as shown in FIG. 18(c), the television 1 may run the video APP based on the play link 1 in the play instruction, and open the play interface 1802 of the TV series A in the video APP, so that the sender of the chat message 1401 may enable a corresponding application service in the television 1 by using the sent chat message 1401.

Figure 19A:
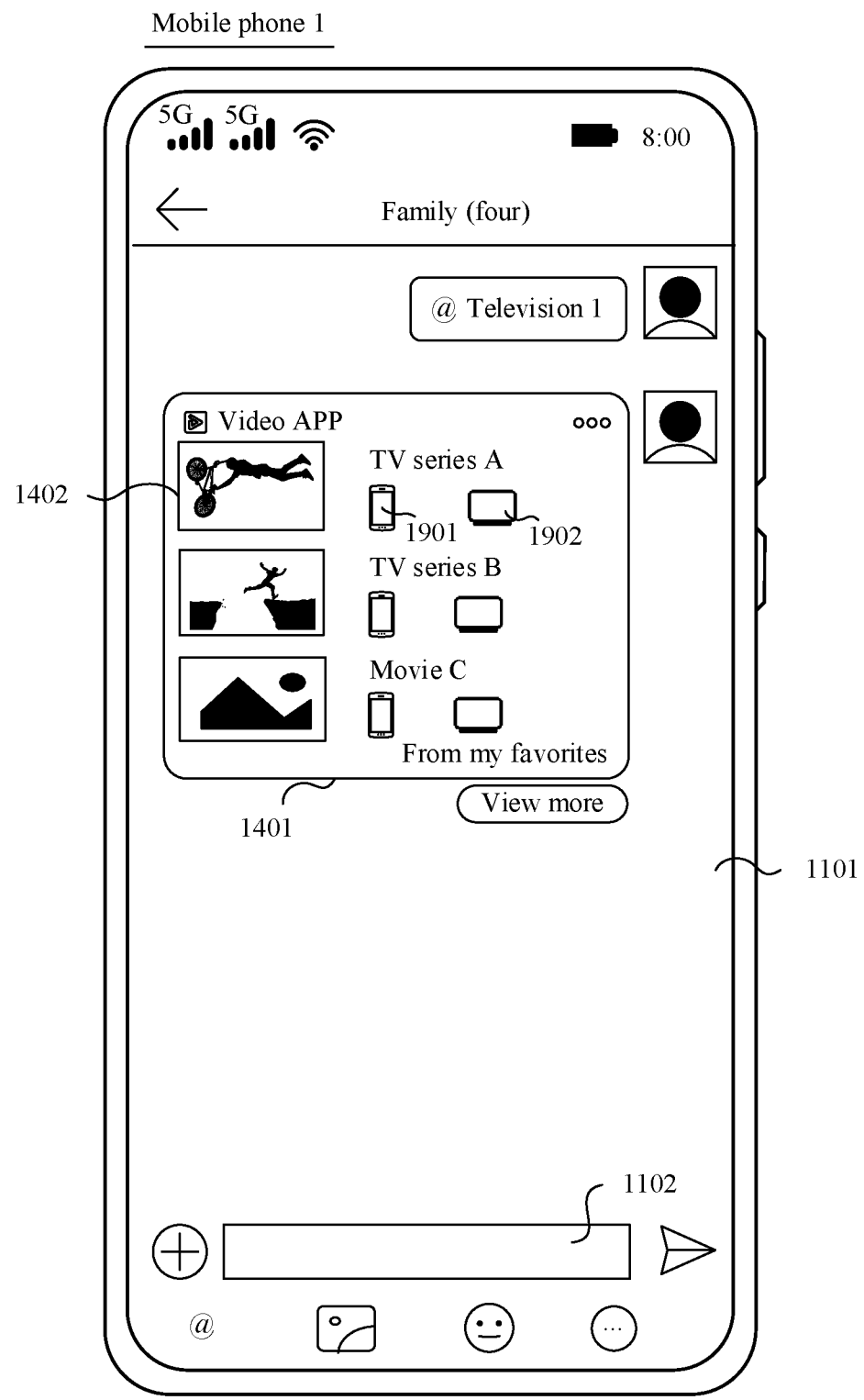
FIG. 19(a) and FIG. 19(b) are a schematic diagram 13 of an application scenario for a service sharing method according to an embodiment of this application.

In some embodiments, the play link 1 of the TV series A obtained by the chat APP in the mobile phone 1 may include both the local link of the TV series A and the external link of the TV series A in the television 1. In this case, as shown in FIG. 19(a), when the chat APP displays the chat message 1401 in the chat interface 1101, a first play button 1901 and a second play button 1902 may be set in the option 1402 of the TV series A. The first play button 1901 may correspond to the local link of the TV series A, and the second play button 1902 may correspond to the external link of the TV series A. If it is detected that the user taps the first play button 1901, as shown in FIG. 18(b), the mobile phone 1 may display the play interface 1801 of the TV series A in the video APP based on the local link. If it is detected that the user taps the second play button 1902, as shown in FIG. 18(c), the mobile phone 1 may indicate, based on the external link, the television 1 to display the play interface 1802 of the TV series A in the video APP.

Figure 19B:
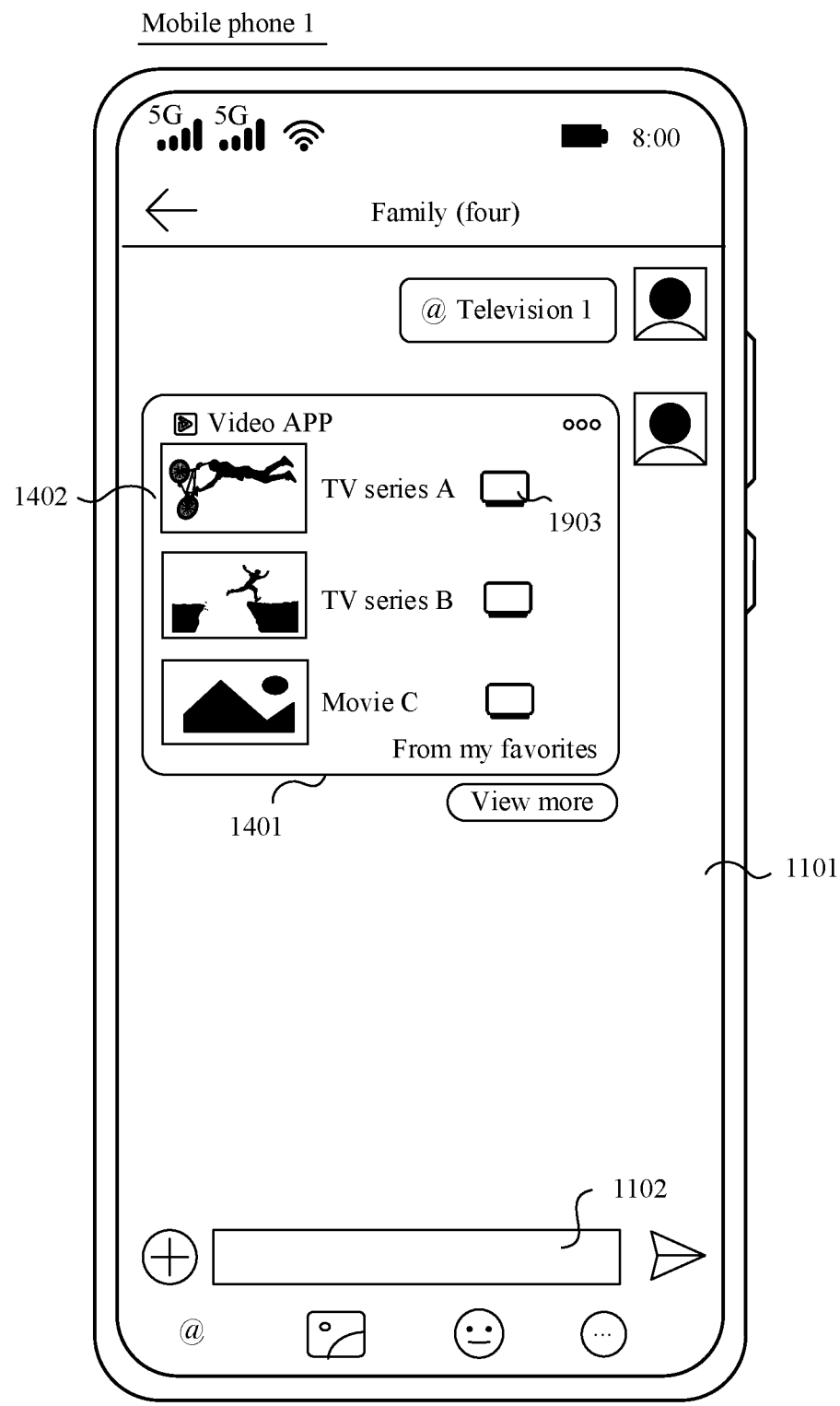

Alternatively, when the play link 1 of the TV series A includes both the local link of the TV series A and the external link of the TV series A in the TV set 1, as shown in FIG. 19(b), when the chat APP displays the option 1402 of the TV series A in the chat message 1401, it may be set that an identifier 1903 of a television in the option 1402 corresponds to the external link, and another area in the option 1402 corresponds to the internal link. If it is detected that the user taps the identifier 1903 of the television in the option 1402, as shown in FIG. 18(c), the mobile phone 1 may indicate, based on the external link, the television 1 to display the play interface 1802 of the TV series A in the video APP. If it is detected that the user taps the another area in the option 1402, as shown in FIG. 18(b), the mobile phone 1 may display, based on the local link, the play interface 1801 of the TV series A in the video APP.

Alternatively, it may alternatively be set that when the user inputs a different gesture to the option 1402 of the TV series A in the chat message 1401, the chat APP may trigger the TV series A to be played locally in the mobile phone 1 or in the television 1. For example, when the user taps the option 1402 of the TV series A in the chat message 1401, the mobile phone 1 may display the play interface 1801 of the TV series A in the video APP based on the local link. When the user double-taps the option 1402 of the TV series A in the chat message 1401, the mobile phone 1 may indicate, based on the external link, the television 1 to display the play interface 1802 of the TV series A in the video APP. This is not limited in embodiments of this application.

Figure 20A:
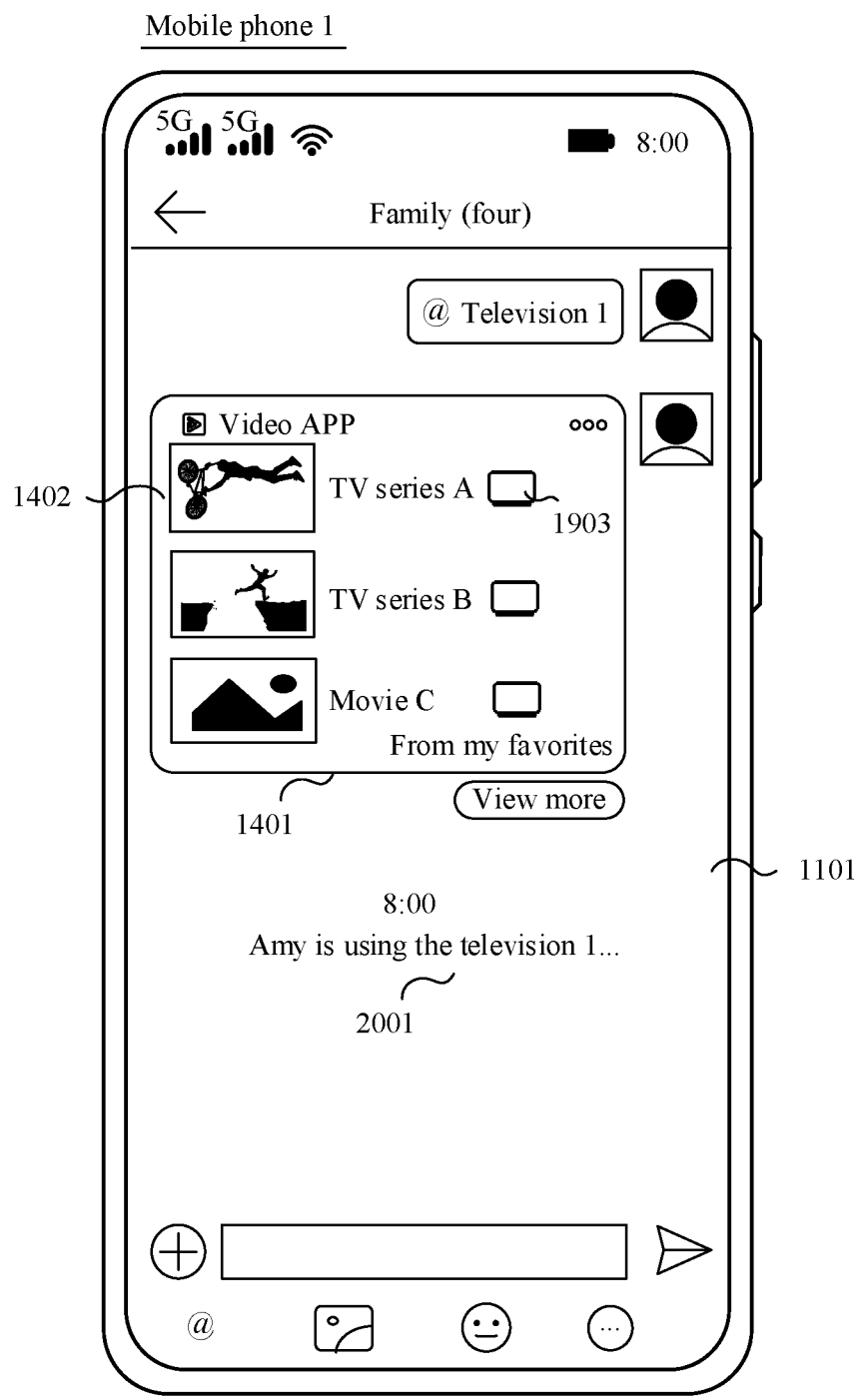
FIG. 20(a) and FIG. 20(b) are schematic diagram 14 of an application scenario for a service sharing method according to an embodiment of this application.

In addition, after the mobile phone 1 successfully indicates, based on the external link, the television 1 to display the play interface 1802 of the TV series A in the video APP, the television 1 may send a response message indicating successful play to the mobile phone 1. For example, the television 1 may send the response message indicating successful play to the mobile phone 1 by using the first server. In this case, as shown in FIG. 20(a), the chat APP in the mobile phone 1 may display, in the chat interface, a prompt message 2001 indicating that the user (for example, the user Amy) successfully opens the TV series A in the television 1, to prompt that the contact Amy in the "Family" group is watching the TV series A in the television 1.

Figure 20B:
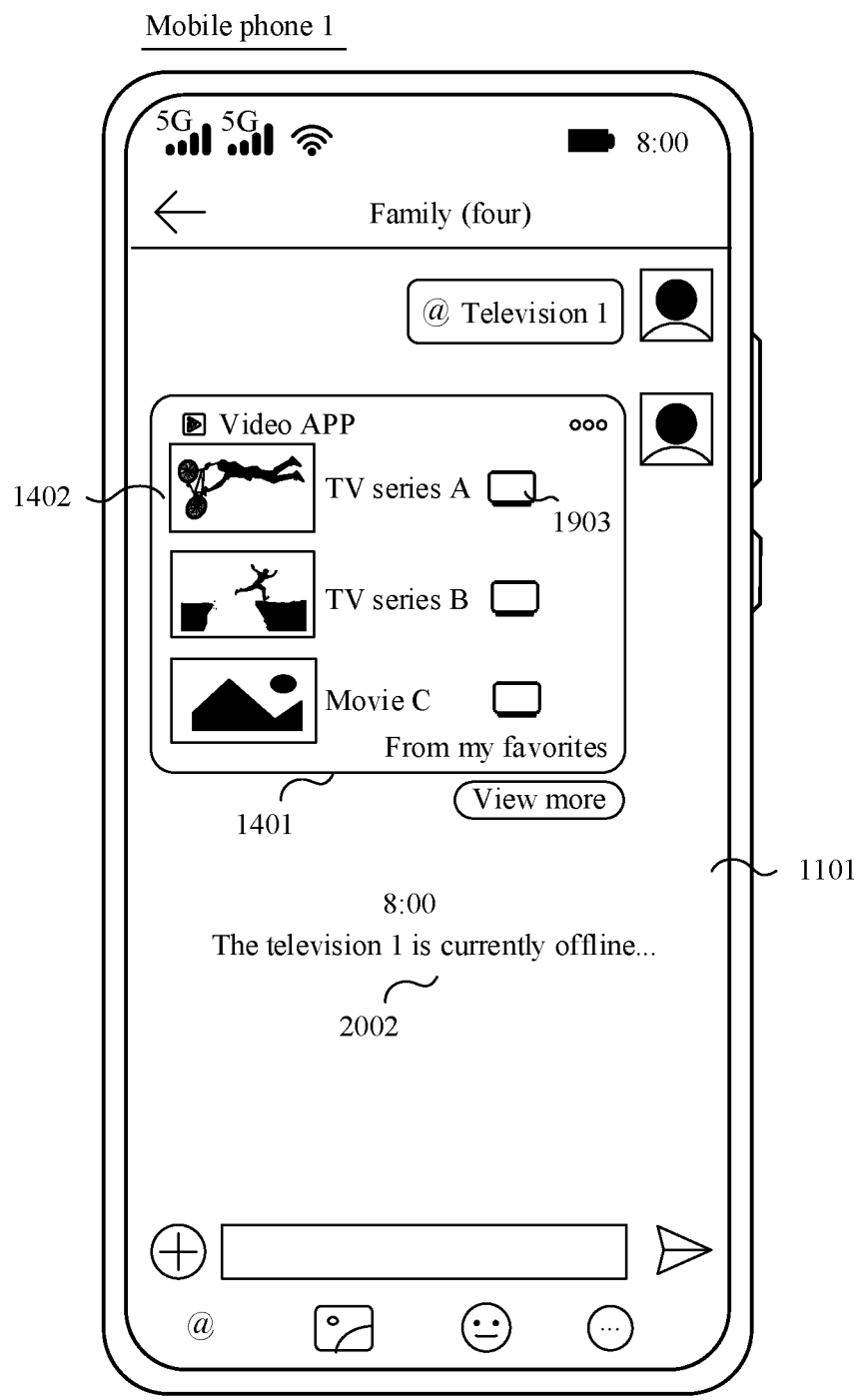

Correspondingly, if an exception such as a disconnection or a fault occurs on the television 1, the mobile phone 1 cannot successfully indicate the television 1 to display the play interface 1802 of the TV series A in the video APP. For example, if the chat APP in the mobile phone 1 does not receive, within preset duration, the response message that is sent by the television 1 and that indicates successful play, the chat APP may determine that an application service selected by the user cannot be enabled in the television 1. In this case, as shown in FIG. 20(b), the chat APP in the mobile phone 1 may display, in the chat interface, a prompt message 2002 indicating that the television 1 cannot enable the application service. Certainly, the mobile phone 1 may further automatically use the video APP in the mobile phone 1 to open the TV series A, so that the user can enable the application service in the mobile phone 1.

In some embodiments, after the user Amy sends the chat message 1401 to the "Family" group in the chat interface 1101 by using the chat APP in the mobile phone 1, in addition to the sender (namely, the user Amy) of the chat message 1401, the receiver (namely, a contact in the "Family" group) of the chat message 1401 may also enable a corresponding application service by using the chat message 1401.

Figure 21A:
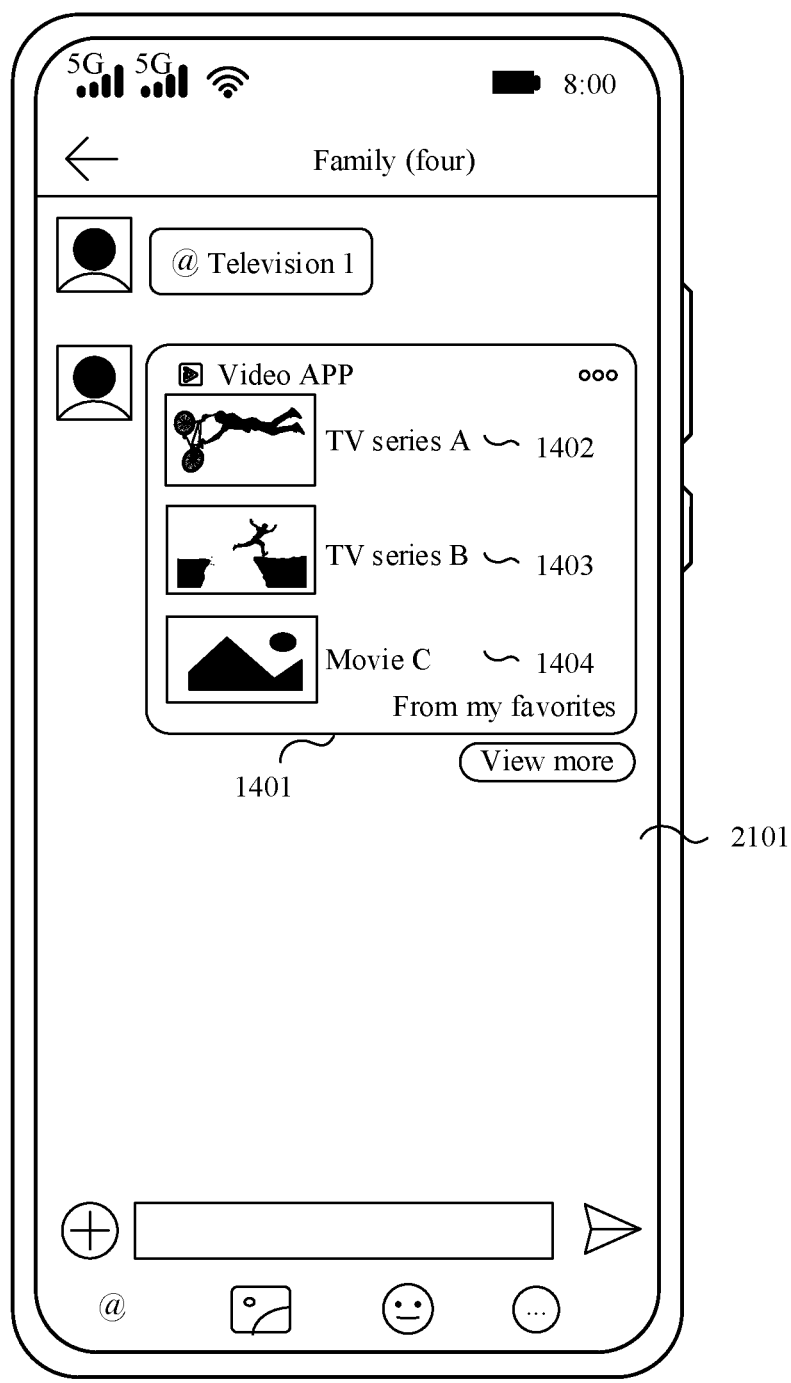
FIG. 21(a) to FIG. 21(c) are a schematic diagram 15 of an application scenario for a service sharing method according to an embodiment of this application.
Figure 21B:
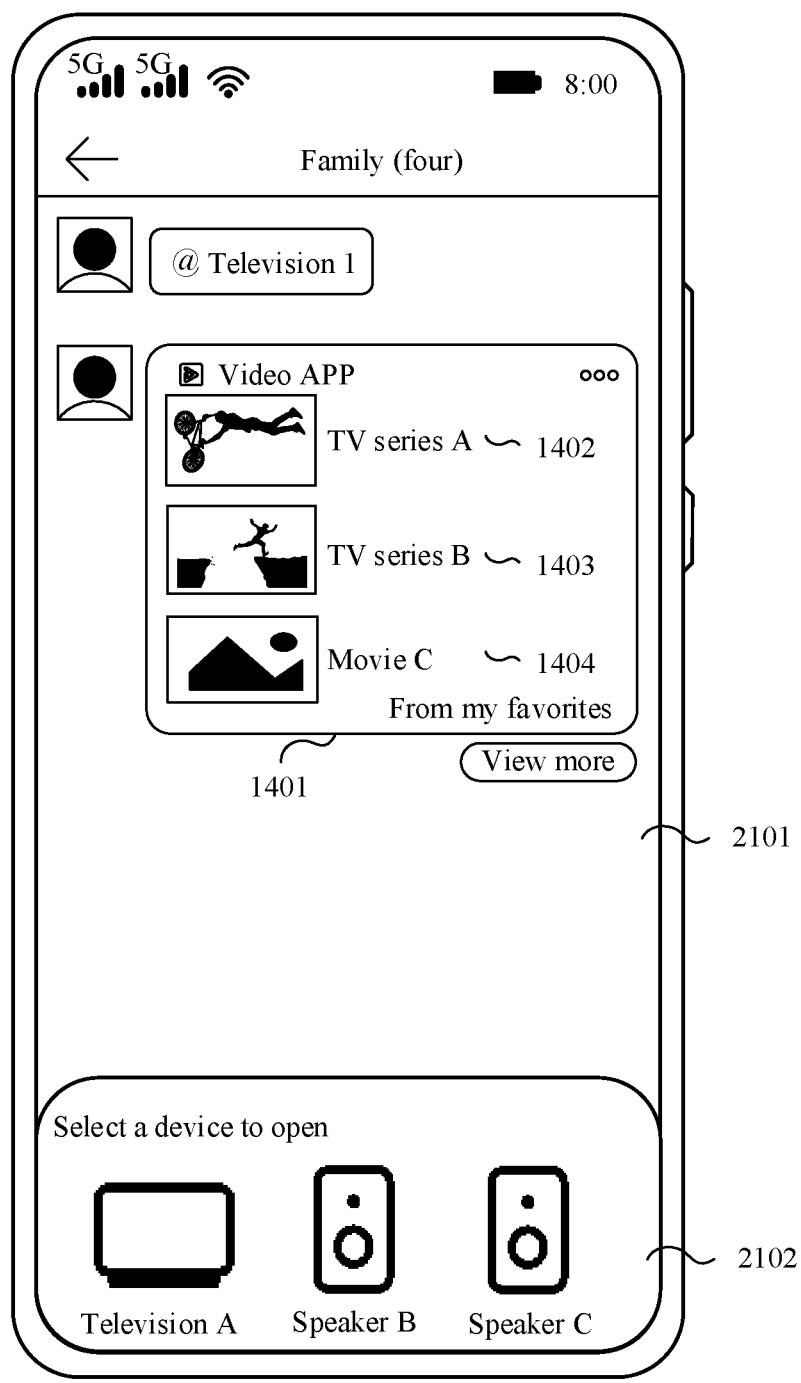
Figure 21C:
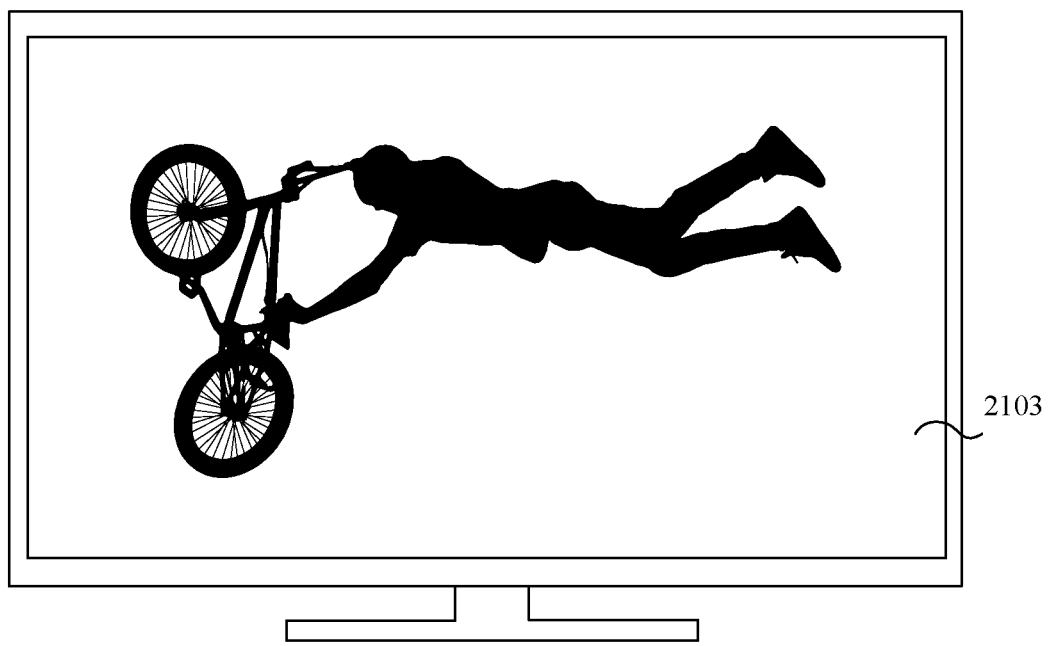

For example, a contact Sam is a member in the "Family" group, and the contact Sam may receive, by using a chat APP in a mobile phone (referred to as a mobile phone 2) of the contact Sam, the chat message 1401 sent by Amy. As shown in FIG. 21(*a*), after the contact Sam opens a chat interface 2101 that is in the chat APP and that is with the "Family" group by using the mobile phone 2, the chat APP may display, in the chat interface 2101, the chat message 1401 sent by Amy. The chat message 1401 includes the service content corresponding to the application service "My Favorites" used by Amy in the television 1, namely, the option 1402 of the TV series A, the option 1403 of the TV series B, and the option 1404 of the movie C.

For example, if it is detected that the user (the user in this case is the contact Sam) taps the option 1402, it indicates that the contact Sam wants to enable service content corresponding to the option 1402. In this case, the chat APP may obtain one or more electronic devices that currently access a same communication network as the mobile phone 2. For example, if the contact Sam logs in to the mobile phone 2 with an account whose name is "456", the mobile phone 2 may send a query request 3 to the first server, so that the first server may query, in response to the query request 3, another device to which the account whose name is "456" is logged in. For example, the device to which the account whose name is "456" is logged in includes a television A, a speaker B, and a speaker C. Further, as shown in FIG. 21(*b*), the mobile phone 2 may display a device list 2102 in the chat interface 2101, where the device list 2102 includes the television A, the speaker B, and the speaker C. Certainly, the device list 2102 may further include the mobile phone 2 of Sam, namely, a local device.

Certainly, similar to that the mobile phone 1 obtains the one or more electronic devices that access the same communication network as the mobile phone 1, the mobile phone 2 may further query, in a currently accessed Wi-Fi network in a manner such as broadcast, an electronic device that accesses a same Wi-Fi network as the mobile phone 2. This is not limited in embodiments of this application.

In this case, if it is detected that the user selects an electronic device from the device list 2102, for example, selects the television A, it indicates that the user wants to use the television A to open the TV series A corresponding to the option 1402. In this case, the mobile phone 2 may send the play link 1 corresponding to the TV series A to the television A. For example, the mobile phone 2 may send the play link 1 to the television A by using the first server. Further, as shown in FIG. 21(*c*), the television A may enable a corresponding video APP based on the play link 1, and display a play interface 2103 of the TV series A in the video APP. In this way, after the user receives the application service shared by the contact in the chat APP, the user may directly select a corresponding electronic device in the chat APP to enable the application service. The user may enable the application service shared by the contact in the corresponding electronic device without jumping to a plurality of pages in the mobile phone or switching between a plurality of devices, so that the user can use the application service shared by the contact more quickly.

Figure 22A:
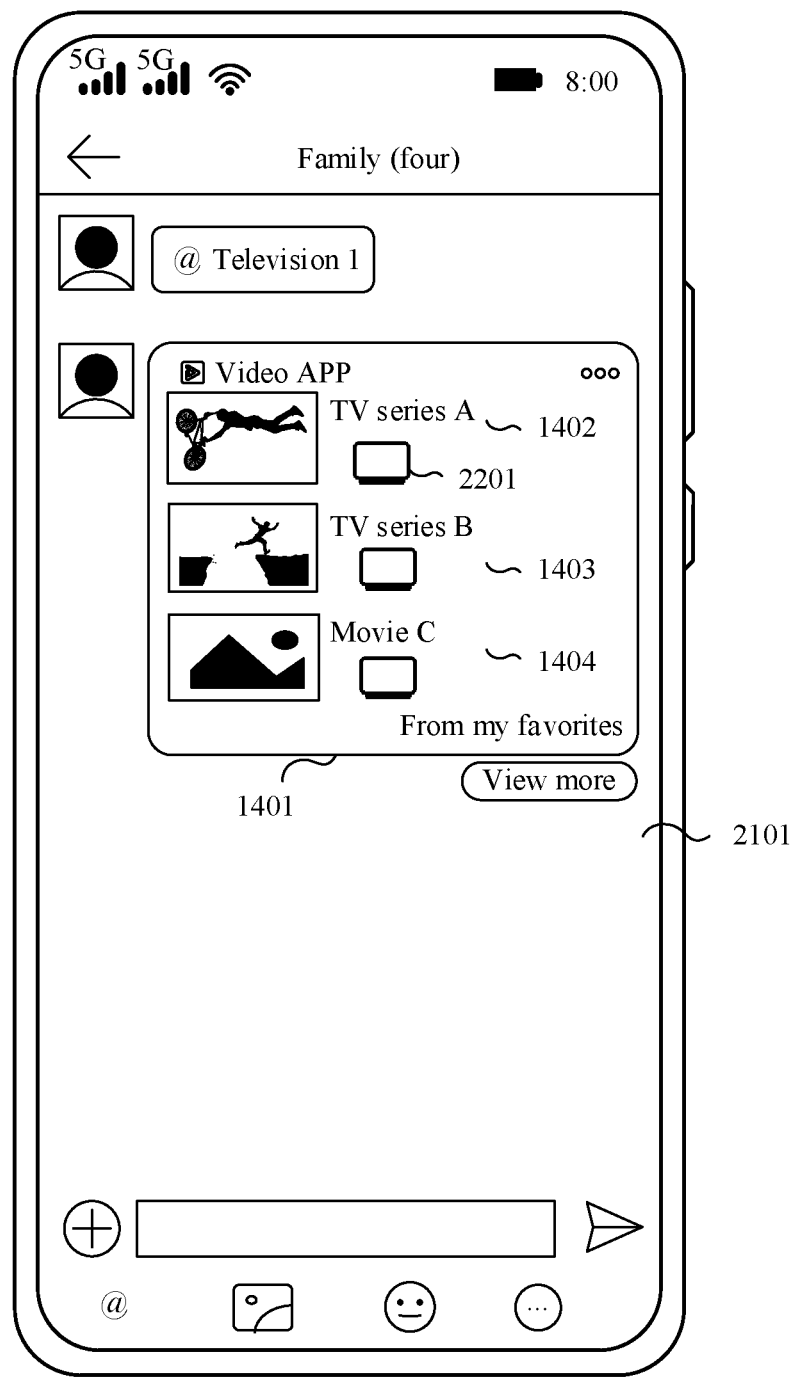
FIG. 22(a) and FIG. 22(b) are a schematic diagram 16 of an application scenario for a service sharing method according to an embodiment of this application.
Figure 22B:
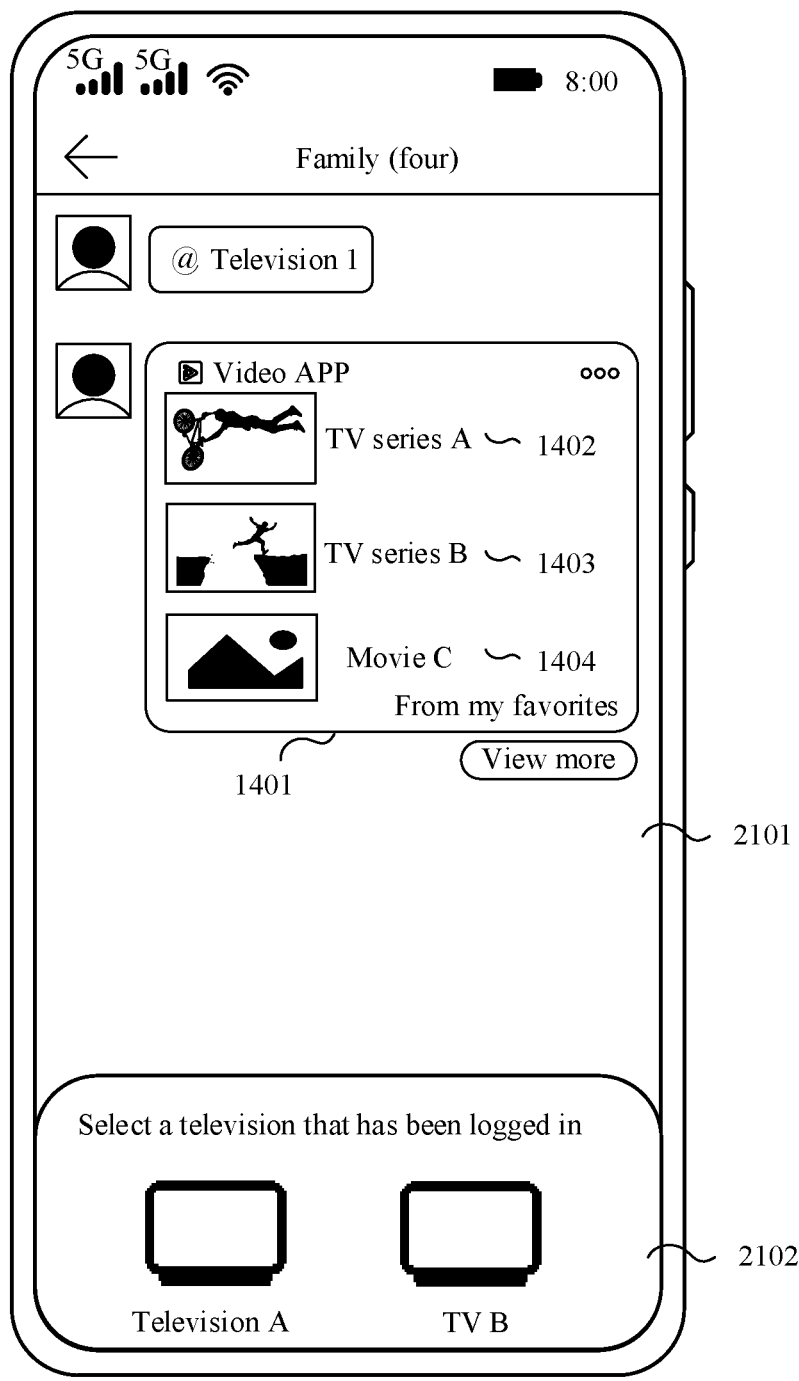

Alternatively, in some embodiments, as shown in FIG. 22(*a*), when the chat APP in the mobile phone 2 displays the chat message 1401 sent by Amy, the chat APP may further identify whether the service content in the chat message 1401 is video content. For example, the play link 1 corresponding to the option 1402 in the chat message 1401 includes a package name of a video APP, and the chat APP may determine, by identifying the package name of the video APP, that the option 1402 is video content. In this case, the chat APP may display an identifier 2201 of a television in the option 1402, to indicate to play the TV series A in the option 1402 by using an electronic device of a television type.

In this case, if it is detected that the user (namely, Sam) selects the identifier 2201 of the television from the option 1402 of the chat message 1401, the chat APP may obtain an electronic device whose device type is a television in electronic devices that currently access a same communication network as the mobile phone 2. Further, as shown in FIG. 22(*b*), the chat APP may display one or more obtained televisions in the device list 2102, and the user selects a television that is used to enable the application service in the option 1402. For example, if the user selects the television A from the device list 2102, the chat APP may indicate the television A to enable the video APP, so as to play the TV series A in the play option 1402.

Figure 23A:
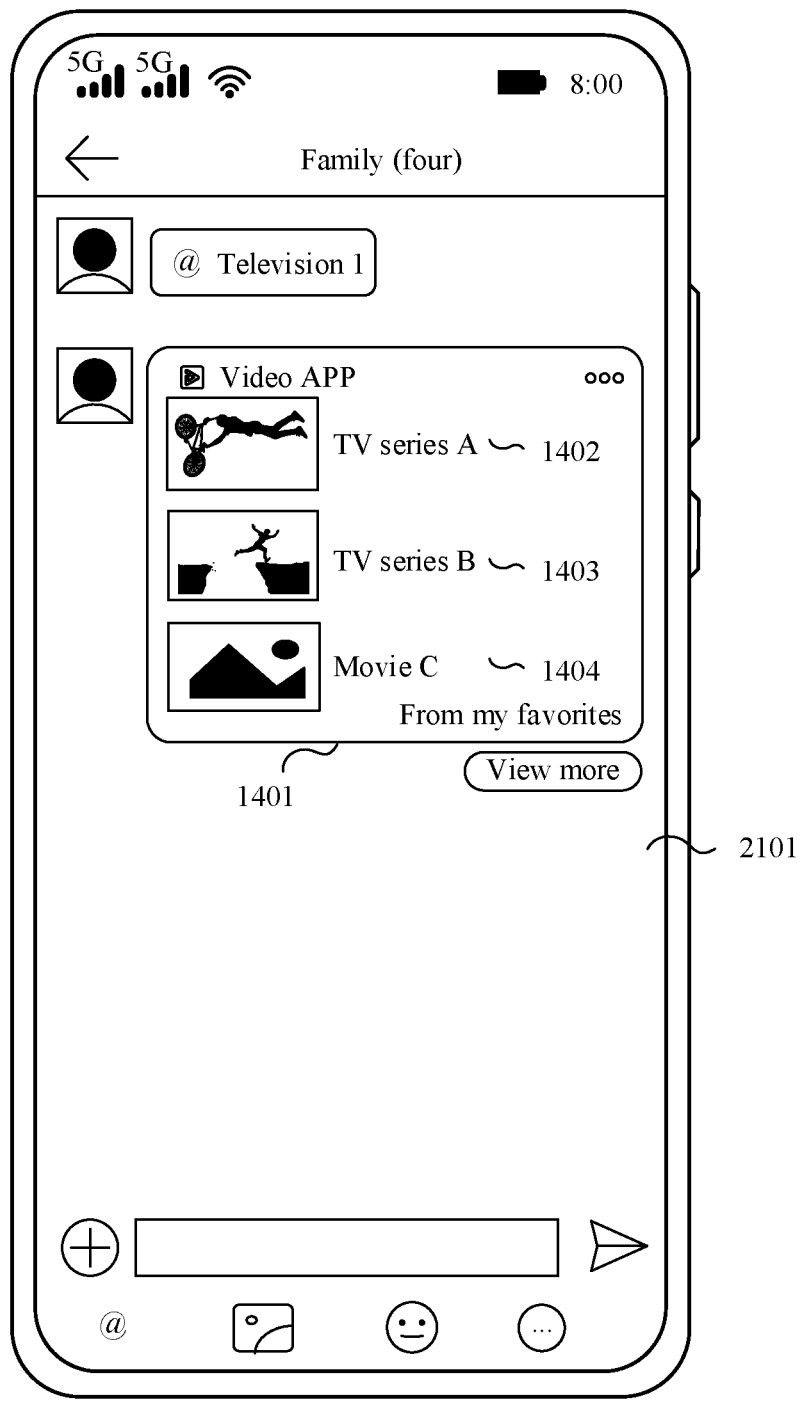
FIG. 23(a) and FIG. 23(b) are a schematic diagram 17 of an application scenario for a service sharing method according to an embodiment of this application.
Figure 23B:
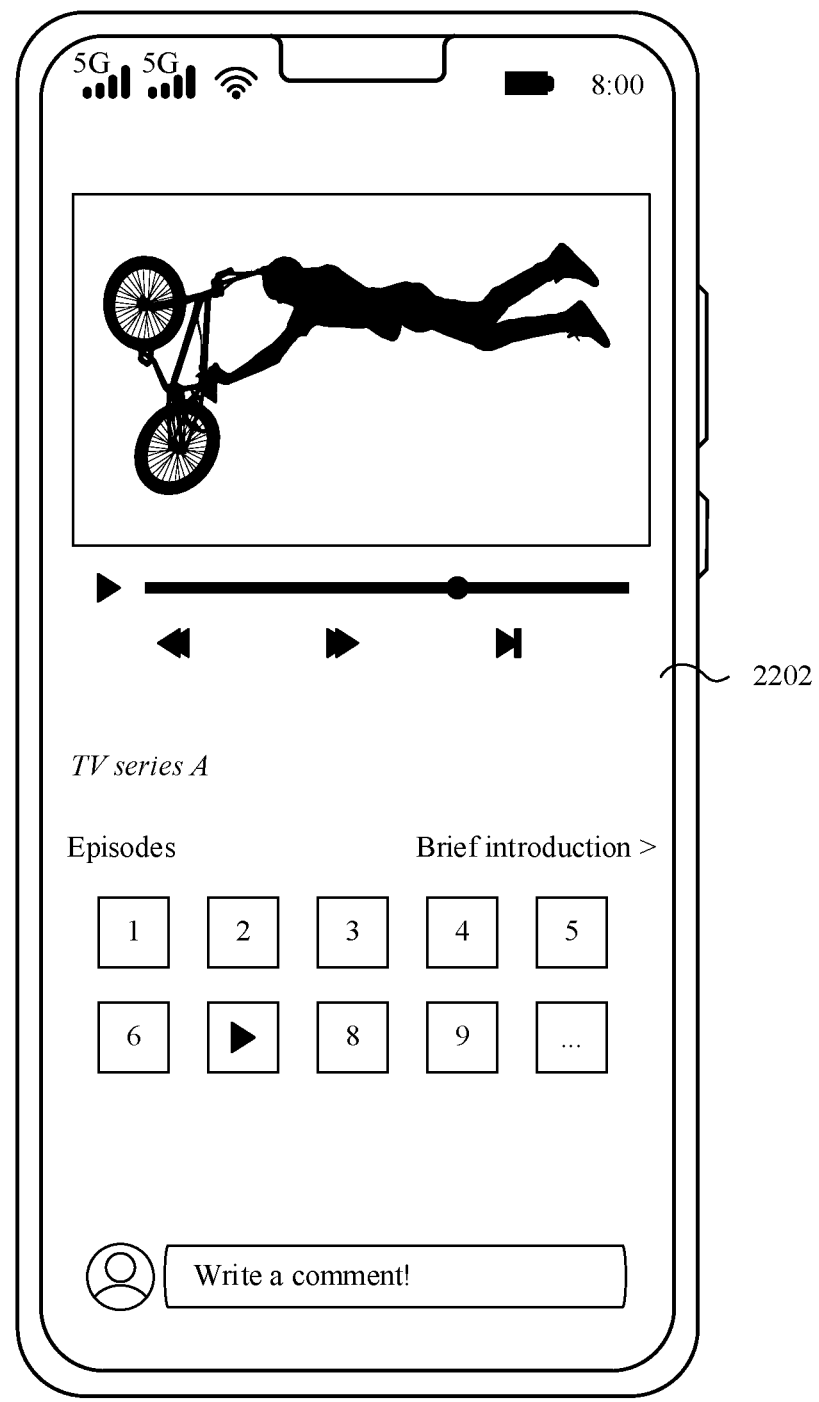

In some embodiments, when the chat APP in the mobile phone 2 displays the chat message 1401 sent by the Amy, the chat APP may identify that the service content in the chat message 1401 is video content. In this way, the chat APP may further obtain one or more televisions that currently access a same communication network as the mobile phone 2. If there is no television that currently accesses the same communication network as the mobile phone 2, as shown in FIG. 23(*a*), when displaying the chat message 1401 sent by Amy, the chat APP may not display the identifier 2201 of the television in the option 1402, the option 1403, and the option 1404. Subsequently, if it is detected that the user taps an option in the chat message 1401, for example, taps the option 1402, as shown in FIG. 23(*b*), the chat APP may indicate a local device (namely, the mobile phone 2) to enable a video APP, and display the play interface 2202 of the TV series A in the video APP.

Alternatively, when the chat APP displays the chat message 1401 sent by Amy, it may be set that when the user inputs different gestures to the option 1402 in the chat message 1401, the TV series A may be triggered to be played locally in the mobile phone 2 or in a television. Alternatively, it may be set that when the user inputs a preset gesture in different areas of the option 1402 in the chat message 1401, the TV series A may be triggered to be played locally in the mobile phone 2 or in a television. This is not limited in embodiments of this application.

Figure 24:
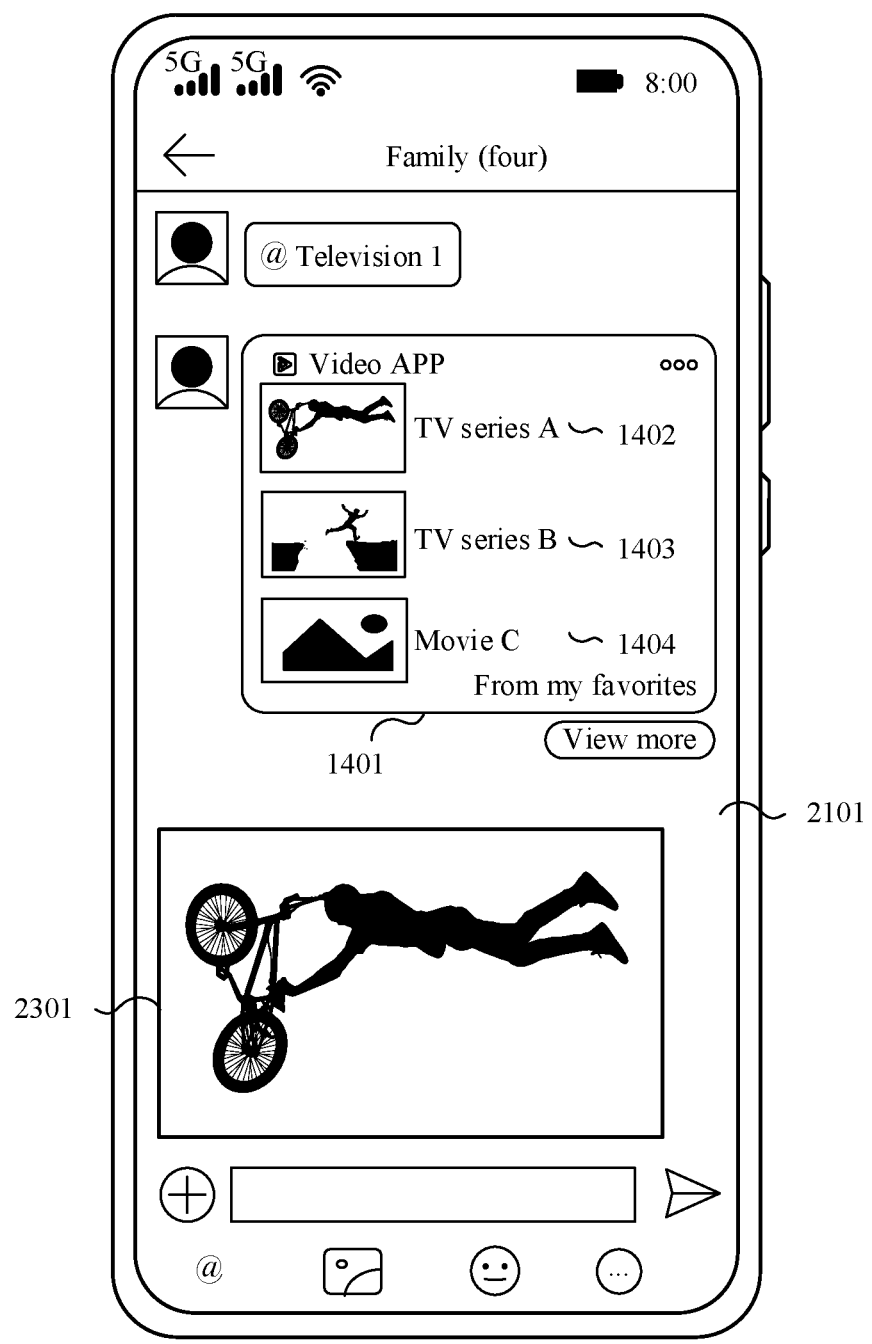
FIG. 24 is a schematic diagram 18 of an application scenario for a service sharing method according to an embodiment of this application.

In some embodiments, an example in which the user selects the option 1402 in the chat message 1401 to play the TV series A in the local device is still used. After the chat APP identifies that the service content in the option 1402 selected by the user in the chat message 1401 is the video content, as shown in FIG. 24, the mobile phone may further play, in a form of a small window 2301 (which may also be referred to as a LiveWindow) in the chat interface 2101, the TV series A corresponding to the option 1402. In this way, when enabling, in the chat APP, the application service shared by the contact, the user does not need to leave the chat interface 2101 in the current chat APP, and can further enjoy the service content in the application service, to improve user experience.

Figure 25:
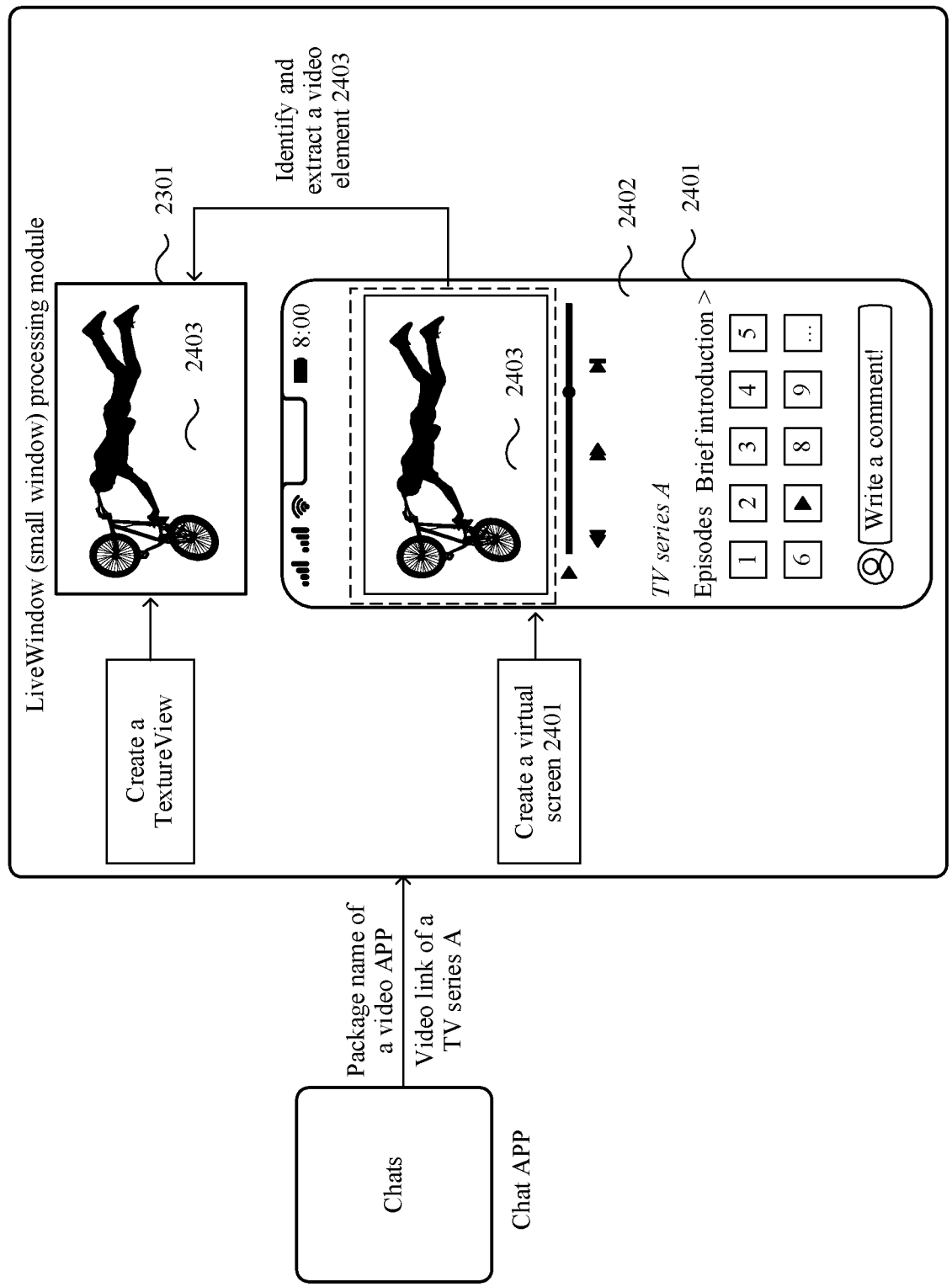
FIG. 25 is a schematic diagram 19 of an application scenario for a service sharing method according to an embodiment of this application.

For example, a LiveWindow processing module is disposed in the mobile phone 2, and the LiveWindow processing module may be disposed at an application layer of the mobile phone 2 in a form of an APK file, or the LiveWindow processing module may run at an application framework layer of the mobile phone 2. When the chat APP in the mobile phone 2 detects that the user taps the option 1402 in the chat message 1401, the chat APP may identify, by using the play link 1 corresponding to the option 1402, that the service content in the option 1402 is video content. Further, as shown in FIG. 25, the chat APP may send, to the LiveWindow processing module, the package name of the video APP carried in the play link 1 and the video link of the TV series A in the video APP. The LiveWindow processing module may create a TextureView, configured to display a small window 2301, and the LiveWindow processing module may create a virtual screen 2401, configured to store an interface drawn when the video APP is running. Further, the LiveWindow processing module may open the video link by using the video APP based on the package name of the video APP and the video link of the TV series A in the video APP. In addition, the LiveWindow processing module may draw, on the virtual screen 2401, a play interface 2402 of the TV series A when the video APP is running. Further, the LiveWindow processing module may extract a video element 2403 in the play interface 2402 from the virtual screen 2401, and input the extracted video element 2403 into the small window 2301. Finally, as shown in FIG. 24, the LiveWindow processing module may superimpose the small window 2301 to an upper layer of the chat interface 2101 for display, so that the TV series A may be played in the chat interface 2101 in the chat APP in a form of the small window 2301.

In some embodiments, a function button such as pause playing, full-screen playing, entering an application, or closing a small window may be further set in the small window 2301 by the mobile phone 2. The user may control, by operating these function buttons, the TV series A that is from the video APP and that is played in the small window 2301.

Figure 26A:
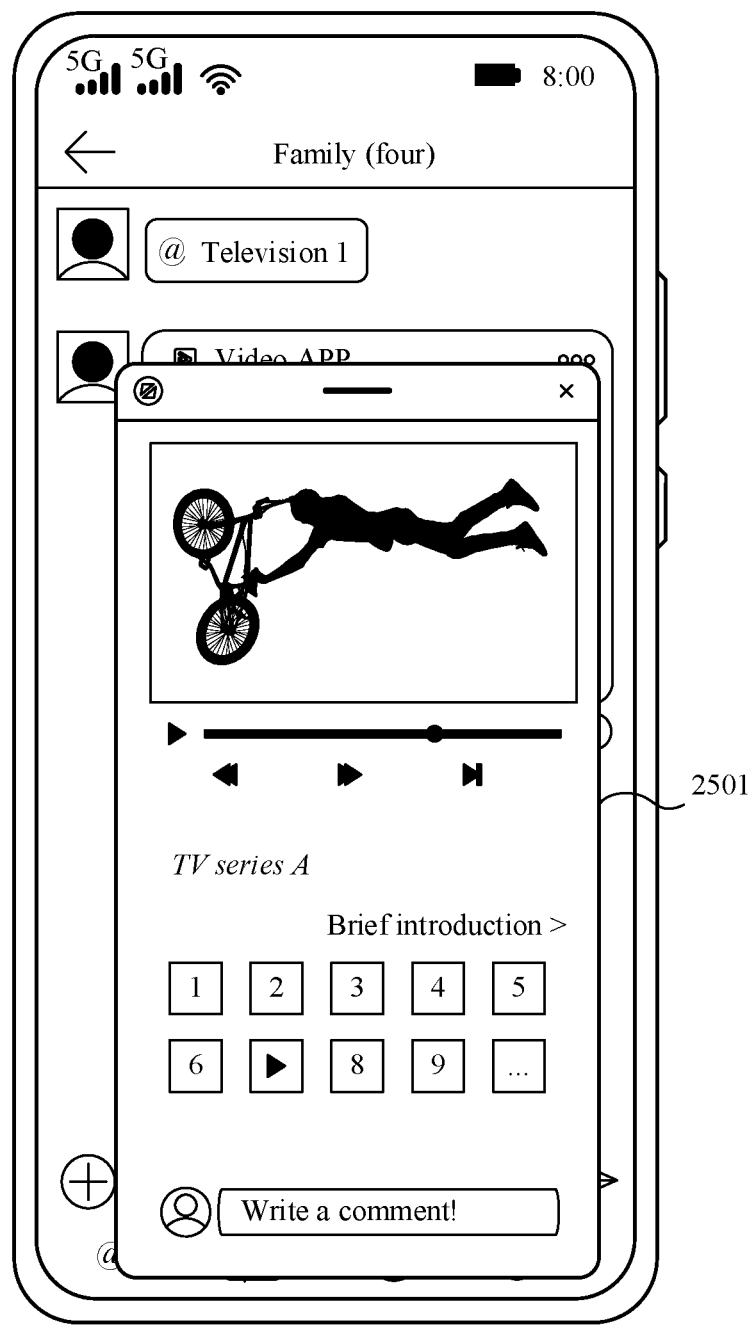
FIG. 26(a) and FIG. 26(b) are a schematic diagram 20 of an application scenario for a service sharing method according to an embodiment of this application.
Figure 26B:
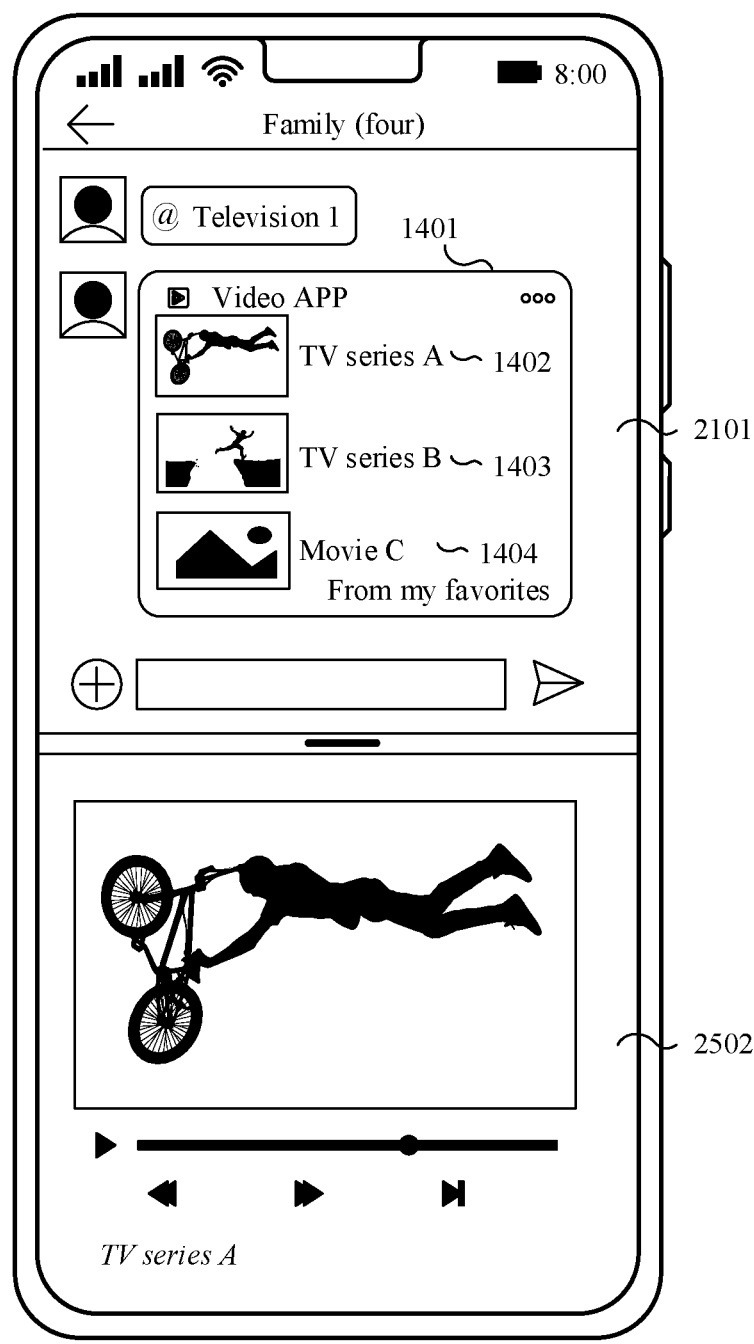

Certainly, a person skilled in the art may also design another manner to enable the application service shared by the contact in the mobile phone 2 locally. For example, the user still taps the option 1402 in the chat message 1401. As shown in FIG. 26(*a*), the mobile phone 2 may further display the play interface of the TV series A in the video APP in a floating window 2501 in a form of a floating window. Alternatively, as shown in FIG. 26(*b*), the mobile phone 2 may further enter a split-screen mode, display the chat interface 2101 in the chat APP in a window 1, and display a play interface 2502 of the TV series A in the video APP in a window 2. This is not limited in embodiments of this application.

In addition, in the foregoing embodiments, an example in which the user receives, in the chat APP, the chat message sent by the contact in the "Family" group and enables the application service in the chat message is used for description. It may be understood that the user may also receive, in the chat APP, a chat message that includes an application service and that is sent by another contact, for example, receive a chat message that includes an application service and that is sent by a friend, a stranger, an official account, or a robot in the chat APP. This is not limited in embodiments of this application.

It should be noted that the user receiving the chat message 1401 may locally enable a related service in the chat message 1401 in the mobile phone according to the foregoing methods. Similarly, the user sending the chat message 1401 may also locally enable the related service in the chat message 1401 in the mobile phone according to the foregoing methods. This is not limited in embodiments of this application.

In some other embodiments, after the user enables, in the chat APP by using an electronic device, the application service in the chat message, the chat APP may further generate and store an operation record of the user this time. For example, the operation record may include information such as service content of the application service, an electronic device that enables the application service, or a time point at which the application service is enabled.

For example, when the user Sam selects, in the chat interface 2101, the television A to open the TV series A that is in the chat message 1401 and that corresponds to the option 1402, the chat APP in the mobile phone 2 may generate an operation record 1. The operation record 1 may include the play link 1 of the TV series A, and a play device that is the television A.

Figure 27:
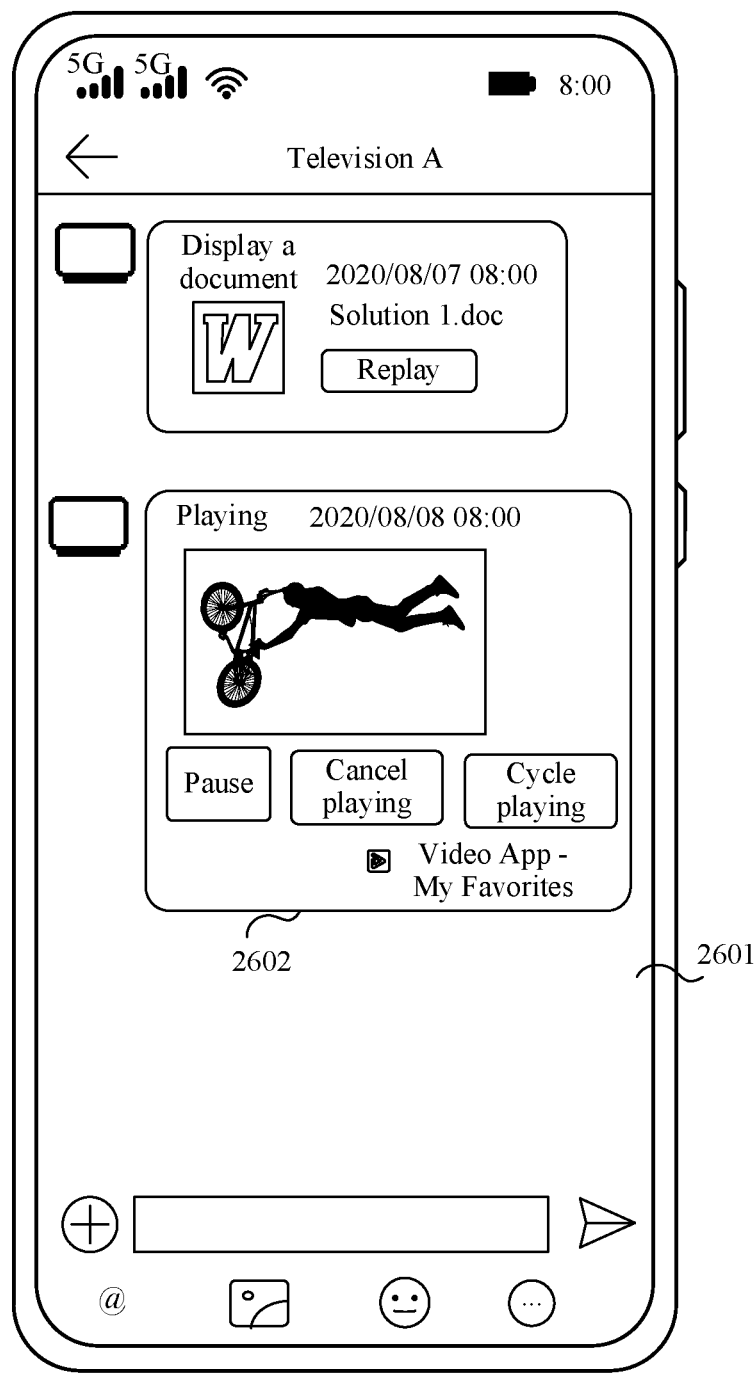
FIG. 27 is a schematic diagram 21 of an application scenario for a service sharing method according to an embodiment of this application.

In the chat APP, an electronic device of a user may alternatively be added to a contact list of the user as a contact. As shown in FIG. 27, if the user Sam opens, in the chat APP, a chat interface 2601 with the television A, the chat APP may display, in the chat interface 2601 in a form of a dialog, a record of an operation performed by the user on the television A. For example, the chat interface 2601 may include a chat message 2602 sent by the television A. The chat message 2602 corresponds to the operation record 1, and the chat message 2602 includes a card of the TV series A that is being played by the television A. In addition, the chat APP may further set buttons such as pause playing, cancel playing, and cycle playing in the chat message 2602, so that the user can control, in the chat message 2602, an application service that is being enabled in the television A. Certainly, the chat APP may further display, in a form of a chat message based on the recorded operation record, another application service executed by the user in the television A. This is not limited in embodiments of this application.

In addition, the foregoing embodiments are described by using an example in which the user shares a related application service in the video APP with the contact in the chat APP, and the user and the contact enable the application service locally in the mobile phone or in another electronic device. It may be understood that the user may also share a related application service in another application with the contact in the chat APP, and the user and the contact may also enable an application service of another application locally in the mobile phone or in another electronic device. This is not limited in embodiments of this application.

Figure 28:
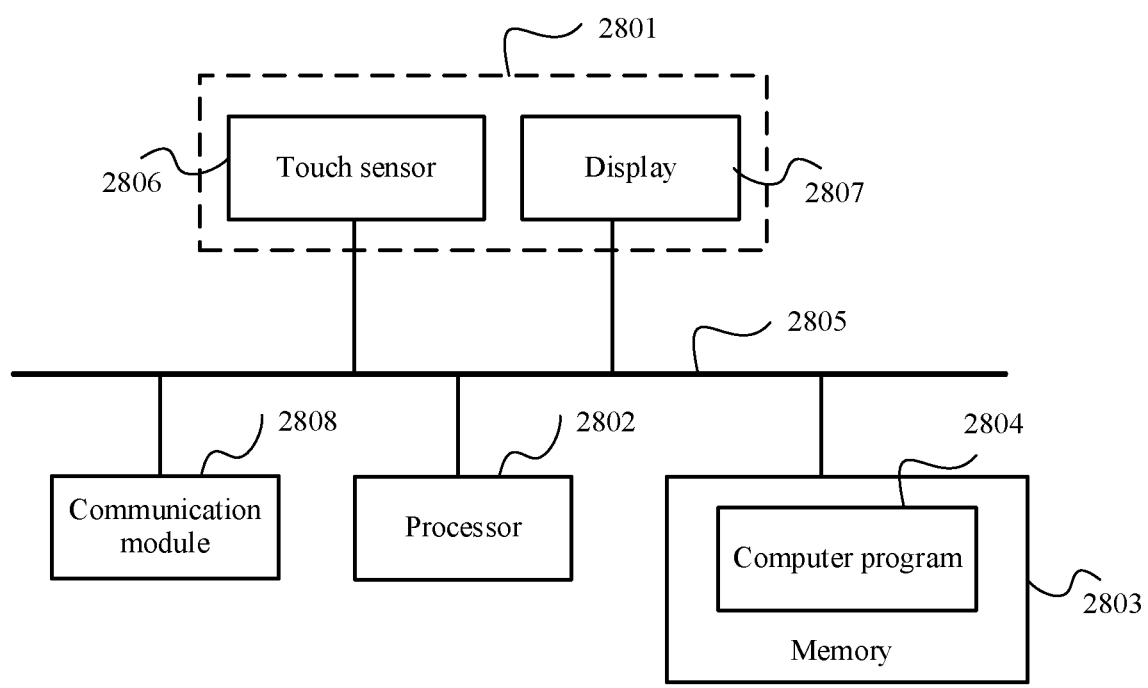
FIG. 28 is a schematic diagram 2 of a structure of an electronic device according to an embodiment of this application.

As shown in FIG. 28, an embodiment of this application discloses an electronic device, for example, the mobile phone 1 or the mobile phone 2 in the foregoing embodiments. The electronic device may specifically include a display 2807, one or more processors 2802, a memory 2803, a communication module 2808, one or more applications (not shown), and one or more computer programs 2804. The foregoing components may be connected through one or more communication buses 2805. The one or more computer programs 2804 are stored in the memory 2803 and are configured to be executed by the one or more processors 2802. The one or more computer programs 2804 include instructions, and the instructions may be used to perform related steps performed by the mobile phone in the foregoing embodiments. The electronic device may further include an input device such as a touch sensor 2806 (the touch sensor 2806 and the display 2807 may be integrated into a touchscreen 2801) or a mouse.

Based on the descriptions of the foregoing implementations, it may be clearly understood by a person skilled in the art that, for ease and brevity of description, division of the foregoing function modules is merely used as an example for illustration. In actual application, the foregoing functions may be allocated to different function modules and implemented based on a requirement, that is, an internal structure of an apparatus is divided into different function modules, to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes a plurality of instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
   displaying, by a first device, a chat interface with a first contact in a first window, wherein the chat interface comprises an input box for a chat message;
   detecting, by the first device, a first operation of inputting a preset symbol into the input box by a user;
   displaying, by the first device, a first list in a second window different from the first window in response to the first operation,
   wherein the first list comprises one or more electronic devices,
   wherein the one or more electronic devices comprise a second device different from the first device, and
   wherein the second device accesses a same local area network as the first device, or the second device is logged in to by using a same account as the first device;
   after the displaying the first list and in response to a second operation of selecting the second device by the user, displaying, by the first device, a service list provided by the second device, wherein the service list comprises one or more services provided by the second device;
   sending, by the first device, a first chat message in the chat interface to the first contact in response to a third operation of selecting a first service from the service list by the user, wherein the first chat message comprises first service content corresponding to the first service, wherein the sending, by the first device, the first chat message in the chat interface comprises:
      displaying, by the first device in the chat interface, the first chat message and a first user avatar that sends the first chat message, wherein the first user avatar comprises an identifier of the second device; and
   after the sending, by the first device, the first chat message in the chat interface, displaying, by the first device in the chat interface, a third chat message and a second user avatar that sends the third chat message, wherein the third chat message is unrelated to a service provided by the second device, and the second user avatar does not comprise the identifier of the second device.

2. The method according to claim 1, wherein the method further comprises:
   before the displaying, by the first device, the first list:
      obtaining, by the first device, the one or more electronic devices that access the same local area network as the first device; or
      obtaining, by the first device, the one or more electronic devices that are logged in to by using the same account as the first device.

3. The method according to claim 1, wherein the method further comprises:
   before the displaying, by the first device, the service list provided by the second device:
      obtaining, by the first device, the service list corresponding to the second device.

4. The method according to claim 1, wherein the method further comprises:
   before the sending, by the first device, the first chat message in the chat interface:
      obtaining, by the first device, the first service content corresponding to the first service.

5. The method according to claim 1, wherein the displaying, by the first device, the first list comprises:
   displaying, by the first device, the first list in the chat interface; or
   switching, by the first device, from the chat interface to a reminder interface, and displaying the first list in the reminder interface.

6. The method according to claim 5, wherein the reminder interface is in a folded state or an expanded state.

7. The method according to claim 5, wherein the displaying, by the first device, the service list provided by the second device comprises:
   displaying, by the first device in the reminder interface, the service list provided by the second device; or
   displaying, by the first device in the reminder interface, the service list provided by the second device and service content of each service in the service list.

8. The method according to claim 1, wherein the method further comprises:
   in response to the second operation of selecting the second device from the first list by the user:
      displaying, by the first device, an application list provided by the second device, wherein the application list comprises one or more applications,
   the displaying, by the first device, the service list provided by the second device comprising:
      displaying, by the first device in response to a fourth operation of selecting a first application from the application list by the user, a first service list provided by the first application in the second device.

9. The method according to claim 1, wherein the first service content corresponds to a first play link, and the method further comprises:
    after the sending, by the first device, the first chat message in the chat interface:
        detecting, by the first device, a first enable operation of enabling the first service content by the user in the first chat message; and
        in response to the first enable operation, enabling the first service content through the first play link.

10. The method according to claim 9, wherein the enabling the first service content through the first play link comprises:
    based on the first play link being a local link of the first service content in the first device, enabling, by the first device, the first service content in the first device using the first play link; or
    based on the first play link being an external link of the first service content in the second device, indicating, by the first device, the second device to enable the first service content using the first play link.

11. The method according to claim 9, wherein the first chat message further comprises a first play button and a second play button that correspond to the first service content, the first play button corresponds to a local link of the first service content in the first device, and the second play button corresponds to an external link of the first service content in the second device; and
    based on the first enable operation being of tapping the first play button by the user, the enabling the first service content through the first play link comprises:
        enabling, by the first device, the first service content in the first device using the first play link; or
    based on the first enable operation being of tapping the second play button by the user, the enabling the first service content through the first play link comprises:
        indicating, by the first device, the second device to enable the first service content using the first play link.

12. The method according to claim 1, wherein the method further comprises:
    displaying, by the first device in the chat interface, a second chat message sent by the first contact, wherein the second chat message comprises second service content corresponding to a second service, and a device providing the second service is associated with a device sending the second chat message;
    detecting, by the first device, a second enable operation of enabling the second service content by the user in the second chat message; and
    in response to the second enable operation, playing, by the first device, the second service content in a target device.

13. The method according to claim 12, wherein the method further comprises:
    after the detecting, by the first device, the second enable operation of enabling the second service content by the user in the second chat message:
        displaying, by the first device, a second device list, wherein the second device list comprises the one or more electronic devices associated with the first device; and
        in response to a fifth operation of selecting a third device from the second device list by the user, determining, by the first device, the third device as the target device.

14. The method according to claim 12, wherein the displaying, by the first device in the chat interface, the second chat message sent by the first contact comprises:
    determining, by the first device, whether the second service content corresponding to the second service comprises video content; and
    based on the second service content comprising the video content, displaying, by the first device, the second chat message in the chat interface, wherein the second chat message comprises the second service content and a video identifier corresponding to the second service content; or
    based on the second service content not comprising the video content, displaying, by the first device, the second chat message in the chat interface, wherein the second chat message comprises the second service content but does not comprise any video identifier corresponding to the second service content.

15. The method according to claim 12, wherein the displaying, by the first device in the chat interface, the second chat message sent by the first contact comprises:
    determining, by the first device, that the second service content corresponding to the second service comprises video content;
    determining, by the first device from the one or more electronic devices associated with the first device, one or more candidate devices having a video play function; and
    displaying, by the first device, the second chat message in the chat interface, wherein the second chat message comprises the second service content and identifiers of the one or more candidate devices.

16. The method according to claim 12, wherein the target device is the first device, and the playing, by the first device, the second service content in the target device comprises:
    switching, by the first device, from the chat interface to a play interface of the second service content, and enabling the second service content in the play interface; or
    enabling, by the first device, the second service content in the chat interface in a form of a small window.

17. The method according to claim 12, wherein the method further comprises:
    after the playing, by the first device, the second service content in the target device:
        displaying, by the first device in the chat interface, a prompt message indicating that the second service content is successfully played in the target device.

18. A first device, wherein the first device comprises:
    a display;
    one or more processors;
    a memory; and
    the memory stores one or more computer programs, the one or more computer programs comprise instructions, and when the instructions are executed by the first device, the first device is enabled to perform:
        displaying, a chat interface with a first contact in a first window, wherein the chat interface comprises an input box for a chat message;
        detecting a first operation of inputting a preset symbol into the input box by a user;
        displaying, a first list in a second window different from the first window in response to the first operation,
        wherein the first list comprises one or more electronic devices,
        wherein the one or more electronic devices comprise a second device different from the first device, and wherein the second device accesses a same local area network as the first device, or the second device is logged in to by using a same account as the first device;

after the displaying the first list and in response to a second operation of selecting the second device by the user, displaying, by the first device, a service list provided by the second device, wherein the service list comprises one or more services provided by the second device;

sending, a first chat message in the chat interface to the first contact in response to a third operation of selecting a first service from the service list by the user, wherein the first chat message comprises first service content corresponding to the first service, wherein the sending the first chat message in the chat interface comprises:
displaying, in the chat interface, the first chat message and a first user avatar that sends the first chat message, wherein the first user avatar comprises an identifier of the second device; and after the sending the first chat message in the chat interface, displaying, in the chat interface, a third chat message and a second user avatar that sends the third chat message, wherein the third chat message is unrelated to a service provided by the second device, and the second user avatar does not comprise the identifier of the second device.

19. A non-transitory computer-readable storage medium, wherein the non-transitory computer-readable storage medium stores instructions, and when the instructions are run on a first device, the first device is enabled to perform:
displaying, a chat interface with a first contact in a first window, wherein the chat interface comprises an input box for a chat message;
detecting a first operation of inputting a preset symbol into the input box by a user;
displaying, a first list in a second window different from the first window in response to the first operation, wherein the first list comprises one or more electronic devices,
wherein the one or more electronic devices comprise a second device different from the first device, and
wherein the second device accesses a same local area network as the first device, or the second device is logged in to by using a same account as the first device;
after the displaying the first list and in response to a second operation of selecting the second device by the user, displaying, by the first device, a service list provided by the second device, wherein the service list comprises one or more services provided by the second device;
sending, a first chat message in the chat interface to the first contact in response to a third operation of selecting a first service from the service list by the user, wherein the first chat message comprises first service content corresponding to the first service, wherein the sending the first chat message in the chat interface comprises:
displaying, in the chat interface, the first chat message and a first user avatar that sends the first chat message, wherein the first user avatar comprises an identifier of the second device; and after the sending the first chat message in the chat interface, displaying, in the chat interface, a third chat message and a second user avatar that sends the third chat message, wherein the third chat message is unrelated to a service provided by the second device, and the second user avatar does not comprise the identifier of the second device.

20. The method of claim 1, wherein the preset symbol is a single character, wherein inputting the single character into the input box by the user triggers the displaying the first list, wherein the first list displayed comprises a plurality of devices each providing a corresponding plurality of services, and wherein the service list displayed comprises a plurality of services provided by the second device.

* * * * *

UNITED STATES PATENT AND TRADEMARK OFFICE
CERTIFICATE OF CORRECTION

Page 1 of 1

PATENT NO. : 12,438,834 B2
APPLICATION NO. : 18/043790
DATED : October 7, 2025
INVENTOR(S) : Wang et al.

It is certified that error appears in the above-identified patent and that said Letters Patent is hereby corrected as shown below:

On the Title Page

Item (72), in Column 1, in "Inventors", Line 8, delete "Shenzhen" and insert -- Munich --.

Signed and Sealed this
Twenty-fifth Day of November, 2025

John A. Squires
*Director of the United States Patent and Trademark Office*